United States Patent
Ianchulev et al.

(10) Patent No.: US 12,453,656 B2
(45) Date of Patent: Oct. 28, 2025

(54) SYSTEM FOR SHAPING AND IMPLANTING BIOLOGIC INTRAOCULAR STENT FOR INCREASED AQUEOUS OUTFLOW AND LOWERING OF INTRAOCULAR PRESSURE

(71) Applicant: Iantrek, Inc., Harrison, NY (US)

(72) Inventors: Tsontcho Ianchulev, Harrison, NY (US); Luke Clauson, Harrison, NY (US); Daniel Nelsen, Harrison, NY (US); David Robson, Harrison, NY (US); David Baker, Harrison, NY (US); Sean Buxton, Harrison, NY (US)

(73) Assignee: Iantrek, Inc., Harrison, NY (US)

( * ) Notice: Subject to any disclaimer, the term of this patent is extended or adjusted under 35 U.S.C. 154(b) by 644 days.

(21) Appl. No.: 17/940,380

(22) Filed: Sep. 8, 2022

(65) Prior Publication Data

US 2023/0000680 A1 Jan. 5, 2023

Related U.S. Application Data

(63) Continuation-in-part of application No. 17/325,785, filed on May 20, 2021, now Pat. No. 12,318,328.
(Continued)

(51) Int. Cl.
*A61F 9/00* (2006.01)
*A61F 9/007* (2006.01)
(Continued)

(52) U.S. Cl.
CPC ........ *A61F 9/00781* (2013.01); *A61L 31/005* (2013.01); *A61B 2017/00907* (2013.01); *A61B 17/3468* (2013.01); *A61B 2090/062* (2016.02)

(58) Field of Classification Search
CPC .............. A61F 9/00781; A61L 31/005; A61L 27/3645; A61L 2430/16; A61B 17/3468;
(Continued)

(56) References Cited

U.S. PATENT DOCUMENTS

| 1,345,882 A | 7/1920 | Repass |
| 4,154,239 A | 5/1979 | Turley |
(Continued)

FOREIGN PATENT DOCUMENTS

| CN | 86102079 A | 11/1986 |
| CN | 2044479 U | 9/1989 |
(Continued)

OTHER PUBLICATIONS

"Preloaded Dsaek Tissue" Product sheet, Eversight Services, revised Sep. 23, 2019, 1 page. https://www.eversightvision.org/wp-content/uploads/2019/10/Preloaded_DSAEK_23Sept19.pdf (last accessed Nov. 11, 2019).
(Continued)

*Primary Examiner* — Rebecca E Eisenberg
*Assistant Examiner* — Kate Elizabeth Strachan
(74) *Attorney, Agent, or Firm* — Mintz Levin Cohn Ferris Glovsky and Popeo, P.C.

(57) ABSTRACT

A system for deploying an implant cut from a biological tissue into an eye of a patient including a delivery device and a nose cone assembly, a tubular shaft projecting from the distal end region of the nose cone and comprising a lumen. Related devices, systems, and methods are provided.

28 Claims, 40 Drawing Sheets

Related U.S. Application Data

(60) Provisional application No. 63/271,639, filed on Oct. 25, 2021, provisional application No. 63/252,753, filed on Oct. 6, 2021, provisional application No. 63/241,713, filed on Sep. 8, 2021, provisional application No. 63/163,623, filed on Mar. 19, 2021, provisional application No. 63/027,689, filed on May 20, 2020.

(51) Int. Cl.
   *A61L 31/00* (2006.01)
   *A61B 17/00* (2006.01)
   *A61B 17/34* (2006.01)
   *A61B 90/00* (2016.01)

(58) Field of Classification Search
   CPC .... A61B 2017/00907; A61B 2090/062; A61B 2090/034
   See application file for complete search history.

(56) References Cited

U.S. PATENT DOCUMENTS

| | | |
|---|---|---|
| 4,288,066 A | 9/1981 | Treace |
| 5,300,079 A | 4/1994 | Niezink et al. |
| 5,342,370 A | 8/1994 | Simon et al. |
| 5,662,661 A | 9/1997 | Boudjema |
| 5,702,441 A | 12/1997 | Zhou |
| 5,868,697 A | 2/1999 | Richter et al. |
| 5,868,728 A | 2/1999 | Giungo et al. |
| 5,941,250 A | 8/1999 | Aramant et al. |
| 6,036,678 A | 3/2000 | Giungo |
| 6,205,177 B1 | 3/2001 | Girod et al. |
| 7,207,965 B2 | 4/2007 | Simon |
| 7,291,125 B2 | 11/2007 | Coroneo |
| 7,815,592 B2 | 10/2010 | Coroneo |
| 7,850,638 B2 | 12/2010 | Theodore Coroneo |
| 7,909,789 B2 | 3/2011 | Badawi et al. |
| 8,128,588 B2 | 3/2012 | Coroneo |
| 8,167,939 B2 | 5/2012 | Silvestrini et al. |
| 8,172,899 B2 | 5/2012 | Silvestrini et al. |
| 8,262,726 B2 | 9/2012 | Silvestrini et al. |
| 8,337,393 B2 | 12/2012 | Silverstrini et al. |
| 8,353,856 B2 | 1/2013 | Baerveldt |
| 8,372,437 B2 | 2/2013 | Daniel |
| 8,377,122 B2 | 2/2013 | Silvestrini et al. |
| 8,444,588 B2 | 5/2013 | Yablonski |
| 8,444,589 B2 | 5/2013 | Silvestrini |
| 8,535,333 B2 | 9/2013 | de Juan, Jr. et al. |
| 8,574,294 B2 | 11/2013 | Silvestrini et al. |
| 8,617,139 B2 | 12/2013 | Silvestrini et al. |
| 8,672,870 B2 | 3/2014 | Silvestrini et al. |
| 8,721,656 B2 | 5/2014 | De Juan, Jr. et al. |
| 8,728,021 B2 | 5/2014 | Theodore Coroneo |
| 8,734,378 B2 | 5/2014 | De Juan, Jr. et al. |
| 8,758,289 B2 | 6/2014 | Theodore Coroneo |
| 8,758,290 B2 | 6/2014 | Horvath et al. |
| 8,771,218 B2 | 7/2014 | Coroneo |
| 8,801,649 B2 | 8/2014 | De Juan, Jr. et al. |
| 8,808,219 B2 | 8/2014 | Bergheim et al. |
| 8,814,819 B2 | 8/2014 | De Juan, Jr. et al. |
| 8,852,137 B2 | 10/2014 | Horvath et al. |
| 8,932,205 B2 | 1/2015 | Silvestrini et al. |
| 8,945,038 B2 | 2/2015 | Yablonski |
| 8,961,617 B2 | 2/2015 | Young |
| 8,974,511 B2 | 3/2015 | Horvath et al. |
| 9,155,656 B2 | 10/2015 | Schaller et al. |
| 9,173,774 B2 | 11/2015 | Yaron et al. |
| 9,192,516 B2 | 11/2015 | Horvath et al. |
| 9,216,107 B2 | 12/2015 | Silvestrini et al. |
| 9,241,832 B2 | 1/2016 | Schaller et al. |
| 9,351,873 B2 | 5/2016 | Coroneo |
| 9,398,977 B2 | 7/2016 | de Juan, Jr. et al. |
| 9,421,130 B2 | 8/2016 | de Juan, Jr. |
| 9,549,845 B2 | 1/2017 | de Juan, Jr. et al. |
| 9,554,940 B2 | 1/2017 | Haffner et al. |
| 9,554,941 B2 | 1/2017 | Silvestrini et al. |
| 9,585,789 B2 | 3/2017 | Silvestrini et al. |
| 9,592,151 B2 | 3/2017 | Rangel-Friedman et al. |
| 9,636,254 B2 | 5/2017 | Yu et al. |
| 9,763,828 B2 | 9/2017 | Silvestrini et al. |
| 9,788,999 B2 | 10/2017 | Schaller |
| 9,789,000 B2 | 10/2017 | de Juan, Jr. et al. |
| 9,877,866 B2 | 1/2018 | Horvath et al. |
| 9,907,697 B2 | 3/2018 | Schaller et al. |
| 9,962,290 B2 | 5/2018 | Burns et al. |
| 9,987,472 B2 | 6/2018 | Tu et al. |
| 10,085,633 B2 | 10/2018 | Schaller et al. |
| 10,154,924 B2 | 12/2018 | Clauson et al. |
| 10,159,600 B2 | 12/2018 | Horvath et al. |
| 10,188,551 B2 | 1/2019 | Rangel-Friedman et al. |
| 10,285,853 B2 | 5/2019 | Rangel-Friedman et al. |
| 10,406,030 B2 | 9/2019 | Badawi et al. |
| 10,531,983 B2 | 1/2020 | Silvestrini et al. |
| 10,617,558 B2 | 4/2020 | Schieber et al. |
| 10,695,218 B1 | 6/2020 | Ianchulev |
| 10,888,460 B2 | 1/2021 | Sorensen et al. |
| 10,905,591 B1 | 2/2021 | Ianchulev |
| 10,940,087 B2 | 3/2021 | Thorne et al. |
| 11,045,355 B2 | 6/2021 | Ianchulev |
| 11,376,040 B2 | 7/2022 | Kalina, Jr. et al. |
| 11,426,307 B2 | 8/2022 | Jacob |
| 11,517,476 B2 | 12/2022 | Pinchuk |
| 2002/0133168 A1 | 9/2002 | Smedley et al. |
| 2002/0193886 A1 | 12/2002 | Claeson et al. |
| 2003/0139809 A1 | 7/2003 | Worst et al. |
| 2004/0167623 A1 | 8/2004 | Peyman |
| 2004/0254520 A1 | 12/2004 | Porteous et al. |
| 2007/0179455 A1 | 8/2007 | Geliebter et al. |
| 2007/0219564 A1 | 9/2007 | Rue et al. |
| 2008/0208176 A1 | 8/2008 | Loh |
| 2008/0221501 A1 | 9/2008 | Cote et al. |
| 2009/0143712 A1 | 6/2009 | Tu et al. |
| 2010/0125237 A1 | 5/2010 | Schocket |
| 2011/0112546 A1 | 5/2011 | Juan, Jr. et al. |
| 2012/0035743 A1 | 2/2012 | Young et al. |
| 2014/0236066 A1 | 8/2014 | Horvath et al. |
| 2014/0379015 A1 | 12/2014 | Sorensen et al. |
| 2015/0065940 A1 | 3/2015 | Rangel-Friedman et al. |
| 2015/0238687 A1 | 8/2015 | Novakovic et al. |
| 2017/0095369 A1 | 4/2017 | Andino et al. |
| 2017/0258727 A1 | 9/2017 | Tseng et al. |
| 2018/0036173 A1 | 2/2018 | Olson et al. |
| 2019/0038399 A1 | 2/2019 | Muller |
| 2019/0336335 A1 | 11/2019 | de Juan, Jr. et al. |
| 2020/0390601 A1 | 12/2020 | Ianchulev |
| 2020/0390602 A1 | 12/2020 | Ianchulev |
| 2021/0022919 A1 | 1/2021 | Ianchulev |
| 2021/0196516 A1 | 7/2021 | Ianchulev |
| 2021/0290435 A1 | 9/2021 | Ianchulev |
| 2021/0361484 A1 | 11/2021 | Ianchulev |
| 2022/0001085 A1 | 1/2022 | Shi et al. |
| 2022/0378612 A1 | 12/2022 | Badawi et al. |
| 2022/0395397 A1 | 12/2022 | Chu |
| 2023/0082713 A1 | 3/2023 | Ianchulev et al. |
| 2023/0101775 A1 | 3/2023 | Detry et al. |
| 2023/0248569 A1 | 8/2023 | Vandiest et al. |
| 2023/0255807 A1 | 8/2023 | Detry et al. |

FOREIGN PATENT DOCUMENTS

| | | |
|---|---|---|
| CN | 101099695 A | 1/2008 |
| CN | 102431830 A | 5/2012 |
| CN | 102481404 A | 5/2012 |
| CN | 104540472 A | 4/2015 |
| CN | 105236005 A | 1/2016 |
| CN | 105434103 A | 3/2016 |
| CN | 107847243 A | 3/2018 |
| CN | 109561987 A | 4/2019 |
| EP | 1268139 B1 | 10/2004 |
| GB | 2551102 A | 12/2017 |

(56) References Cited

FOREIGN PATENT DOCUMENTS

| JP | 2013-059677 A | 4/2013 |
| KR | 10-2114787 B1 | 5/2020 |
| WO | WO-2014/089548 A1 | 6/2014 |

OTHER PUBLICATIONS

Einmahl et al. (2002). "Evaluation of a novel biomaterial in the suprachoroidal space of the rabbit eye." Invest Ophthalmol Vis Sci. 43:1533-1539.
Karlen et al. (Jan. 1999). "Deep sclerectomy with collagen implant: medium term results." Br. J. Ophthalmol, 83(1):6-11.
Krejcí L. (1974). "Microdrainage of anterior chamber of eye glaucoma operation using hydron capillary drain." Acta Univ Carol Med Monogr. (61):1-90.
Larrañeta, E. et al. (2018). "Synthesis and characterization of hyaluronic acid hydrogels crosslinked using a solvent-free process for potential biomedical applications." Carbohydrate Polymers, 181, 1194-1205. https://doi.org/10.1016/j.carbpol.2017.12.015.
Nesterov, A.P. et al. (1979). "Surgical stimulation of the uveoscleral outflow. Experimental studies on enucleated human eyes." Acta Opthalmol (Copenh) Jun. 57(3):409-17.
Regulatory Considerations for Human Cells, Tissues, and Cellular and Tissue-Based Products: Minimal Manipulation and Homologous Use. *Guidance for Industry and Food and Drug Administration Staff.* (Jul. 2020). 28 pages. www.fda.gov/regulatory-information/search-fda-guidance-documents/regulatory-considerations-human-cells-tissues-and-cellular-and-tissue-based-products-minimal. Web. Dec. 6, 2022.
U.S. Appl. No. 17/178,066, filed Feb. 17, 2021, US 20210196516 A1.
U.S. Appl. No. 17/325,785, filed May 20, 2021, US 20210361484 A1.
U.S. Appl. No. 17/865,059, filed Jul. 14, 2022, US 20230009442 A1.
U.S. Appl. No. 17/941,307, filed Sep. 9, 2022, US 20230082713 A1.
U.S. Appl. No. 18/430,141, filed Feb. 1, 2024, US 20240164943 A1.
U.S. Appl. No. 18/651,341, filed Apr. 30, 2024, US 20240277524 A1.
PCT/US2023/80677, Nov. 21, 2023, WO 2024/112747.
Nesterov, AP et al. (1978). " Implantation of a scleral strip into the supraciliary space and cyclodialysis in glaucoma." Acta Ophthalmol (Copenh) 56(5):697-704.
U.S. Appl. No. 16/777,648, filed Jan. 30, 2020, US 20200390601 A1.
PCT/US22/42856, Sep. 8, 2022, WO 2023/039031 A1.
PCT/US22/43002, Sep. 8, 2022, WO 2023/039133 A1.
Sun S.Y. et al. (2008). "Therapeutic experience of avoiding faulty formation of anterior chamber after glaucoma operation." International Journal of Ophthalmology, 8(4); 838-840. [English abstract].
Zhao, C. et al. (2004). "Clinical observation of different implants in non-penetrating trabecular surgery," Journal of Clinical Ophthalmology, 04 Aug. 5, 2004; 356-358.[English abstract].

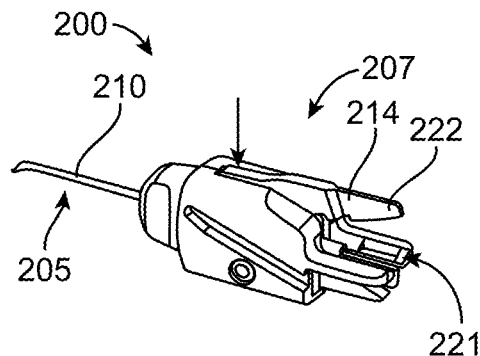
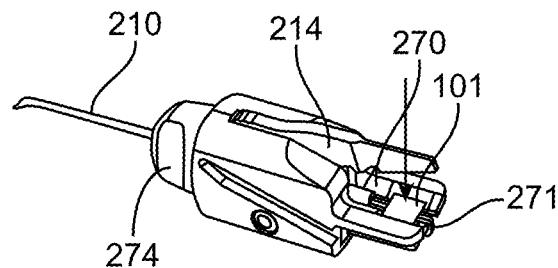
FIG. 7A  FIG. 7B
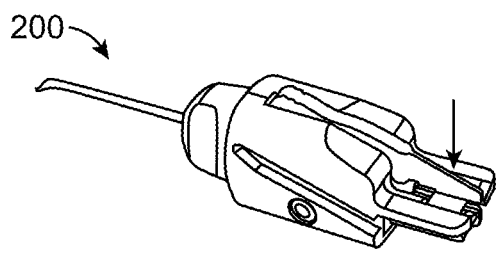
FIG. 7C
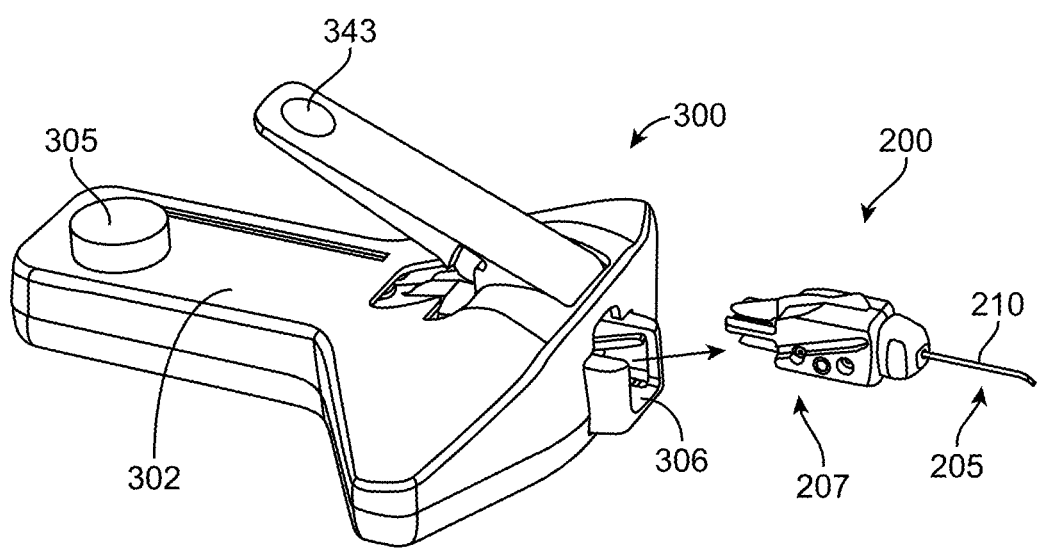
FIG. 8

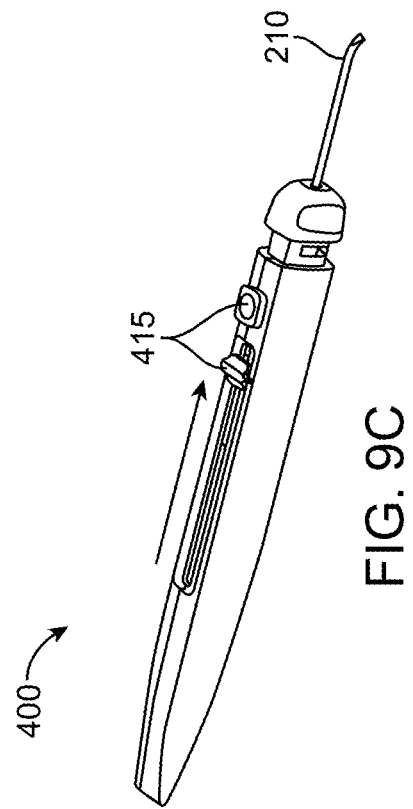
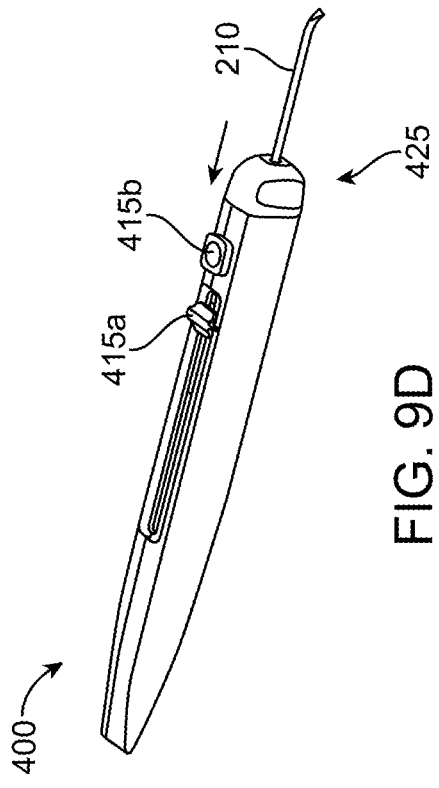
FIG. 9A
FIG. 9C
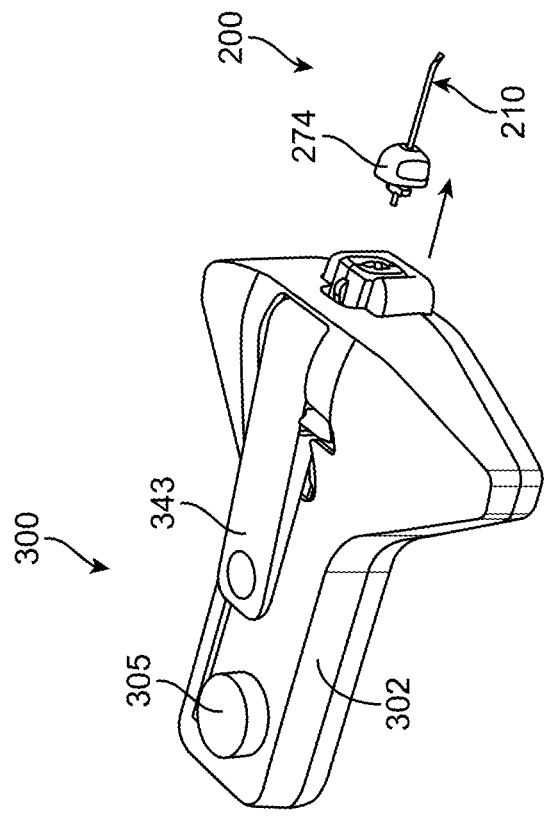
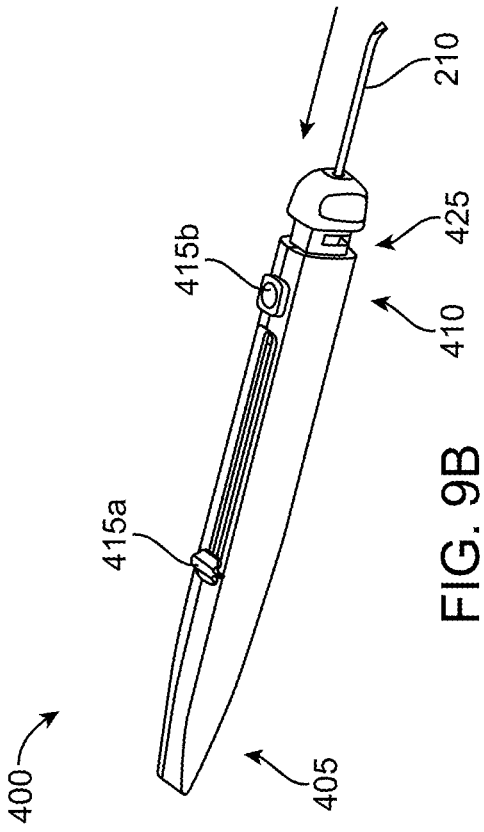
FIG. 9B
FIG. 9D

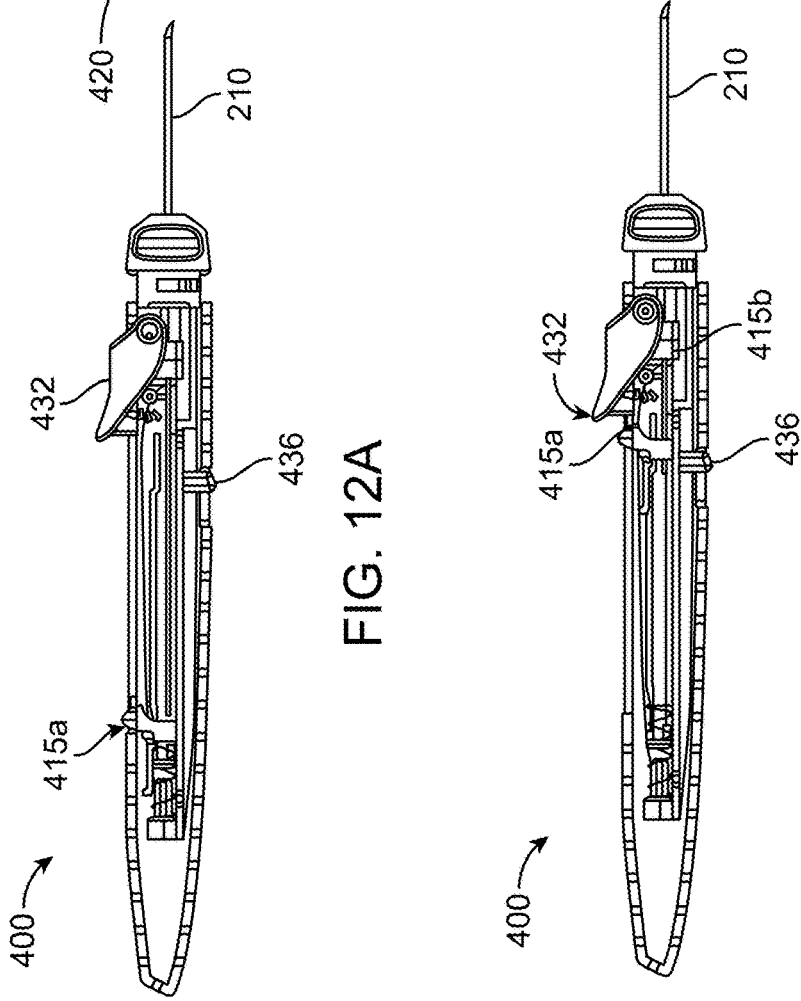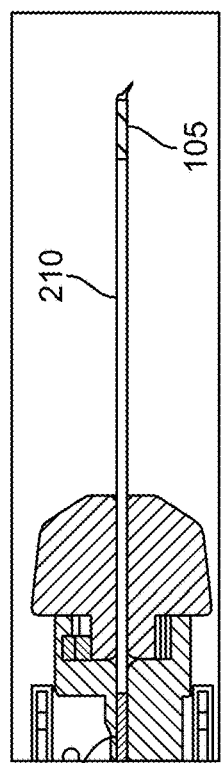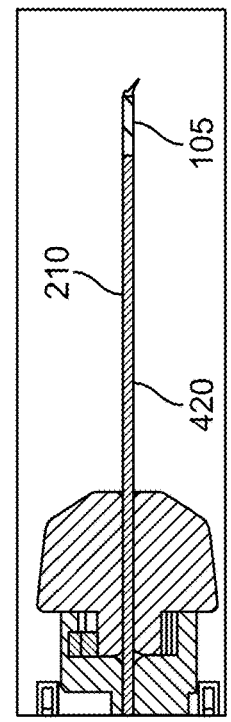

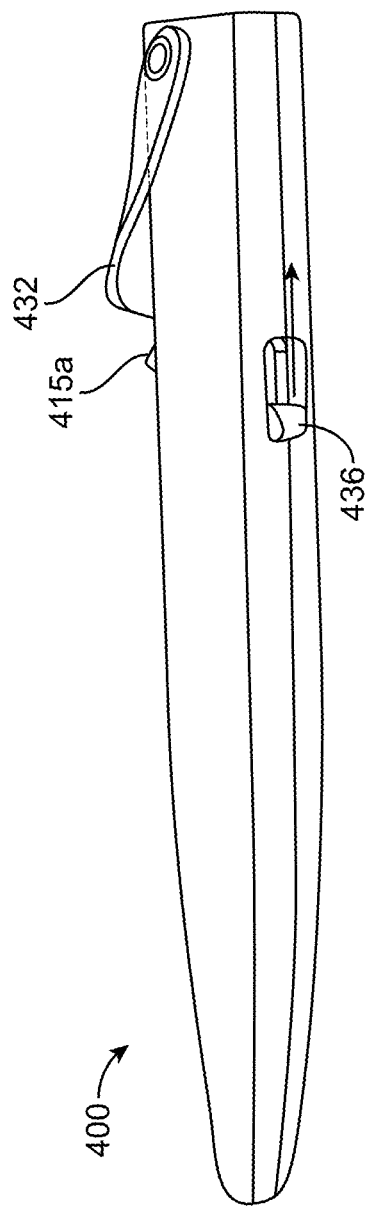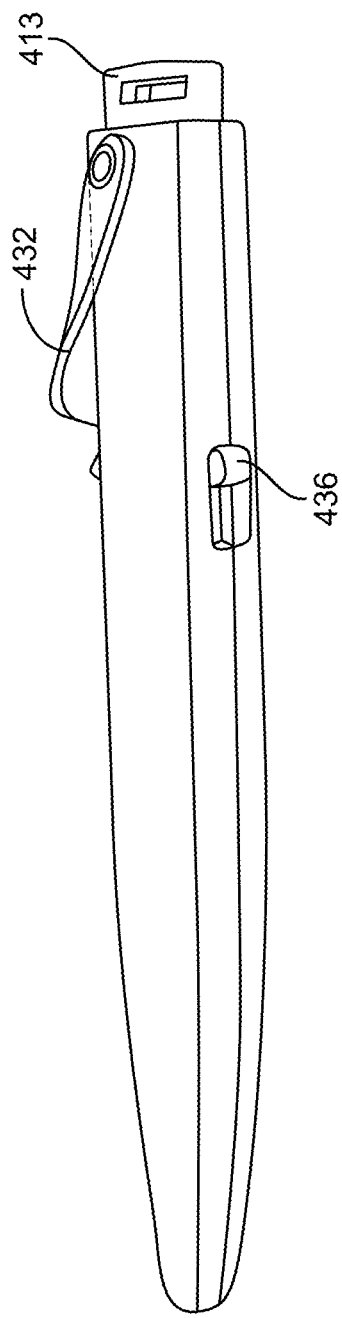
FIG. 13A
FIG. 13B

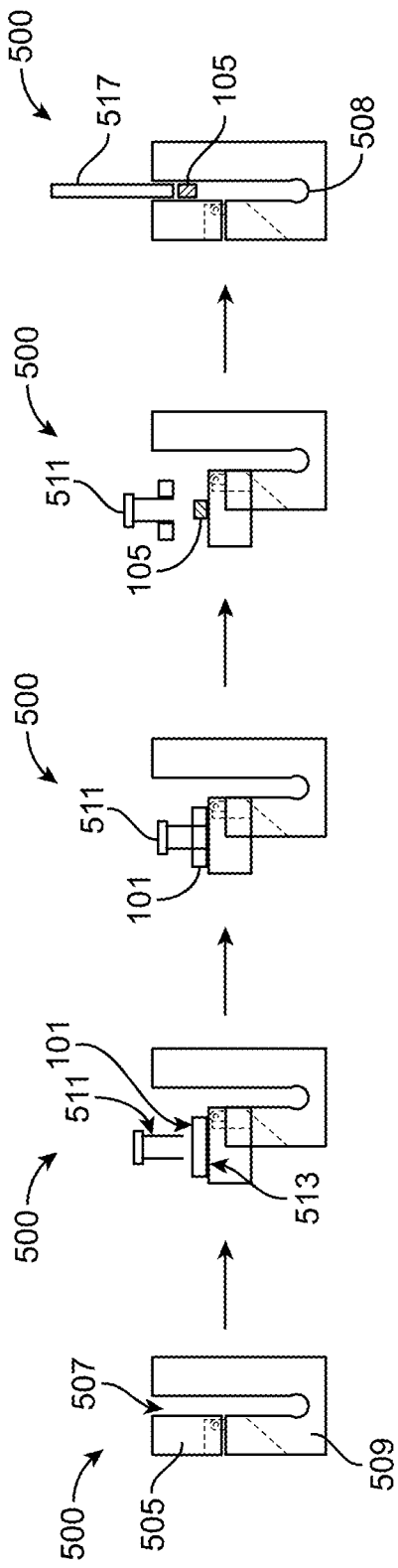
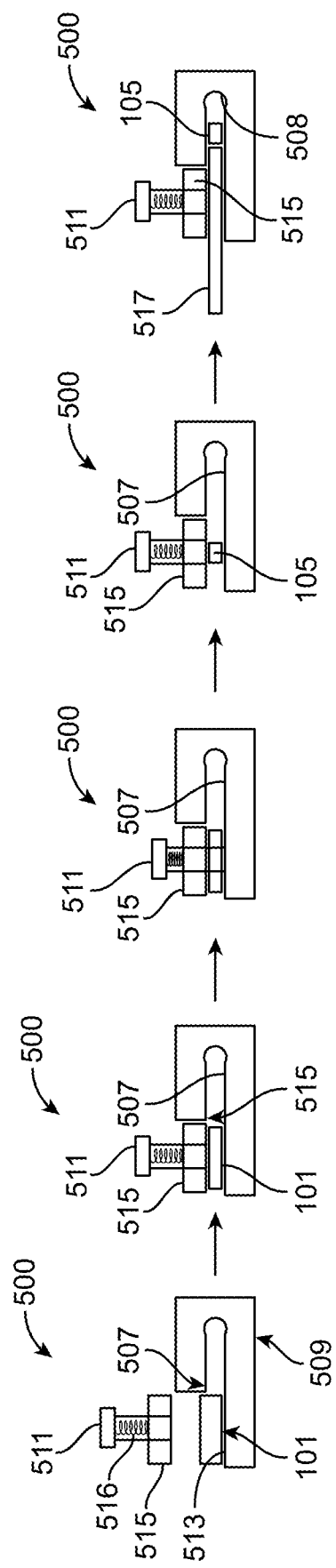
FIG. 14A
FIG. 14B

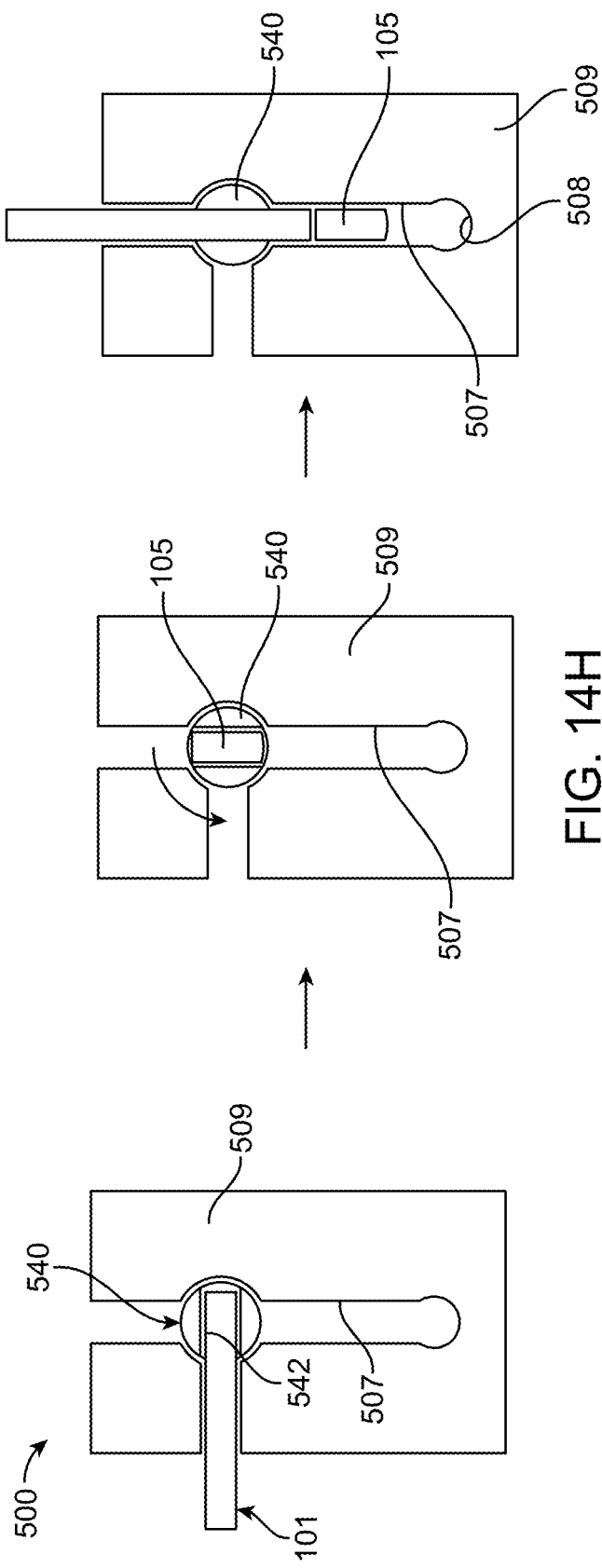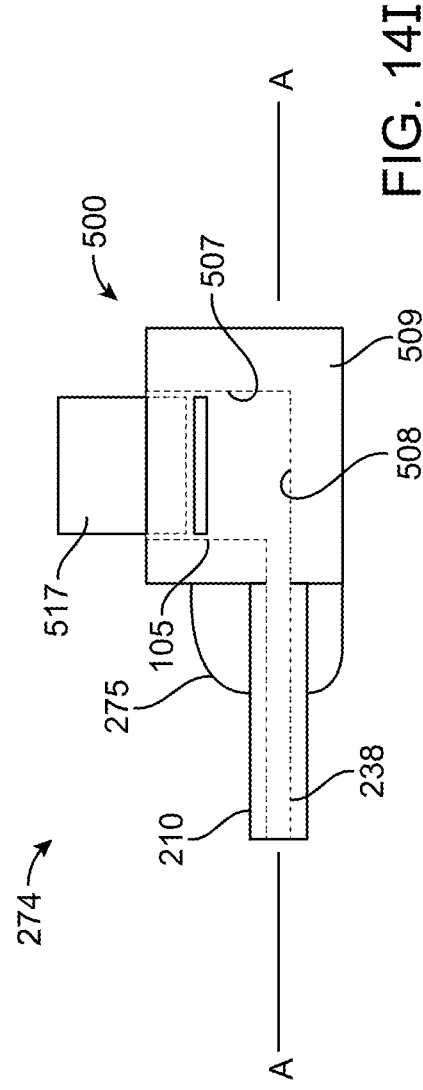

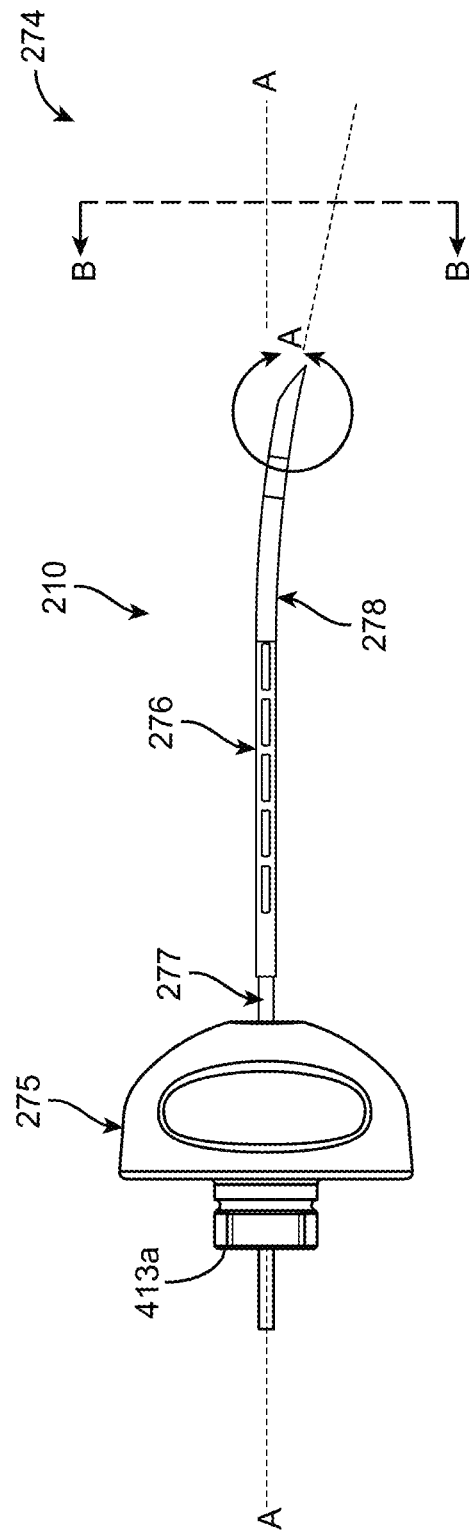
FIG. 16A
FIG. 16B
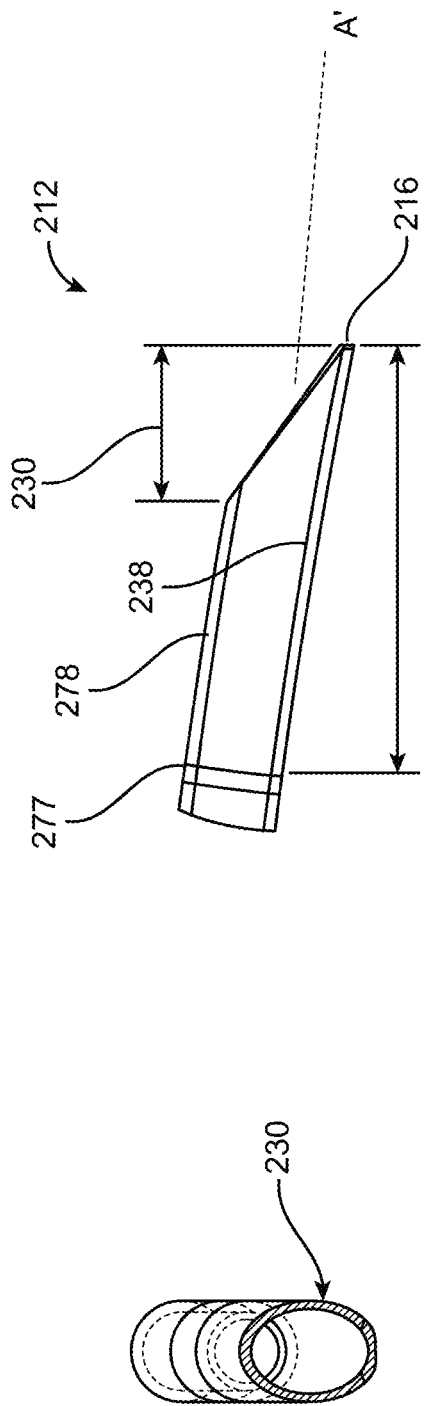
FIG. 16C

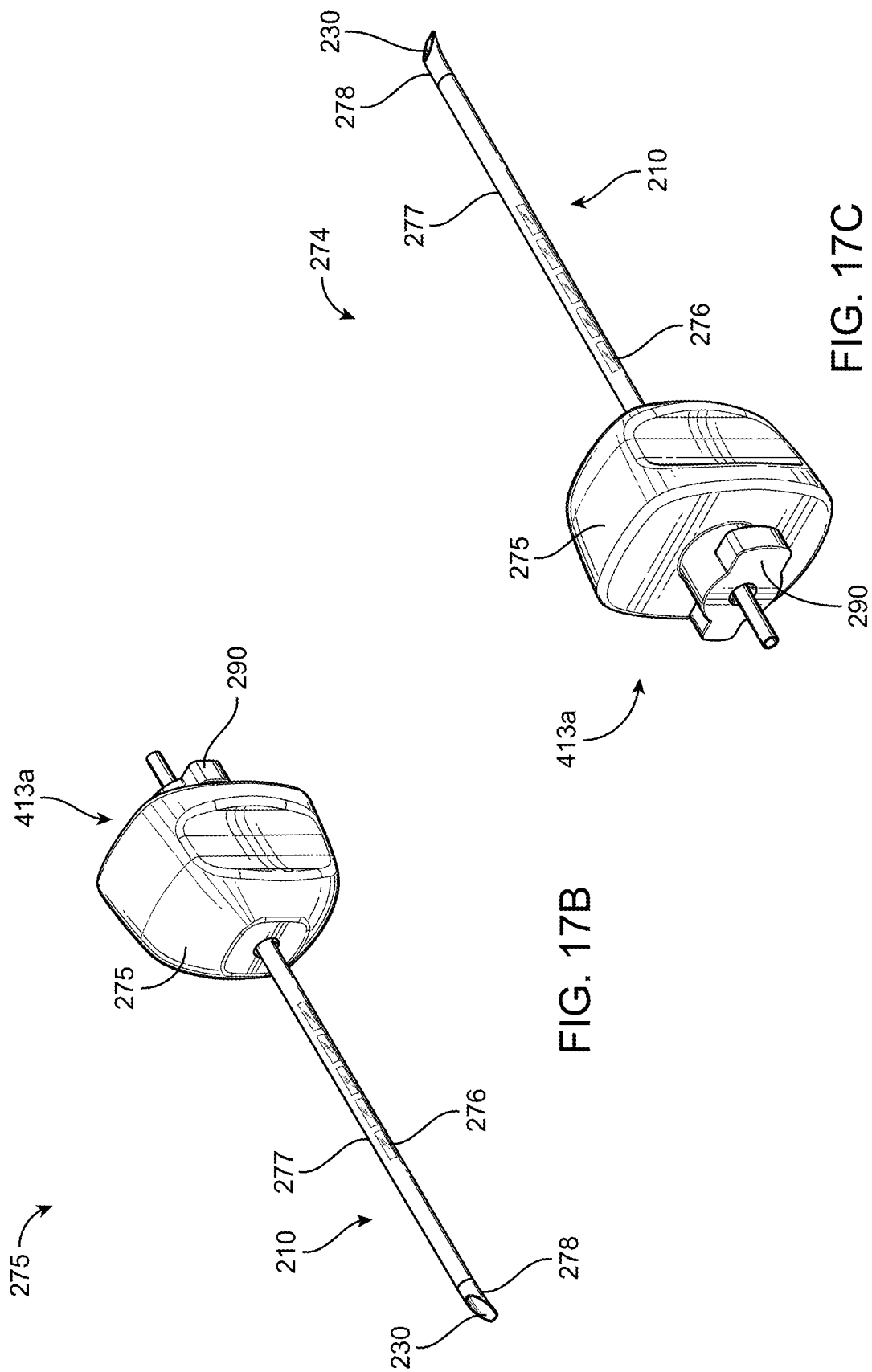

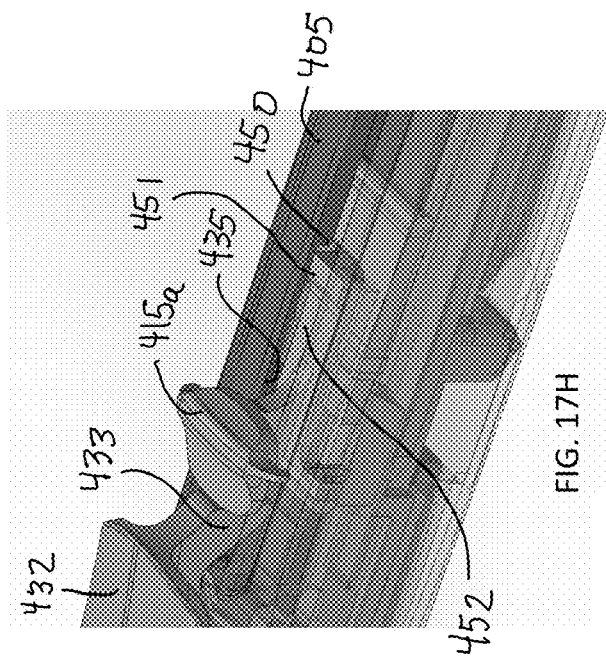
FIG. 17H
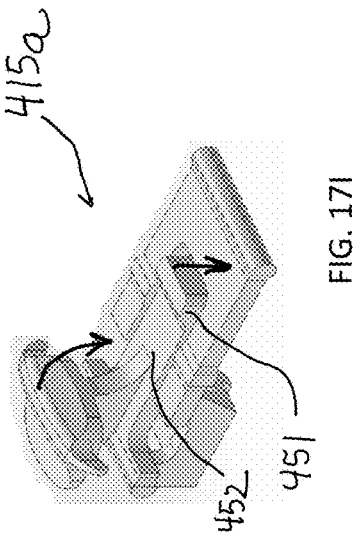
FIG. 17I
FIG. 17F
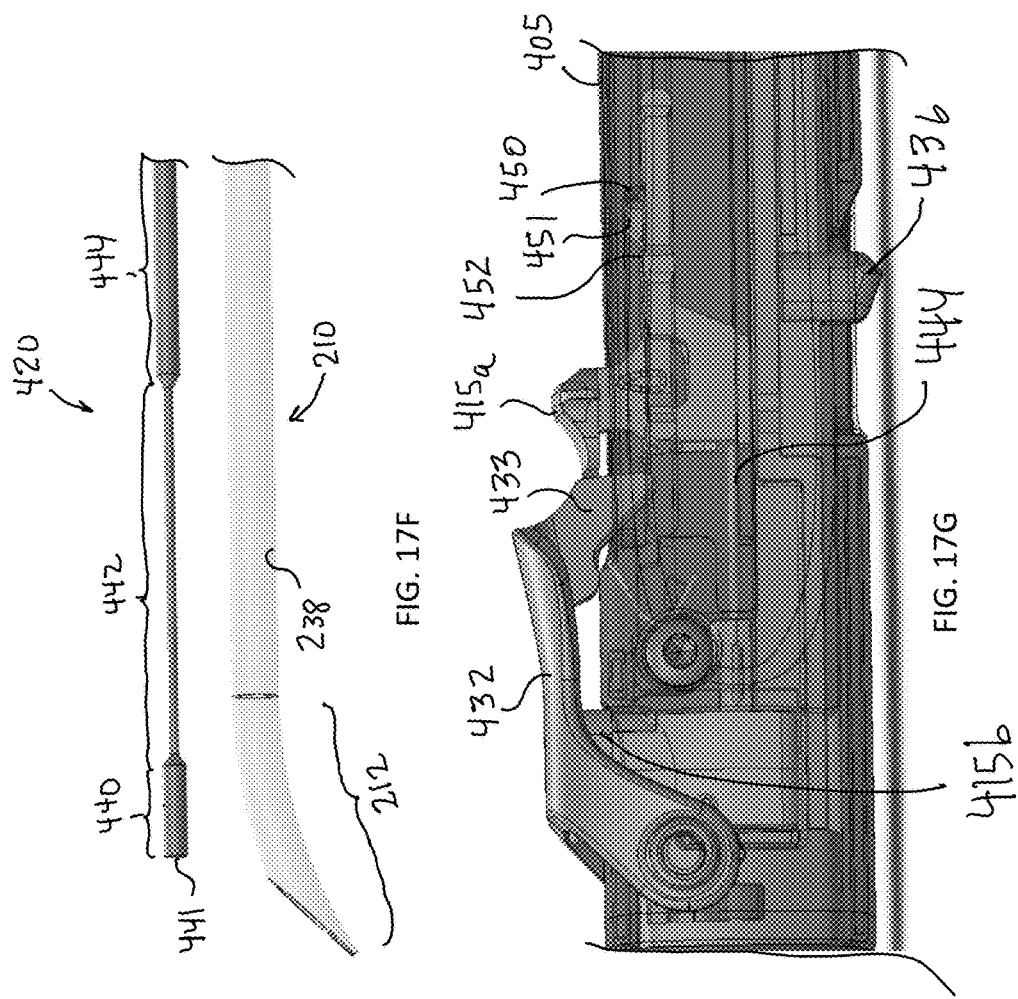
FIG. 17G

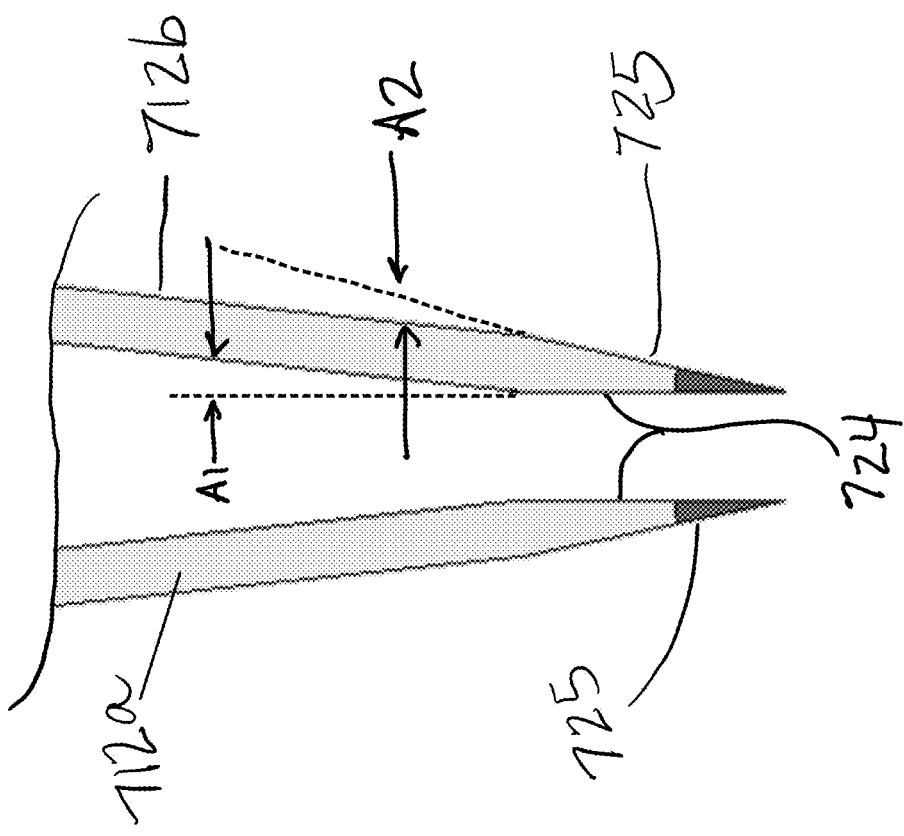
FIG. 22C
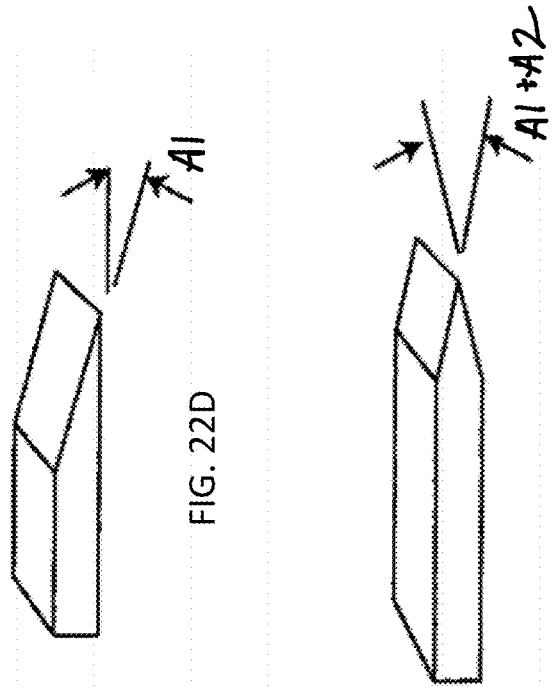
FIG. 22D
FIG. 22E

SYSTEM FOR SHAPING AND IMPLANTING BIOLOGIC INTRAOCULAR STENT FOR INCREASED AQUEOUS OUTFLOW AND LOWERING OF INTRAOCULAR PRESSURE

CROSS-REFERENCE TO RELATED APPLICATIONS

This application claims the benefit of priority under 35 U.S.C. § 119(e) to Provisional Patent Application Serial Nos. 63/241,713 filed Sep. 8, 2021, 63/252,753 filed Oct. 6, 2021, and 63/271,639, filed Oct. 25, 2021. The disclosures of the provisional applications are incorporated by reference in their entireties.

This application is also a continuation-in-part of U.S. application Ser. No. 17/325,785, filed May 20, 2021, which claims the benefit of priority under 35 U.S.C. § 119(e) to U.S. Provisional Patent Application Serial Nos. 63/027,689, filed May 20, 2020, and 63/163,623, filed Mar. 19, 2021. The disclosures of the applications are incorporated by reference in their entireties.

BACKGROUND

The mainstay of ophthalmic surgery for glaucoma is the enhancement of aqueous outflow from the eye. There are various approaches to such surgery, including: 1) ab externo trabeculectomy or shunting, which requires cutting the conjunctiva and the sclera to penetrate the eye and provide a trans-scleral outflow path; 2) ab interno trabecular or trans-scleral outflow stenting or shunting of aqueous with hardware-based implantable devices or with ablating, non-implantable cutters such as dual-blade and trabectome; and 3) ab interno supraciliary stenting using implantable non-biological hardware implants.

Current ab interno stenting devices and methods are based on non-biological hardware materials such as polyimide, polyethersulphone, titanium, poly styrene-blocks-isobutylene-block-styrene and others. There are significant drawbacks with such non-biological hardware-based implantable devices as such devices can lead to major erosion, fibrosis and ocular tissue damage such as endothelial cell loss.

In view of the foregoing, there is a need for improved devices and methods related to ophthalmic surgery for the treatment of glaucoma.

SUMMARY

In an aspect, described is a system for deploying an implant cut from a biological tissue into an eye of a patient including a delivery device having a proximal housing; at least one actuator; and a distal coupler. The system includes a nose cone assembly having a nose cone having a proximal end region and a distal end region; a coupler on the proximal end region of the nose cone configured to reversibly engage with the distal coupler of the delivery device; and a tubular shaft projecting from the distal end region of the nose cone and having a lumen. The tubular shaft has one or more fenestrations extending through a side wall of the shaft, the one or more fenestrations covered by a material that is translucent or transparent so as to reveal the lumen of the tubular shaft.

In an interrelated aspect, described is a device for minimal modification of a biologically-derived tissue including two blades spaced apart by a gap, each blade having an inner face and at least one distal bevel forming a cutting edge. The two blades are mounted at an angle relative to one another so that the inner faces are non-parallel and the distal bevels are parallel to one another. The device is configured to cut the biologically-derived tissue into an elongated strip having a length and a width, wherein the length is greater than the width.

In an interrelated aspect, described is a cartridge for use with a system for preparation of an implant and ab interno insertion of the implant into an eye. The cartridge includes a lower component having a planar upper surface sized and shaped to receive a patch of material to be cut into an implant; an upper component movably coupled to the lower component between an open configuration and a closed configuration, the upper component having a lower surface arranged to oppose the upper surface of the lower component when the upper component is in the closed configuration; and a pair of blades configured to extend below the lower surface of the upper component to cut the patch of material into the implant.

In an interrelated aspect, described is a system for preparing an implant for implantation into, and of inserting the implant into an eye of a patient. The system including a cartridge configured to contain a patch of a material and having a pair of blades configured to cut the patch to form an implant from the patch; and a delivery instrument having a housing and a distal portion sized and shaped for insertion into an anterior chamber of the eye. The distal portion has a lumen with an elongate tubular member sized to receive the implant cut from the patch with the pair of blades.

In an interrelated aspect, described is a system for preparing an implant for implantation into, and of inserting the implant into an eye of a patient. The system includes a cartridge configured to contain and hold a material within the cartridge; at least one cutting member configured to cut the material to form an implant from the material; and a delivery instrument having a housing and a distal portion sized and shaped for insertion into an anterior chamber of the eye, wherein the distal portion comprises a lumen with an elongate tubular member.

In an interrelated aspect, described is a system for preparation of an implant and ab interno insertion of the implant into an eye. The system includes a blade cartridge configured to be moved between an open configuration for loading a patch of a material in the cartridge and a closed configuration. The cartridge includes a lower component having an upper surface configured to receive the patch of material; an upper component having a lower surface configured to abut against the patch of material when the cartridge is in the closed configuration; and a pair of blades and a spacer defining a gap between the blades. The pair of blades is configured to extend below the lower surface of the upper component to penetrate the patch of the material at two locations to form a strip of the material having a width narrower than a width of the patch of the material upon moving the blade cartridge into the closed configuration.

In an interrelated aspect, described is a system for deploying an implant cut from a biological tissue into an eye of a patient. The system includes a delivery device having a proximal housing; at least one actuator coupled to a push rod; and a distal coupler. The system includes a nose cone assembly having a nose cone having a proximal end region and a distal end region; a coupler on the proximal end region of the nose cone configured to reversibly engage with the distal coupler of the delivery device; and a tubular shaft projecting from the distal end region of the nose cone and comprising a lumen, the tubular shaft comprising a distal end region and a proximal end region. The distal end region curves away from a longitudinal axis of the proximal end region.

In some variations, one or more of the following can optionally be included in any feasible combination in the above methods, apparatus, devices, and systems. More details are set forth in the accompanying drawings and the description below. Other features and advantages will be apparent from the description and drawings.

BRIEF DESCRIPTION OF THE DRAWINGS

These and other aspects will now be described in detail with reference to the following drawings. Generally, the figures are not to scale in absolute terms or comparatively, but are intended to be illustrative. Also, relative placement of features and elements may be modified for the purpose of illustrative clarity.

FIGS. 7A and 7B illustrate the tissue cartridge of FIG. 6 having a cover in a loading configuration;

FIG. 7C illustrates the tissue cartridge of FIGS. 7A-7B with the cover installed;

FIG. 8 illustrates the cutting device and tissue cartridge of FIG. 6;

FIG. 9A illustrates an implementation of the cutting device having the tissue cartridge installed, the cutter in the cut configuration, and a nose cone of the tissue cartridge detached;

FIG. 9B illustrates an implementation of a delivery device having the nose cone of the tissue cartridge engaged and the pusher in the retracted configuration;

FIG. 9C illustrates the delivery device of FIG. 9B with the pusher advanced to the primed configuration;

FIG. 9D illustrates the delivery device of FIG. 9C with the nose cone retracted relative to the pusher;

FIGS. 12A-12B are cross-sectional views of the delivery device of FIG. 10A showing the first, retracted position of FIG. 11A;

FIGS. 12C-12D are cross-sectional views of the delivery device of FIG. 10A showing the second, primed position of FIG. 11B;

FIGS. 13A-13B illustrate a reset mechanism of the delivery device of FIG. 10A;

FIGS. 14A-14H illustrate stages of use for different implementations of a cutting assembly for cutting and transferring a stent to a portion of the tissue cartridge;

FIG. 14I illustrates in schematic an implementation of a nose cone assembly coupled to a cutting assembly;

FIG. 16A is a side view of an implementation of a nose cone assembly;

FIG. 16B is a distal end view of the distal tip taken along arrows B-B in FIG. 16A;

FIG. 16C is a detail view of the distal end region of the distal shaft of FIG. 16A taken at circle A;

FIGS. 17B-17C illustrate the nose cone assembly of FIG. 16A for coupling with the proximal housing of FIG. 17A from a front end view and a back end view, respectively;

FIG. 17F illustrates a detail, exploded view of a distal shaft and a push rod;

FIGS. 17G-17H are partial, transparent views of an actuator in a primed position;

FIG. 17I is a perspective view of the actuator having a flexure;

FIG. 22C is a detailed view of the cutting edge of the blades of FIG. 22B taken at circle C;

FIG. 22D shows a single bevel blade;

FIG. 22E shows a dual bevel blade;

Figure 1A:
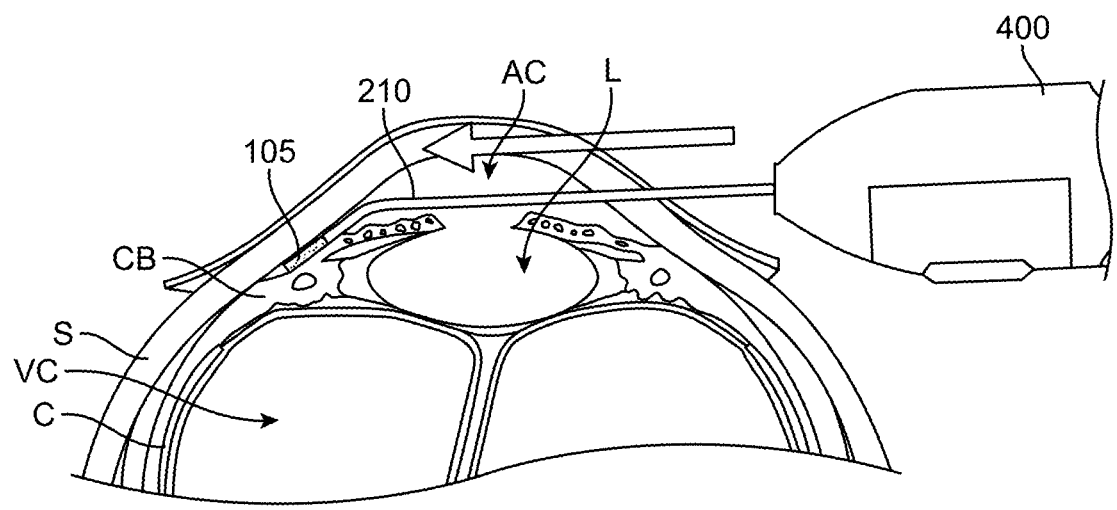
FIGS. 1A-1B are cross-sectional views of a human eye showing the anterior and vitreous chambers of the eye with a stent being positioned in the eye in an example location.

It should be appreciated that the drawings are for example only and are not meant to be to scale. It is to be understood that devices described herein may include features not necessarily depicted in each figure.

DETAILED DESCRIPTION

Disclosed are implants, systems, and methods for increasing aqueous outflow from the anterior chamber of an eye. As will be described in detail below, ab interno outflow stenting using biological, cell-based or tissue-based materials provides biocompatible aqueous outflow enhancement with improved tolerability and safety over conventional shunts. In an example implementation, a biologic tissue or biologically-derived material is harvested or generated in vitro and formed into an implant, also referred to herein as a stent, using a cutting device, also referred to herein as a trephining device or cutting tool. In an implementation, the stent is an elongated body or material that has an internal lumen to provide a pathway for drainage. In a preferred implementation, the stent is an elongated body or strip of tissue that does not have an internal lumen and is configured to maintain the cleft and provide supraciliary stenting (or stenting within another anatomical location such as within Schlemm's Canal or trans-scleral). Lumen-based devices can be limited by the lumen acting as a tract for fibrotic occlusion. The stent formed from the tissue is then implanted into the eye via an ab interno delivery pathway to provide aqueous outflow from the anterior chamber. The stents described herein can be used as a phacoemulsification adjunct or stand-alone treatment to glaucoma as a micro-invasive glaucoma surgery (MIGS) treatment.

Use of the terms like stent, implant, shunt, bio-tissue, or tissue is not intended to be limiting to any one structure or material. The structure implanted can, but need not be a material that is absorbed substantially into the eye tissue after placement in the eye such that, once absorbed, a space may remain where the structure was previously located. The structure once implanted may also remain in place for an extended period and not substantially erode or absorb.

As will be described in more detail below, the stents described herein can be made from biologically-derived material that does not cause toxic or injurious effects once implanted in a patient.

The term "biologically-derived material" includes naturally-occurring biological materials and synthesized biological materials and combinations thereof that are suitable for implantation into the eye. Biologically-derived material includes a material that is a natural biostructure having a biological arrangement naturally found within a mammalian subject including organs or parts of organs formed of tissues, and tissues formed of materials grouped together according to structure and function. Biologically-derived material includes tissues such as corneal, scleral, or cartilaginous tissues. Tissues considered herein can include any of a variety of tissues including muscle, epithelial, connective, and nervous tissues. Biologically-derived material includes tissue harvested from a donor or the patient, organs, parts of organs, and tissues from a subject including a piece of tissue suitable for transplant including an autograft, allograft, and xenograft material. Biologically-derived material includes naturally-occurring biological material including any material naturally found in the body of a mammal. Biologically-derived material as used herein also includes material that is engineered to have a biological arrangement similar to a natural biostructure. For example, the material can be synthesized using in vitro techniques such as by seeding a three-dimensional scaffold or matrix with appropriate cells, engineered or 3D printing material to form a bio-construct suitable for implantation. Biologically-derived material as used herein also includes material that is cell-derived including stem cell(s)-derived material. In some implementations, the biologically-derived material includes an injectable hyaluronate hydrogels or viscomaterials such as GEL-ONE Cross-linked Hyaluronate (Zimmer).

Biologically-derived materials can include naturally-occurring biological tissue including any material naturally found in the body of a mammal that is minimally manipulated or more than minimally manipulated according to FDA guidance under 21 CFR 1271.3(f) such that the processing of the biological tissue does not alter the relevant biological characteristics of the tissue (see Regulatory Considerations for Human Cells, Tissues, and Cellular and Tissue-Based Products: Minimal Manipulation and Homologous Use, www.fda.gov/regulatory-information/search-fda-guidance-documents/regulatory-considerations-human-cells-tissues-and-cellular-and-tissue-based-products-minimal).

In some implementations, the biostent may be an engineered or 3D printed material formed in the shape of a tube with a lumen extending from a proximal opening to a distal opening. The tube may also be printed to incorporate a plurality of openings throughout. For example, a wall of the printed material can be designed to have a plurality of openings such that a liquid within the lumen can seep or flow outward through the wall of the tube such that the tube is sufficiently porous to ensure drainage of aqueous from the eye. The tube may be printed to have a dimension that is modified at or near the time of delivery. For example, a 3D printed material may be engineered to have a first dimension that is convenient for manipulating manually. At or near the time of delivery, the 3D printed material may be cut to a size more suitable for implantation in the eye. Where a patch of material is described as being cut or trephined into a stent prior to implantation it should be appreciated that the patch of material can be a printed material having a particular 3-dimensional shape (e.g., including tubular) and is cut into a stent by cutting to a shorter, desired length. Thus, in certain implementations, the stents described herein need not be solid and can also incorporate a lumen.

The biologically-derived material, sometimes referred to herein as bio-tissue or bio-material, that is used to form the stent can vary and can be, for example, corneal tissue, scleral tissue, cartilaginous tissue, collagenous tissue, or other firm biologic tissue. The bio-tissue can be of hydrophilic or hydrophobic nature. The bio-tissue can include or be impregnated with one or more therapeutic agents for additional treatment of an eye disease process.

The bio-stent material can be used in combination with one or more therapeutic agents such that it can be used to additionally deliver the agent to the eye. In an implementation, the bio-tissue can be embedded with slow-release pellets or soaked in a therapeutic agent for slow-release delivery to the target tissue.

Non-biologic material includes synthetic materials prepared through artificial synthesis, processing, or manufacture that may be biologically compatible, but that are not cell-based or tissue-based. For example, non-biologic material includes polymers, copolymers, polymer blends, and plastics. Non-biologic material includes inorganic polymers such as silicone rubber, polysiloxanes, polysilanes, and organic polymers such as polyethylene, polypropylene, polyvinyls, polyimide, etc.

Regardless the source or type of biologically-derived material, the material can be cut or trephined into an elongated shape suitable for stenting and implantation in the eye. This cutting process of the tissue can be performed before the surgical implantation process or during the surgical implantation process. The stent(s) implanted in the eye may have a structure and/or permeability that allows for aqueous outflow from the anterior chamber when positioned within a cyclodialysis cleft.

The biologically-derived material can be minimally modified or minimally manipulated tissue for use in the eye. The minimally modified biologically-derived material does not involve the combination of the material with another article, except, for example, water, sterilizing, preserving, cryo-preservatives, storage agent, and/or pharmaceutical or therapeutic agent(s), and the like. The minimally modified biologically-derived material does not have a systemic effect once implanted and is not dependent upon the metabolic activity of any living cells for its primary function. The biologically-derived material can be minimally manipulated during each step of the method of preparation and use so that the original relevant characteristics of the biologic tissue is maintained. The cut stent can be a structural tissue that physically supports or serves as a barrier or conduit, for example, by maintaining at least in part a ciliary cleft formed in the eye. The stent cut from the biologically-derived material can be minimally manipulated such as by compressing, compacting, folding, rolling, or other sort of temporary manipulation of the cut stent that once freed from the forces applying the compression or compaction allows for the material to return towards its original structure. Thus, the minimal manipulation can mechanically change the size or shape of the cut tissue temporarily while still maintaining the original relevant characteristics of the tissue relating to its utility for reconstruction, repair, or replacement once freed from that mechanical change. As an example, the biologically-derived material can be sclera that is cut into a shape that is oversized in relation to an inner diameter of a delivery tube through which the stent is implanted. The minimal manipulation of the cut stent can include temporarily compacting the scleral material into a lumen of the delivery shaft such that after implantation in the eye, the cut stent tends to return towards its original cut size. Although the biologically-derived material is described herein in the context of being cut into a stent like implant that can maintain a cleft for outflow of aqueous, other methods are considered herein. For example, the biologically-derived material can be compressed into a plug that is then implanted in a region of the eye for another purpose such as stenting, occlusion of traumatic ruptures, over-filtering bleb, posterior wall rupture, and other indications.

The minimal structural modification of the biological tissue (e.g., scleral tissue or corneal tissue) or other bio-tissue (cross-linked or not cross-linked) for implantable intraocular use can include a longitudinal trephination into an elongate strip of tissue having a width that is less than its length, for example, that can be more than 2 mm and less than 30 mm in length, as well as between about 0.1 mm and 2.0 mm in thickness, and between about 0.1 mm and 2.0 mm in width prior to loading within a delivery shaft. As will be described in more detail herein, the cutting of the bio-tissue allows for adjustment of the width being cut and can simultaneously compress the bio-tissue to a particular, consistent thickness. The cut bio-tissue can be loaded in a manner that compresses the bio-tissue into a delivery channel for loading into a shuttle such as a nose cone assembly or cartridge as described herein. The loading assembly can include features and linkages that prevent buckling of the pusher as it transfers the bio-tissue from the loader into the shuttle. The cutting, loading, and transfer for delivery can be combined within a single assembly or can be performed by separate assemblies configured to work in conjunction with one another. One or more components of the assemblies described herein can be provided as a ready-to-use item. For example, the bio-tissue can be pre-cut and provided within a preloaded shuttle assembly that is sold as a ready-to-use component or a partially ready-to-use component that is coupled with a delivery hand piece, for example.

Figure 1B:
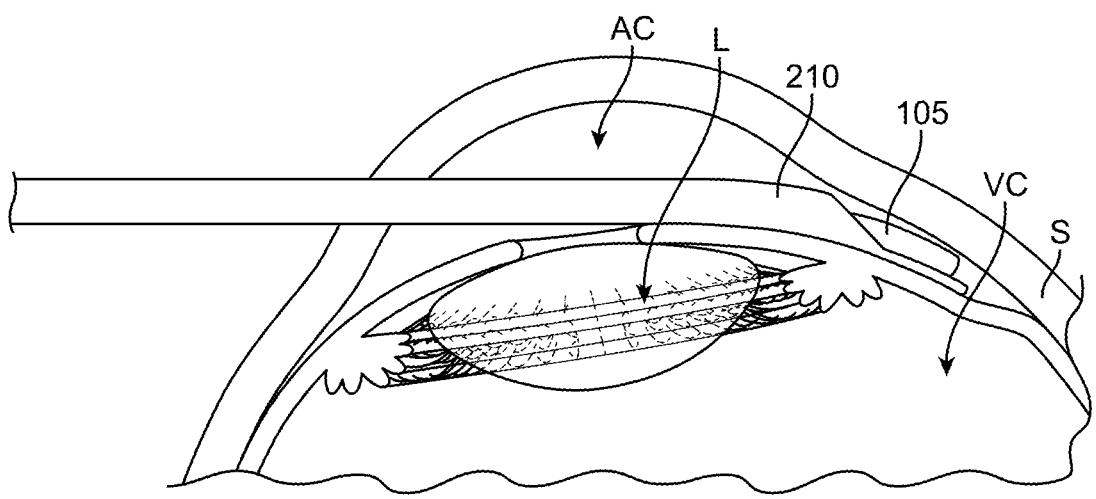

FIGS. 1A-1B are cross-sectional views of a human eye showing the anterior chamber AC and vitreous chamber VC of the eye. A stent 105 can be positioned inside the eye in an implanted location such that at least a first portion of the stent 105 is positioned in the anterior chamber AC and a second portion of the stent 105 is positioned within tissues such as within the supraciliary space and/or suprachoroidal space of the eye. The stent 105 is sized and shaped such that the stent 105 can be positioned in such a configuration. The stent 105 provides or otherwise serves as a passageway for the flow of aqueous humor away from the anterior chamber AC (e.g. to the supraciliary space and/or suprachoroidal space). In FIGS. 1A-1B, the stent 105 is represented schematically as an elongated body relative to a delivery shaft 210. It should be appreciated that the size and shape of the stent 105 can vary. Additionally, the size and shape of the stent 105 prior to insertion within the delivery shaft 210 can change upon insertion into the delivery shaft 210 and can change after deployment from the delivery shaft 210.

The stent 105 can be implanted ab interno, for example, through a clear corneal incision or a scleral incision. The stent can be implanted to create an opening or cleft for augmented outflow communication between the anterior chamber AC and the supraciliary space, the anterior chamber AC and the suprachoroidal space, the anterior chamber AC and Schlemm's Canal, or the anterior chamber AC and the sub-conjunctival space, or any other ocular compartment, tissue or interface where trans-scleral, sub-scleral, or supra-scleral occlusion, stenting, and/or tissue reinforcing are clinically indicated. In a preferred implementation, the stent 105 is implanted such that a distal end is positioned within a supraciliary position and the proximal end is positioned within the anterior chamber AC to provide a supraciliary cleft. The distal end of the stent 105 can be positioned between other anatomical parts of the eye.

Conventional glaucoma stenting devices are typically formed of non-biological materials such as polyimide or other synthetic materials that can cause endothelial tissue damage leading to progressive, long-term, and irreversible corneal endothelial loss. The stent materials described herein can reduce and/or eliminate these risks of tissue damage while still providing enhanced aqueous humor outflow.

The stent 105 described herein can be formed of any of a variety of biologically-derived materials having a permeability and/or structure that allows for aqueous filtration therethrough. The stent 105 can be formed of a biologically-derived material that is harvested, engineered, grown, or otherwise manufactured. The biologically-derived stent material can be obtained or harvested from a patient or from donors. The biologically-derived stent material can be harvested before or during surgery. The biologically-derived stent material can be synthetic bio-tissue created using in vitro techniques. The biologically-derived material can be stem cell generated or bioengineered. The tissue can be generated via in situ cellular or non-cellular growth. In an example implementation, the tissue can be 3D printed during manufacture. The biologically-derived material can be minimally manipulated material and retain its original structural characteristic as a tissue.

The 3D printed tissue can be printed as a larger patch of material that is then cut at the time of surgery as described elsewhere herein. Alternatively, the 3D printed tissue can be printed to have the dimensions of the final implantable stent. In this implementation, the 3D printed material need not be cut before implantation, but can be implanted directly. For example, the 3D printed stent can be printed directly into a cartridge that is configured to operatively couple with the delivery device described herein, which is in turn used to deploy the 3D printed stent into the eye. The 3D printed stent can be generated using the 3D printing process described in *Biofabrication,* 2019; 11 (3).

In an example implementation, the stent 105 is made of a bio-tissue. The biologically-derived material can be corneal tissue and/or non-corneal tissue. The biologically-derived material may include corneal, scleral, collagenous or cartilaginous tissue. In an implementation, the biologically-derived stent material can be denuded corneal stromal tissue without epithelium and endothelium that is porous and has hydrophilic permeability to allow aqueous filtration. The biologically-derived material can be minimally manipulated sclera that retains its original structural characteristic as a tissue. The biologically-derived material of the stent 105 can, but need not be incorporated into the eye's inherent anatomy after placement in the eye. The stent can cause the surrounding tissue to form a pathway that remains open for an extended period, even after absorption of the stent. The biologically-derived stent material may not significantly absorb or be incorporated into the eye's anatomy such that the stent 105 remains implanted for an extended period of time or indefinitely, as needed.

In other implementations, the stent 105 material may be manufactured of a complex carbohydrate or a collagen that is non-inflammatory. The stent 105 may also be formed of a biodegradable or bioabsorbable material including biodegradable polymers including hydroxyaliphatic carboxylic acids, either homo- or copolymers, such as polylactic acid, polyglycolic acid, polylactic glycolic acid; polysaccharides such as cellulose or cellulose derivatives such as ethyl cellulose, cross-linked or uncross-linked sodium carboxymethyl cellulose, sodium carboxymethylcellulose starch, cellulose ethers, cellulose esters such as cellulose acetate, cellulose acetate phthallate, hydroxypropylmethyl cellulose phthallate and calcium alginate, polypropylene, polybutyrates, polycarbonate, acrylate polymers such as polymethacrylates, polyanhydrides, polyvalerates, polycaprolactones such as poly-c-caprolactone, polydimethylsiloxane, polyamides, polyvinylpyrollidone, polyvinylalcohol phthallate, waxes such as paraffin wax and white beeswax, natural oils, shellac, zein, or a mixture. The stent 105 may be formed of hyaluronate hydrogels or viscomaterials.

As mentioned, the biologically-derived stent material can have a permeability or porosity that allows for aqueous filtration for sufficient control or regulation of intraocular pressure. Permeable bio-tissues described herein (e.g. sclera, cornea, collagen, etc.) are preferred stent materials, however, any bio-tissue, even if impermeable, is considered herein as a potential stent material to serve as a structural spacer that keeps the cyclodialysis open. Preferably, the material of the stent can create a gap that allows fluid to flow. The gap created can run longitudinally along each side of the stent. If the material of the stent is permeable, more fluid can pass through the cyclodialysis than if the stent material is impermeable and the fluid is required to pass along the outside of the stent. Thus, the material considered herein need not be porous in order to provide the desired function, however, the function can be enhanced by the porosity of the material.

Generally, the biologically-derived stent material has some firmness and intraocular durability such that it can maintain outflow from the anterior chamber, however, is less stiff than conventional non-biologically-derived polyimide shunts used in the treatment of glaucoma (e.g. CYPASS, Alcon). The stent material may have a sufficient structure to serve as a spacer to prop open a sustained supraciliary outflow. The stent material can maintain its structural height or thickness once implanted within the cyclodialysis such that fluid flow through or around the stent is provided. In some implementations, the cut stent is minimally manipulated by compressing or compacting into a delivery shaft so that the size and/or shape of the cut stent is reduced from a first size into a second, smaller size within the shaft. The delivery shaft can be sized and shaped to be inserted through a cornea (such as a self-sealing incision in a cornea) into the anterior chamber and advanced towards the iridocorneal angle. The delivery shaft can deploy the compacted stent between tissue layers near the angle. Once the compacted stent is deployed from the delivery shaft it can begin to return towards its original shape and/or size. The cut stent, once implanted, can take on a shape and/or size that is smaller from its original shape and/or size or that is the same as its original shape and/or size. The minimally-modified biological tissue can be used to treat glaucoma. Biologically-derived stent material provides advantages in terms of biocompatibility, anatomic conformity, and aqueous permeability compared to conventional non-biological materials such as polyimide. Biologically-derived stent material can provide better conformability and compliance to the scleral wall and can be less likely to cause endothelial and scleral erosion/loss over time and with chronic eye rubbing and blinking.

Typically, allograft tissue for implantation into the eye is handled delicately so as not to modify it from its original state. The cut stents described herein need not be handled so delicately and instead can be minimally-modified by compressing or compacting or otherwise wedging into a smaller space for ab-interno delivery into the eye for intraocular stenting, occlusion, reinforcement through a corneal or scleral incision or puncture (less than about 3.5 mm).

In an implementation, the material used to form the stent is provided as an uncut patch of material configured to be manually loaded within a cartridge 200. The uncut patch of material can also be cut by a cutting assembly that is independent of a cartridge 200 and then transferred into a region of a cartridge 200. As will be discussed in greater detail below, the cutting can be done at the time of surgery or prior to surgery. In certain implementations, the stent is formed by 3D printing and can be printed into a desired final dimension for the stent or can be printed as a patch of material that is then cut at the time of or prior to surgery. The cutting achieved by the devices described herein can provide thin strips of material that can be implanted in the eye to provide regulation of aqueous outflow. The process of cutting or trephining can position the cut implant within a conduit or lumen of the cartridge such that the cut implant held within the cartridge may be subsequently delivered from the delivery device without needing to remove or transfer the cut implant from the cartridge. Alternatively, the cutting can be performed independently of transferring the cut implant into a delivery device. The cutting and transferring of the cut implant into a delivery device can be independent steps performed by independent tools or assemblies. For example, the system can incorporate a first device that is used for cutting the patch of material into a cut implant, a second device used to transfer the cut implant into a delivery device, and a third device used to deploy the cut implant from the delivery device into the eye. It should be appreciated that the cutting, transferring, and deploying can be integrated into a single device or one or more can be independent devices used in conjunction with one another to transition a patch of material into a cut implant for deployment in an eye. In a preferred embodiment, the cutting and transferring of the cut implant are integrated into a first device and the deployment of the cut implant in an eye is in a second device.

The term "patch of material" as used herein refers to a piece of biologically-derived material having a size along at least one dimension that is greater than a size of the stent cut from the patch of material and implanted in the subject. In some implementations, the patch of material can have a generally square shape and the stent cut or trephined from the patch of material can have a generally rectangular shape. For example, the patch of material can be about 7 mm wide×7 mm long×0.55 mm thick and the stent cut from the patch of material can be 0.3–1.0 mm wide×7 mm long×0.55 mm thick. The dimensions of the patch of material and the cut stent can vary. The patch of material prior to cutting can be between about 5 mm to about 10 mm wide, between about 5 mm up to about 10 mm long, and between about 0.25 mm to about 2 mm thick. The stent cut from the patch of material can be between about 0.3 mm up to about 2 mm wide, preferably between 0.7 mm to 1.0 mm wide. The stent cut from the patch of material can be between about 5 mm up to about 10 mm long. The stent cut from the patch of material can be between 0.25 mm to about 2 mm thick. The patch of material and the cut stent can each have the same length and the same thickness, but differ from one another in width. The patch of material and the stent cut from the patch of material can also have different lengths and thicknesses. For example, the patch of material can have a first thickness and the stent cut from the patch of material have the same thickness, but when implanted can be folded or rolled into a different thickness from the patch of material. The cut stent need not be rectangular in shape and can have a non-rectangular shape such as an angular wedge or any of a variety of shapes to provide a particular clinical result. For example, a stent cut to the shape of a "dog bone" having enlarged distal and proximal ends may provide additional fixation within the target tissues. The stent can be cut to have a narrow elongate shape on a leading end and an enlarged dimension on a trailing end to provide ease of insertion as well as at least one end providing fixation.

In some implementations, the patch of material can be a relatively larger width (e.g., 10 mm×10 mm) and the stent cut from the patch to a strip having a much smaller width (e.g., about 1.0 mm to about 1.5 mm) and the cut stent then compacted into a delivery conduit having an inner diameter of about 0.8 mm so that the width of the stent substantially fills the inner diameter. A stent can substantially fill the inner diameter of the delivery conduit even if the stent is not oversized relative to that conduit and thus, remains uncompacted. The stent can be oversized relative to the inner dimension of the conduit and be compacted into the conduit to substantially fill it. Additionally, the dimension of the cut stent can vary depending on the dimension of the conduit the stent is to be deployed through. For example, the inner diameter of the delivery conduit can be about 600 microns to about 800 microns. Thus, the stent can be cut or trephined to any of a variety of sizes depending on whether or not the stent is to be compacted into the delivery conduit and depending upon the inner dimension of that delivery conduit.

The stent cut from the patch of material can have a width, a length, and a thickness. In an implementation, the width of the stent cut from the patch of material using the cutting devices described herein can be at least 100 microns up to about 1500 microns, or between 100 microns up to 1200 microns, or between 100 microns and 900 microns, or between 300 microns and 600 microns. The stent cut from a patch of material can have a width of at least about 100 microns and a width of no more than 1500 microns, 1400 microns, 1300 microns, 1200 microns, 1100 microns, 1000 microns, 900 microns, no more than 800 microns, no more than 700 microns, no more than 600 microns, no more than 500 microns, no more than 400 microns, no more than 300 microns, or no more than 200 microns. The length of the stent cut from a patch of material can vary depending on the location of stent implantation. In some implementations, the stent has a length that is between 1 mm and 10 mm, or more preferably between 3 mm and 8 mm long. The thickness of the stent cut from the patch of material can be from 100 microns up to about 800 microns, or from 150 microns up to about 600 microns. In an implementation, the biological material forming the stent can have a thickness that is no smaller than 100 microns and no larger than 5 mm. The thickness of the stent can also depend on whether the stent is folded or rolled upon implantation such that a patch of material having a thickness of just 250 microns can cut into a stent and the stent folded at implantation to double the thickness to about 500 microns. The thickness of the stent can also depend upon what biologically-derived material is used. For example, scleral tissue or corneal tissue can often have a thickness of around 400 microns, but following harvest can shrink to about 250-300 microns. As such, a stent cut from a shrunken patch of corneal tissue may have a thickness of just 250 microns.

In some implementations, which is described in more detail below, the stent cut from the patch of material is cut so as to substantially fill the conduit through which it is advanced for delivery. In other implementations, the stent can be cut into an implant that is oversized relative to a dimension of a conduit through which it is deployed. In this implementation, the stent can be cut to have a first size, which is oversized compared to the inner dimension of the delivery conduit. The oversized stent can be primed within the delivery conduit such as by compacting or compressing with a tool so that the stent when primed within the conduit takes on a second, smaller size. Upon deployment in the eye and release of the stent from the delivery conduit, the stent may achieve a third size approaching its original first size. This will be described in more detail below.

In a non-limiting example, bio-tissue stent has dimensions no smaller than 0.1 mm and no larger than 8 mm in any direction and a thickness of not smaller than 50 microns and not larger than 8 mm. In a non-limiting example, the stent is about 6 mm in length by 300-600 microns wide by 150-600 microns thick. The cutting can be no smaller than 1 mm and no larger than 8 mm in any direction. In a non-limiting example, the cut tissue has dimensions of 100-800 microns in width and 1 mm-10 mm in length. It should be appreciated that multiple stents may be delivered to one or more target locations during an implantation procedure.

Figure 2:
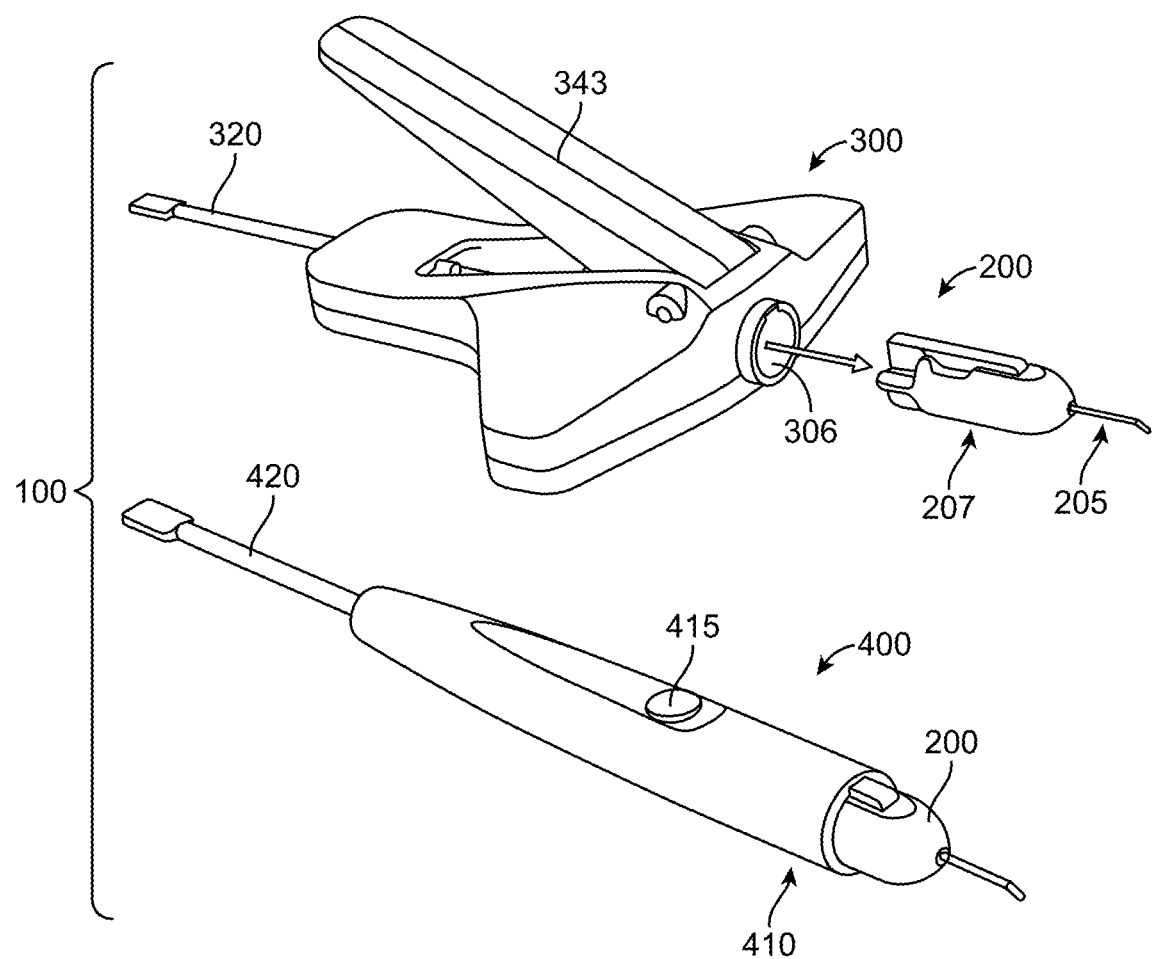
FIG. 2 is a perspective view of a system according to an implementation.
Figure 6:
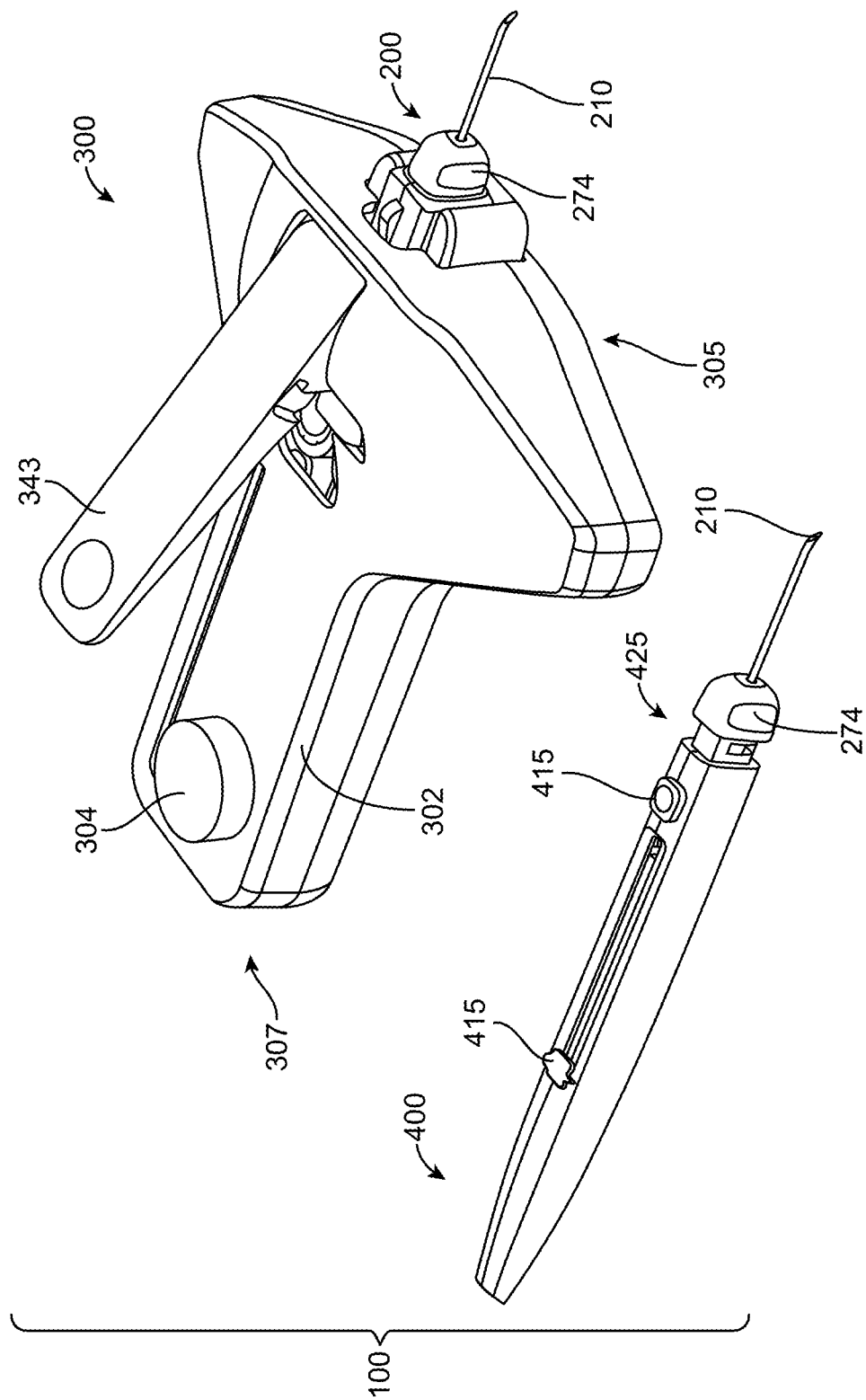
FIG. 6 is a perspective view of a system according to an interrelated implementation.

FIGS. 2 and 6 show interrelated implementations of a system 100 for preparation and delivery of a biologic intraocular stent for increasing aqueous outflow and lowering of intraocular pressure. The system 100 can include a tissue cartridge 200 having at least a portion configured to be reversibly and operatively coupled with a cutting device 300 and a delivery device 400. The cutting device 300 shown in FIGS. 2 and 6 include an integrated loading feature configured to load the cut stent into the tissue cartridge 200 following cutting the stent with the cutting device 300. The system 100 can also incorporate a cutting device 300 that does not have an integrated loading component (see FIGS. 18A-18E and 18F-18H). In this implementation, the system 100 can include a separate loading device 600 configured to couple with a cartridge 200 to load the cut stent created by the cutting device 300 (see FIGS. 19A-19B). The stent once cut using the cutting device 300 can be transferred from the cutting device 300 to the loading device 600 manually, for example using tweezers. The loading device 600 can be used to urge the cut stent into a region of the tissue cartridge 200 coupled to the loading device 600. The loaded tissue cartridge 200 can then be uncoupled from the loading device 600 and coupled to the delivery device 400 for delivery into an eye.

Each of the systems 100 can be provided without a cutting device 300 and include only the tissue cartridge 200 and the delivery device 400. In this implementation, the tissue cartridge 200 can include a pre-cut stent 105 within the cartridge 200 that is ready to be engaged with the delivery device 400 for deployment into the eye. The cartridge 200 with the pre-cut stent 105 can be immersed within a stable solution. Thus, where the systems are described as including a cutting device 300, it should be appreciated that the cutting device 300 may not be used at the time of surgery and instead the stent 105 provided in a pre-cut and/or pre-primed configuration within at least a portion of the delivery device 400 or the tissue cartridge 200.

FIG. 2 shows a first cartridge 200 shown separated from the cutting device 300 and another cartridge 200 installed with the delivery device. The cartridge 200 is configured to receive a patch of material 101 within the cartridge 200 and fix the patch of material 101 in preparation for cutting by the cutting device 300. The cutting device 300 when operatively engaged with the cartridge 200 is configured to form the biologic intraocular stent 105 from the patch of material 101 held within the cartridge 200. The delivery device 400 when operatively engaged with the cartridge 200 is configured to deliver the cut implant 105 from the cartridge 200 to the implanted location. The tissue cartridge 200 in the implementation of FIG. 2 is configured to mate with both the cutting device 300 and the delivery device 400 such that the entire tissue cartridge 200 is removed from and transferred between the two devices 300, 400 of the system 100.

FIG. 6 shows an interrelated implementation of the system 100 and includes a tissue cartridge 200 configured to be operatively coupled with a cutting device 300 and the delivery device 400. However, the entire tissue cartridge 200 need not be fully removed from the cutting device 300 in order to couple with the delivery device 400. In this implementation, the tissue cartridge 200 can include a distal nose cone assembly 274 that is configured to uncouple from a proximal portion 207 of the cartridge 200 and couple with the delivery device 400. The nose cone assembly 274 can include at least a portion of the distal portion 205 such as a nose cone 275 and the shaft 210 extending distally from the nose cone 275.

In still further implementations, the cartridge 200 need not include a portion configured to receive a patch of material 101 within the cartridge 200. For example, the cartridge 200 can include only a nose cone assembly 274 including a nose cone 275 having a distal shaft 210. The nose cone 275 with the distal shaft 210 can be coupled to a cutting device 300 that is configured to receive the patch of material 101 within at least a region and fix the patch of material 101 in preparation for cutting by the cutting device 300. The nose cone 275 and distal shaft 210 can be arranged relative to the cutting device 300 so that the cut stent can be transferred into it for deployment in the eye. FIG. 14I illustrates in schematic a nose cone assembly 274 coupled to a cutting assembly 500. The nose cone assembly 274 includes a nose cone 275 having a proximal end coupled to the cutting assembly 500 and a distal shaft 210 extending out from the nose cone 275 along longitudinal axis A. The cutting assembly 500 can be part of a cutting device 300 as described herein.

A cartridge can include any of a variety of structural arrangements as described herein, but generally refers to a component that is transferrable between two or more devices. The cartridge can be transferrable between a cutting device and a delivery device. The cartridge can be configured to hold a patch of material for cutting into a stent as well as provide a conduit for deploying the stent into the eye. The cartridge need not be configured to hold the patch of material for cutting, however. The cartridge can include the shaft configured to receive the cut stent from the cutting assembly to then deploy the stent into the eye from the shaft. Any of a variety of configurations are described and considered herein.

Each of these systems and their respective components will be described in more detail herein.

Figure 3A:
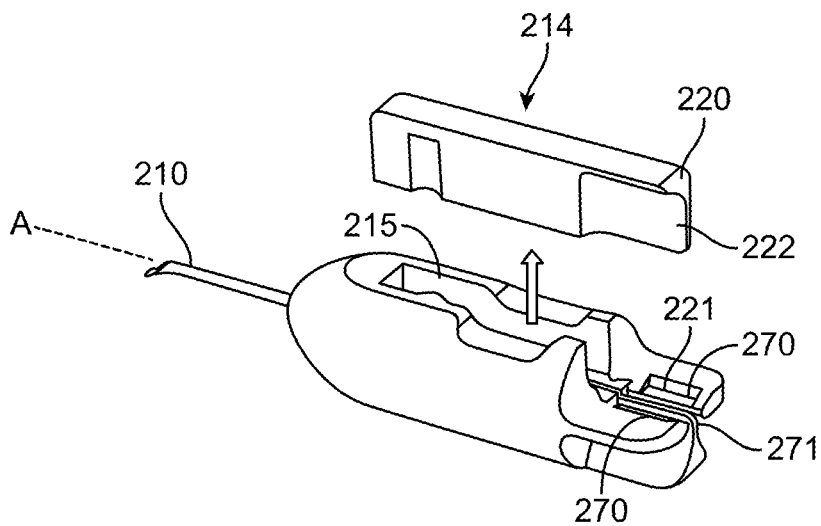
FIGS. 3A and 3B illustrate an implementation of the tissue cartridge of the system of FIG. 2 having a cover removed.
Figure 3B:
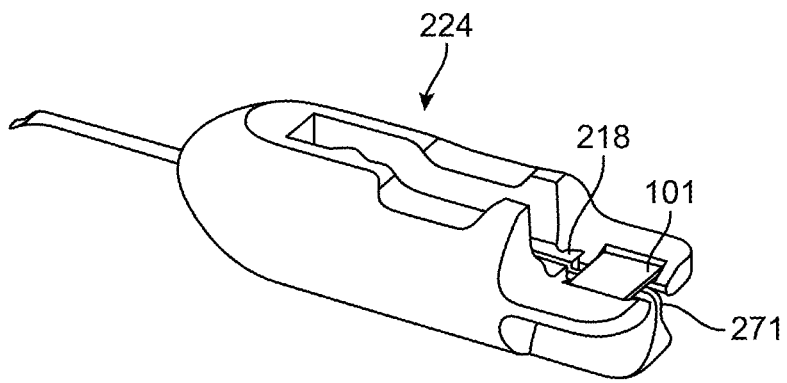
Figure 3C:
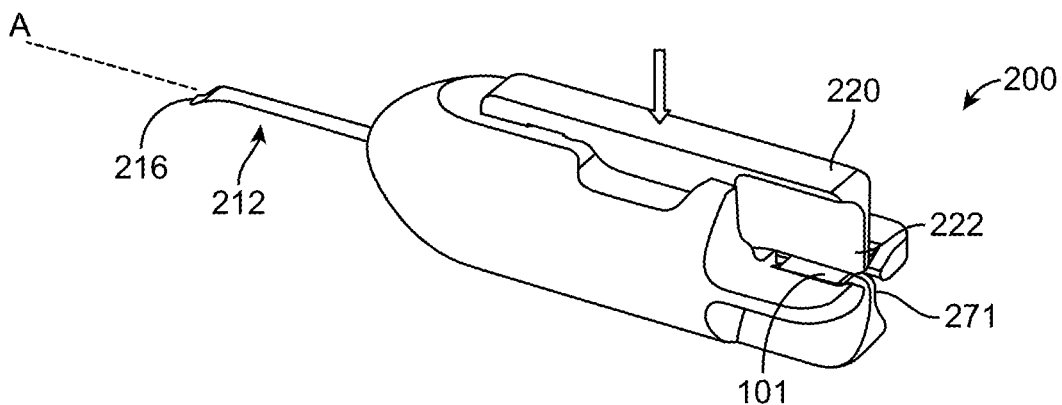
FIG. 3C illustrates the tissue cartridge of FIGS. 3A-3B with the cover installed.

FIG. 2 and also FIGS. 3A-3C show an implementation of the tissue cartridge 200 configured to hold the patch of material for cutting and for providing a conduit for deploying the cut stent into the eye. The cartridge 200 can include a distal portion 205 coupled to and extending distally from a proximal portion 207. The distal portion 205 can include an elongate member or shaft 210 having an inner conduit or lumen 238 that is sized for containing and deploying the stent 105. The proximal portion 207 can include a base 224 and a cover 214 movably attached to the base 224. The proximal portion 207 is intended to remain outside the eye while the distal portion 205 is configured to insert within the eye to deploy the stent 105 within the target tissues. The implant 105 can be advanced from the proximal portion 207 of the cartridge 200 into a deployment positioned within the distal portion 205 of the cartridge 200. The distal portion 205 of the cartridge 200 is insertable into the anterior chamber of the eye so that it may be positioned adjacent eye tissue within which the implant 105 is deployed from the cartridge 200 into the eye tissue. For example, the distal portion 205 of the cartridge 200 can be inserted ab interno into the anterior chamber through a corneal incision, while the proximal portion 207 of the cartridge 200 remains outside the eye (e.g., coupled to the delivery instrument 400).

FIG. 6 and also FIGS. 7A-7C illustrate another implementation of a tissue cartridge 200 configured to hold the patch of material for cutting and for providing a conduit for deploying the cut stent into the eye. The tissue cartridge 200 can include a distal portion 205 coupled to and extending distally from a proximal portion 207 that includes a shaft 210 having an inner conduit or lumen 238 (visible in FIG. 14I) sized for containing and deploying the stent 105. The proximal portion 207 can also include a base 224 and a cover 214 movably attached to the base 224. The distal portion 205 and shaft 210 can be removably attached to the proximal portion 207 of the cartridge 200. For example, the proximal portion 207 can remain within the cutting device 300 and a removable nose cone assembly 274 comprising the nose cone 275 and the shaft 210 can be disengaged from the proximal portion 207 and engaged with the delivery instrument 400 (see FIGS. 9A-9D).

It should be appreciated that the distal portion 205 of the cartridge 200 can be useful for other delivery pathways (e.g., trans-scleral delivery). Deploying the implant 105 into the eye tissue can include the implant 105 residing at least in part between a ciliary body and a sclera of the eye. The implant 105 can reside between the ciliary body and the sclera within a cyclodialysis cleft.

The shaft 210 of the cartridge 200 (also referred to herein as an introducer tube, applicator, conduit, or delivery body) extending in a distal direction outward from the proximal portion 207 of the cartridge 200 includes at least a portion that extends along a longitudinal axis A. At least another portion of the shaft 210 can be angled, curved, or flexible such that it can form a distal curve or a bend away from the longitudinal axis A. The distal end region 212 of the shaft is a tangent arc to the proximal end region of the shaft 210 with radii of between 10-20 mm, preferably about 10-15 mm, or about 12 mm. In some implementations, the shaft 210 can include a flexible portion and a rigid portion such that depending on relative position of the portions results in a change in shape of the shaft. The implementation shown in FIGS. 3A-3C and also FIGS. 7A-7C has a proximal portion that extends along the longitudinal axis A and a distal end region 212 that curves downward away from the longitudinal axis A. The distal end region 212 can include an opening 230 from the lumen 238 through which the stent 105 can be deployed. The opening 230 from the lumen 238 can be positioned within a plane that is perpendicular to a plane of the longitudinal axis A of the distal end region 212 of the shaft 210. The opening 230 from the lumen 238 can be positioned within a plane that is at an angle relative to the longitudinal axis A of the distal end region 212 of the shaft 210. The distal end region 212 of the shaft 210 can be beveled such that the opening 230 into the lumen 238 is elongated rather than circular and a distal-most tip 216 of the shaft 210 extends beyond the opening 230. The bevel can be about 10-45 degrees, preferably about 12-16 degrees, or about 15 degrees. The distal-most tip 216 of the shaft 210 can be a pointed tip or a blunt tip that is squared off such that it does not form a point. The shape of the opening 230 can be a function of the overall cross-section of the shaft 210 at the distal end region 212 as well as the angle of the opening 230 relative to the longitudinal axis A of the distal end region 212. For example, if the distal end region 212 of the shaft 210 has a rectangular cross-section and the opening 230 is cut perpendicular relative to the longitudinal axis A, the opening 230 and the cross-sectional shape of the shaft 210 are substantially matched. If the shaft 210 has a rectangular cross-section and the open 230 is cut less than perpendicular relative to the longitudinal axis A, the opening 230 may have an elongated rectangular shape compared to the rectangular shape of the shaft 210. The opening 230 may also have a first shape near the heel of the bevel and a second shape near the distal-most tip 216. For example, the opening 230 near the heel of the bevel may be rounded and the opening 230 near the distal-most tip 216 may be squared-off. It should also be appreciated that the opening 230 need not be at the distal-most end of the shaft 210. The opening 230 can be formed in a sidewall of the shaft 210 such that the stent 210 is urged out of the lumen 238 along a direction that is angled relative to the longitudinal axis of the lumen 230. The opening 230 can be positioned in the shaft 210 relative to the cartridge 200 such that is it positioned on a forward end, a lower side, an upper side, and/or another side of the shaft 210. The distal end region 212 of the shaft 210 can have a cross-sectional shape that is circular, oval, rounded rectangle, rectangle, rounded square, square, diamond, tear drop, or other shape and the distal-most tip 216 have a tip shape that varies, including blunt tip, bullet tip, spatula tip, or pointed tip. The distal end region of the shaft 210 can have any of a variety of configurations known in the ophthalmic arts.

The shaft 210 can be used to create a cyclodialysis cleft within the supraciliary space. The distal end region of the shaft 210 can be shaped to form the cleft as well as provide a conduit for a material to be delivered into the supraciliary space of the eye. The shaft 210 can also be used to deliver a viscous material such as viscoelastic fluid or a non-viscous material such as the sclera tissue using, for example, the pusher as a plunger. For example, viscoelastic can be delivered to a region of the eye through the shaft 210 prior to, during, and/or after implantation of the stent. The corneal incision can be created with a scalpel or other tool and the shaft 210 inserted through the incision and the distal end of the shaft 210 navigated to a desired location for delivery. The distal end of the shaft 210 can include a spatula that can be used to separate tissue layers and create the cyclodialysis cleft in the supraciliary space between the sclera and ciliary body. The dimensions, surface finish, and shape of the distal end can minimize trauma. The shaft 210 can additionally include one or more markers providing user information regarding distance of insertion. A distal end region of the shaft 210 can include one or more markers for goniometric reference for how deeply the tongue of the shaft 210 has been inserted into the supraciliary space. The one or more markers can be imprinted, etched, or other sort of mark as well as the one or more fenestrations on the shaft 210, which will be described in more detail below. The length of the shaft 210 is sufficient to allow the device to be used from a temporal or superior position.

The shaft 210 of the cartridge 200 has a size and shape configured for ab interno delivery through a clear corneal incision to permit passage of the stent 105 out the distal end of the shaft 210. In at least some implementations, the distal end region 212 of the shaft 210 is sized to extend through an incision that is about 1 mm in length. In another implementation, the distal end region 212 of the shaft 210 is sized to extend through an incision that is no greater than about 2.5 mm in length. In another implementation, the distal end region 212 of the shaft 210 is sized to extend through an incision that is between 1.5 mm to 2.85 mm in length. In some implementations, the maximum outer diameter of the shaft 210 is no greater than 1.3 mm. The distal-most tip 216 of the shaft 210 can be blunt or sharp. A blunt distal-most tip 216 of the shaft 210 allows for dissecting between tissues of the eye without penetrating or cutting the tissues for positioning the stent 105. For example, the distal-most tip 216 of the shaft 210 can be configured to bluntly dissect between the ciliary body CB and the sclera S (e.g., the supraciliary space) while the stent 105 remains fully encased within the shaft 210 during the blunt dissection. In an alternative implementation, the distal-most tip 216 of the shaft 210 has a sharp cutting configuration for dissecting application and implantation through the scleral wall into the subconjunctival space. In yet another embodiment, the distal-most tip 216 can have a cutting configuration for dissecting and implantation into the Schlemm's Canal or trans-sclerally.

The shaft 210 can be a hypotube that is no greater than about 18 G (0.050" OD, 0.033" ID), 20 G (0.036" OD, 0.023" ID), 21 G (0.032" OD, 0.020" ID), 22 G (0.028" OD, 0.016" ID), 23 G (0.025" OD, 0.013" ID), 25 G (0.020" OD, 0.010" ID), 27 G (0.016" OD, 0.008" ID), 30 G (0.012" OD, 0.006" ID), or 32 G (0.009" OD, 0.004" ID). In some implementations, the shaft 210 is a hypotube having an inner diameter that is less than about 0.036" down to about 0.009" (0.230 mm-0.900 mm). The inner diameter of the shaft 210 can be about 0.600-0.900 mm. The system can incorporate a 600 micron shaft 210 or an 800 micron shaft 210. Other sizes for the shaft 210 are considered herein depending on particular patient conditions and clinical needs.

In preferred implementations, the stents described herein can be formed as solid strips of material without any lumen although it should be appreciated the stent may have also include a lumen. Thus, the stents are generally not deliverable over a guidewire as many conventional glaucoma shunts are. Additionally, the stents described herein can be formed of relatively soft tissue that is more fragile as typical shunts, which are formed of more rigid polymeric or metal material. Rigid shunts can be implanted such that a distal end of the shunt is used to create a blunt dissection at the interface of the tissues through which the shunt is being inserted. The stents described herein are preferably deployed using a retractable sleeved type of injector or introducer tube that once in proper anatomic position can be retracted leaving the stent more gently externalized and precisely positioned. The stents described herein can also be deployed by advancing a pusher distally to urge the stent out of the introducer tube. The distal advancement of the pusher can be a slow, incremental advancement under direct control by a user depending on degree of depression of the button or advancement of the slider. The distal advancement can be sufficient to deploy the stent from the lumen into the tissues. Where the distal advancement is preferably controlled by a user in a slow, incremental manner, the proximal retraction can be an all-or-nothing sort of actuation that is achieved by a spring-actuated mechanism. The retraction can be relatively fast, for example, if a user desires the shaft of the device to be removed quickly for any of a variety of reasons other than to deploy the stent. Retraction need not result in deployment of the stent. For example, the pusher can be withdrawn proximally relative to the stent inside the shaft prior to proximal retraction of the shaft. This can withdraw the shaft out from the cleft while the stent remains inside the lumen, if desired.

The dimensions of the shaft 210 can be selected based on the dimensions desired for the stent to be implanted. The stents 105 can have a dimension that substantially fills the inner lumen 238 of the shaft 210 (or the inner lumen of at least a portion of the shaft 210 through which it is delivered) such that the stent may be urged distally through that portion. In some implementations, the stent substantially filling the lumen is urged distally without wrinkling or being damaged. In other implementations, the stent substantially filling the lumen is urged distally through the shaft 210 in a manner that compacts the tissue into a plug having a denser configuration than the stent when cut from the patch. The dimensional difference or gap between the width and height dimensions of the stent 105 and the inner dimensions of the conduit can be up to about 200% of the dimensions of the stent 105. The maximum size of the conduit and the maximum size of the stent 105 are related. As an example, if the stent width is about 1 mm, the maximum dimension of the conduit can be 3 mm, which results in the total gap between the width of the stent and the outer wall of the conduit being 200% of the stent width. The gap may be less than 5-10% of the maximum dimension of the stent 105. Generally, the smaller the gap between the stent 105 and the conduit, the better the result for advancing the stent 105 through the conduit. If the cross-sectional area of the shaft 210 is greater than 200% the cross-sectional area of the cut stent 105, the stent 105 can buckle as it is being pushed through the shaft 210 to be implanted in the eye. The cross-sectional area of the shaft 210 and the cross-sectional area of the stent 105 are preferably substantially size-matched. The conduit can also be coated with a lubricious or low friction material (e.g., Teflon) to improve advancement of the stent 105 through the conduit during deployment.

The cross-sectional area of the shaft 210 can also be smaller than the cross-sectional area of the stent 105. As mentioned above, the stent 105 can be cut to be oversized relative to the inner diameter of the shaft 210 so that the stent 105 is compressed, compacted, or otherwise minimally manipulated for delivery through the tube. The stent can be cut to have a first size, which is oversized compared to the inner dimension of the shaft 210. The oversized stent can be primed within the shaft such as by compacting with a compacting tool or push rod 420 so that the stent 105 when primed within the conduit takes on a second, smaller size. Upon deployment in the eye and release of the stent 105 from the shaft 210, the stent 105 may achieve a third size approaching its original first size. Delivery and deployment will be described in more detail below.

Figure 5A:
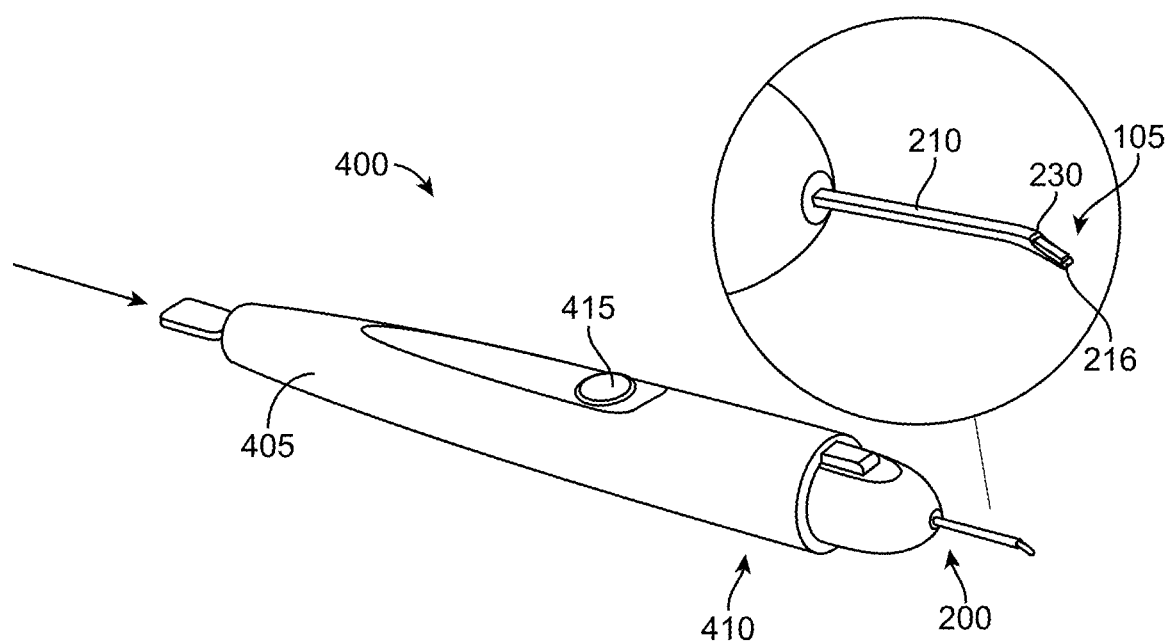
FIG. 5A illustrates the delivery device of the system of FIG. 2 having the tissue cartridge installed and the pusher in the advanced configuration.
Figure 5B:
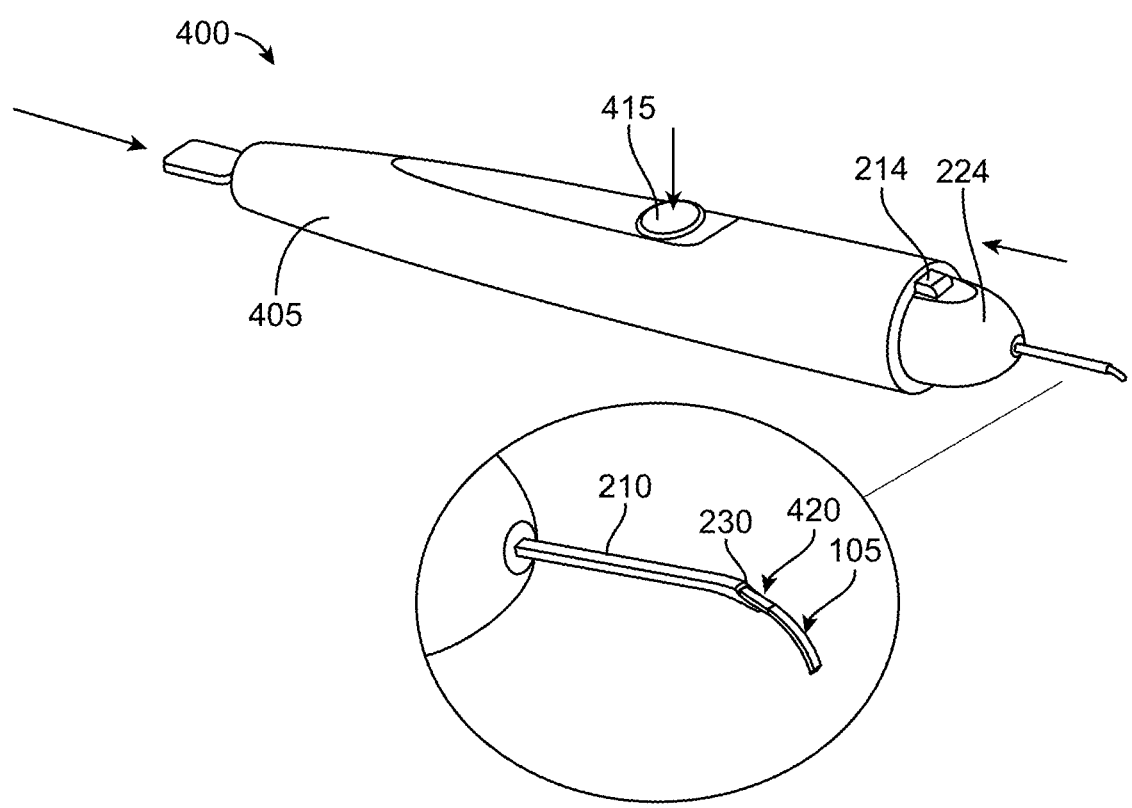
FIG. 5B illustrates the delivery device of FIG. 5A with the cartridge withdrawn relative to the pusher.

The shaft 210 can, but need not be fully tubular, nor does the shaft 210 need to be circular in cross-section. For example, the shaft 210 can be circular, oval, square, rectangular, or other geometry in cross-section. Additionally, the entire length of the shaft 210 need not have the same cross-sectional shape or size. For example, a proximal end of the shaft 210 can have a first shape and a distal end of the shaft 210 can have a second shape. FIGS. 5A-5B shows the shaft 210 is rectangular in cross-section. The lumen 238 of the shaft 210 need not be a fully enclosed channel. For example, the shaft 210 may incorporate one or more fenestrations, openings, segmental windows, or walls having one or more discontinuities such that the lumen 238 through the shaft 210 is a partially enclosed channel.

The one or more discontinuities or fenestrations in the shaft 210 can be coated with or covered by a material that allows for visual inspection of an interior of the shaft 210. FIGS. 16A-16C and also FIGS. 17A-17E illustrate an implementation of a nose cone assembly 274 configured to reversibly couple with a delivery device. As discussed elsewhere herein, the delivery device 400 can include a proximal housing 405, also referred to herein as a handle or handpiece, and at least one actuator 415. The delivery device 400 can also include a distal coupler 413b configured to reversibly couple to the nose cone assembly 274. The nose cone assembly 274 can include a nose cone 275 having a proximal end region and a distal end region. A coupler 413a can be positioned on the proximal end region of the nose cone 275 that is configured to reversibly engage with the distal coupler 413b of the delivery device 400. The nose cone assembly 274 can also include a tubular shaft 210 projecting from the distal end region of the nose cone 275. The tubular distal shaft 210 can incorporate one or more fenestrations 276 covered by a material that is translucent or transparent so as to reveal a lumen 238 of the tubular shaft 210. The one or more fenestrations 276 can form a metering system of the tubular shaft 210 configured to identify depth of insertion of the tubular shaft 210 and/or a particular dimension (i.e., length) of the implant positioned within the lumen 238. The distal nose cone assembly 274 is shown in FIG. 16A and also FIGS. 17B-17C uncoupled from a delivery device 400 revealing a proximal coupler 413a, which can be a bayonet connection on a proximal end region of the nose cone 275, configured to reversibly couple to the distal coupler of the delivery device 400. The distal shaft 210 projects from a distal end region of the nose cone 275.

The one or more fenestrations 276 can extend through a region of the distal shaft 210 that is covered by a clear material. The fenestrations 276 can be covered by reflowed nylon to make a continuous smooth channel that allows for visualization of the interior of the shaft 210. The shaft 210 can include an introducer tube 277 that is at least partially encapsulated by an outer tube member 278. The introducer tube 277 can be formed of a first material and the outer tube member 278 can be formed of a second different material. The first material can be stainless steel or Nitinol and the second material can be a polymer such as Nylon. The first material can be an opaque material and the second material can be relatively translucent or transparent. The introducer tube 277 can incorporate the one or more fenestrations 276 through its sidewall that are covered by the outer tube member 278 in a manner that allows for a user to see through the outer tube member 278 and through the introducer tube 277 to visually inspect the lumen 238 of the introducer tube 277. The fenestrations 276 allow users to see that an implant is advancing through the introducer tube 277 upon actuation of a plunger through the introducer tube 277. The fenestrations 276 can also allow users to assess the implant, such as a length of the implant, prior to deployment. The fenestrations 276 can be a known size or extend a known distance along the introducer tube 277 such that the length of the implant within the lumen 238 can be assessed by a user by comparing its size relative to the known dimensions of the fenestration(s) 276. Thus, the fenestrations can form a metering system on the distal shaft useful for understanding depth of insertion and/or length of implant within the lumen. Each fenestration 276 can be about 2 mm-6 mm long. The proximal portion of the shaft 210 incorporating the fenestration(s) 276 can be between about 4 mm up to about 8 mm in length. The fenestrations 276 can extend through the side wall on either side of the shaft 210 so that a user can inspect the lumen 238 from different orientations. The shape and size of the fenestrations 276 can vary. In some implementation, the fenestrations 276 are rectangular as shown in FIG. 16A, but they can be any of a variety of geometric shapes. The material of the outer tube member 278 can fill the fenestrations 276 of the introducer tube 277 to maintain a smooth and continuous tubular inner diameter. This prevents the implant within the lumen 238 of the introducer tube 277 from getting jammed or prevented from sliding through the lumen 238 towards the distal end region 212 of the shaft 210.

Again with respect to FIGS. 16A-16C, the shaft 210 can include a proximal portion that extends along a longitudinal axis A and a distal end region 212 distal to the fenestrations 276 that curves or bends away from the longitudinal axis A. The distal end region 212 of the shaft is a tangent arc to the proximal end region of the shaft 210 with radii of between 10-20 mm, preferably about 10-15 mm, preferably about 12 mm. The curved distal end region 212 can be incorporated in a shaft 210 with or without the fenestrations 276. The fenestrations 276 can be located along the substantially straight proximal portion of the shaft 210 proximal to the curve or bend. A distal end region 212 of the shaft 210 can be translucent or transparent and/or incorporate another window into the lumen 238 of the shaft 210. In an implementation, the introducer tube 277 terminates distal of the curve or bend of the shaft 210 and the outer tube member 278 extends past the terminal end of the introducer tube 277 (see FIG. 16C). Thus, the distal end region 212 of the shaft 210 can be formed solely of the outer tube member 278. As discussed above, the outer tube member 278 can be a transparent or translucent material such as Nylon or another polymeric material allowing for visual inspection of the shaft lumen 238. The clear distal end region 212 can be similarly smooth so as to maintain a smooth transition from the metal introducer tube 277 to the polymer distal tip. The smooth transitions prevent the implant within the lumen 238 from becoming misaligned or jammed during deployment. The distal end region 212 can curve downward from the proximal portion of the shaft 210 such that the distal opening 230 from the shaft 210 surrounds a different longitudinal axis A' than the proximal opening 280 into the shaft 210 that can surround a first longitudinal axis A. The clear distal end region 212 can have a length that is about 5 mm or between about 3 mm up to about 7 mm. The distal opening 230 from the lumen 238 can be at an oblique angle to increase the size of the opening 230, which can be about 1.5 mm up to about 2 mm. The bevel of the distal end region 212 can be between 10-45 degrees, preferably about 12-16 degrees. The distal-most end 216 of the shaft 210 can form a flat face that is about 0.10 mm-0.20 mm in thickness, preferably about 0.15 mm in thickness. Generally, the distal-most end 216 of the shaft 210 is not designed to cut or form a puncture in the eye tissue, but rather for blunt dissection or teasing between tissues. The distal end region 212 of the shaft 210 preferably incorporates no sharp edges.

As described elsewhere herein, the shaft 210 can include an inner pusher or push rod 420 (see FIGS. 12C-12D, and FIG. 17E-17I). The push rod 420 can be formed of Nitinol, stainless steel, or a monofilament or a braided component. The push rod 420 can be a fully cylindrical element having no lumen that extends through the lumen 238 of the shaft 210 so as to engage against a proximal end of the stent 105. The push rod 420 is flexible enough to translate through the lumen 238 of the shaft 210 around the curvature near the distal end region and also stiff enough to bear against the cut stent 105 within the lumen 238 to cause deployment of the stent 105 in the eye. The push rod 420 can have differences in outer diameter along its length to improve its flexibility relative to the shaft 210, particularly where the shaft 210 has a curved distal end region 212. As discussed above, the shaft 210 can curve near a distal end region forming a tangent arc with radii between 10-20 mm, or preferably about 12 mm. The geometry of the push rod 420 can change over its length to provide improved flexibility to accommodate this curve. In an implementation, the push rod 420 can undergo a change in outer diameter between the proximal and distal ends (see FIG. 17F). A distal end region 440 of the push rod 420 can have a maximum outer diameter that is greater than an outer diameter of an intermediate region 442 of the push rod 420. The smaller outer diameter of the intermediate region 442 of the push rod 420 is designed to navigate the curve of the distal end region 212 of the outer shaft 210. The push rod 420 can taper between the sections so that the outer diameter of each region gradually changes towards the different outer diameter of a neighboring region. The larger outer diameter of the distal end region 440 of the push rod 420 allows for a larger surface area to abut against the cut stent within the lumen 238. If the outer diameter of the distal tip 441 of the push rod 420 were too small, the distal tip 441 would potentially penetrate the stent 105 as opposed to providing a bearing surface against the stent 105. The outer diameter of the distal end region 440 can be about 0.525 mm-0.575 mm and the outer diameter of the intermediate region 442 can neck down to about 0.200 mm-0.300 mm. The outer diameter of the distal end region and the proximal end region can be the same. The length of the intermediate region 442 can vary, but can be about 8 mm-10 mm. Generally, the length of the intermediate region 442 is longer than a length of the distal end region 440. The distal end region 440 can be about 2 mm-5 mm. A proximal end region 444 of the push rod 420 that is configured to remain within the portion of the shaft 210 that is straight can be stiffer than the intermediate region 442 and is designed to couple to an actuator 415 on the housing 405 of the delivery device 400. FIG. 17G illustrates the proximal end region 444 of the push rod 420 coupled to the actuator 415a of the housing 405.

The cartridge can, but need not, be configured to hold the patch of material 101 prior to cutting with the cutting device 300. The patch of material 101 can be held within a region of the cutting device. Again with respect to FIGS. 3A-3C and also FIG. 7A-7C, the proximal portion 207 of the cartridge 200 can include a base 224. A distal end region of the base 224 can be coupled to the shaft 210. A proximal end region of the base 224 can include a recess 221 configured to receive the patch of material 101. The recess 221 can include a projection 271 in the shape of an inverted V can project upward from a center line of the recess 221 that urges the centerline of the patch of material 101 upward while allowing the sides of the patch of material 101 to hang downward into corresponding channels 270 on either side of the centerline. FIGS. 7A-7C illustrate the proximal portion 207 of the cartridge 200 can be reversibly coupled to a nose cone assembly comprising the shaft 210 and the nose cone 274.

The base 224 is configured to mate with the cover 214 and to at least partially enclose the recess 221 containing the patch of material 101. The cover 214 is configured to engage at least some portion of the patch of material 101 to stabilize the tissue before and during cutting of the patch 101, for example, with the cutting device 300. In an implementation, the base 224 can include a slot 215 in an upper surface of the base 225 sized and shaped to receive the cover 214. The cover 214 slides through the slot 215 until a lower surface of the cover 214 abuts against a receiver surface 218 of the base 224. The contact between the lower surface of the cover 214 and the receiver surface 218 of the base 224 ensures the centerline of the patch of material 101 within the recess 221 is in contact with the lower surface of the cover 214 at the projection 271 (see FIG. 3C).

The cover 214 is shown in FIGS. 3A-3C as a completely removable element from the base 224. The cover 214 and base 224 can optionally be coupled together by a hinge or other mechanical feature. For example, the cover 214 can rotate around a pivot axis of the hinge and stay connected to the base 224 even when in a configuration to reveal the recess 221. FIGS. 7A-7C illustrate the cover 214 can toggle between an open and closed configuration by applying a downward pressure on a forward end of the cover 214 (FIG. 7A) to open the cover 214 and a downward pressure on a back end of the cover 214 to close the cover 214 (FIG. 7C). For example, the cover 214 can be lifted into an open configuration revealing the recess 221 of the base 224 within which the patch of material 101 can be positioned. When the cover 214 is positioned back into the closed configuration, the patch 101 can be compressed and/or tensioned between the cover 214 and the base 224. The cartridge 200 can be inserted within a receptacle 306 of the cutting device 300 once the cover is in the closed configuration (see FIG. 8).

The cover 214 (or some other element) can be configured to additionally apply an amount of tension on at least a portion of the patch of material 101, such as stretching in an outward direction from the centerline of the patch of material 101 before cutting occurs as described in U.S. Pat. No. 10,695,218, issued Jun. 30, 2020, and is incorporated by reference herein in its entirety.

The patch of material 101 can be inserted by a user into the cartridge 200 at the time of surgery. The patch of material 101 may be provided in a size that approximates the size of the recess 221 within the base 224. The user may trim the patch of material 101 before installing it in the recess 221. Alternatively, the cartridge 200 can be provided pre-loaded with a patch of material 101 positioned within the recess.

Figure 10A:
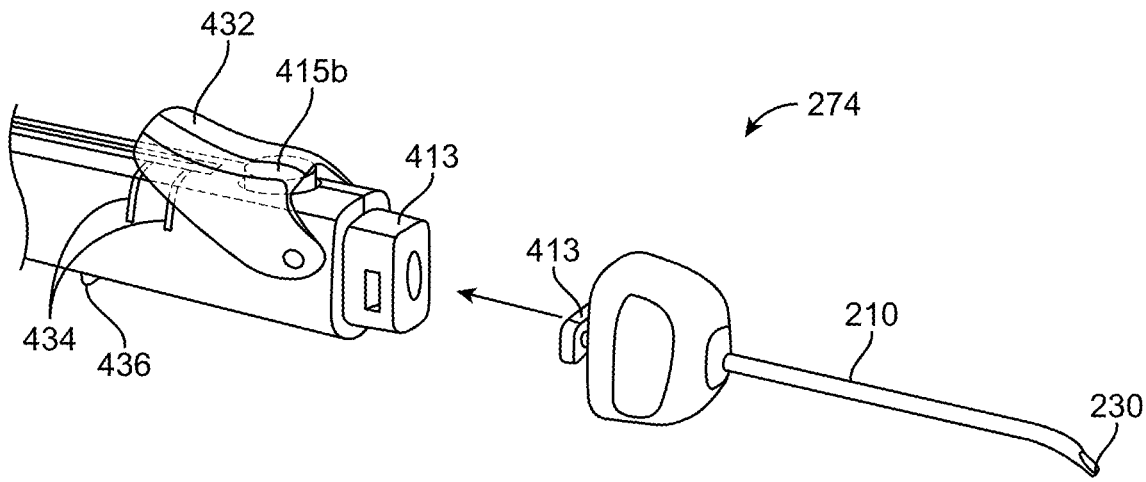
FIG. 10A illustrates the nose cone prior to engagement with a distal end region of the delivery device.
Figure 10B:
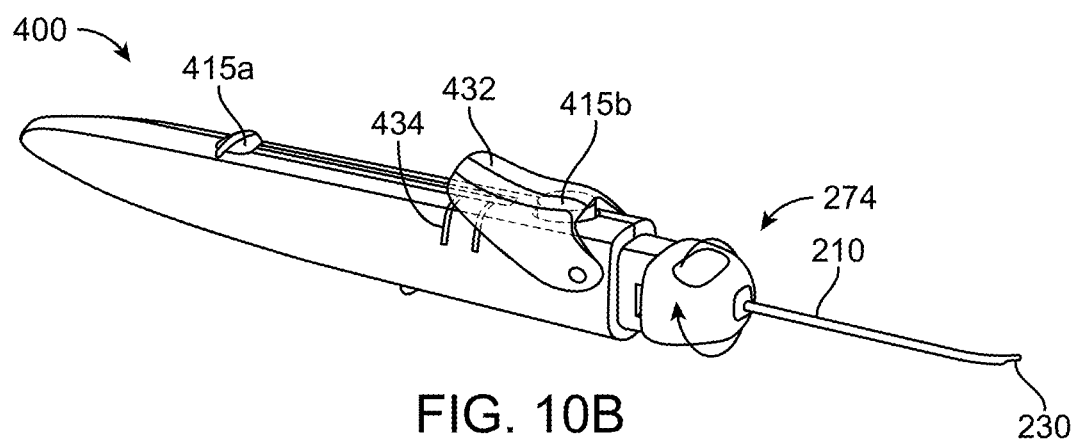
FIG. 10B illustrates the nose cone after engagement with the distal end region of the delivery device and prior to attachment.
Figure 10C:
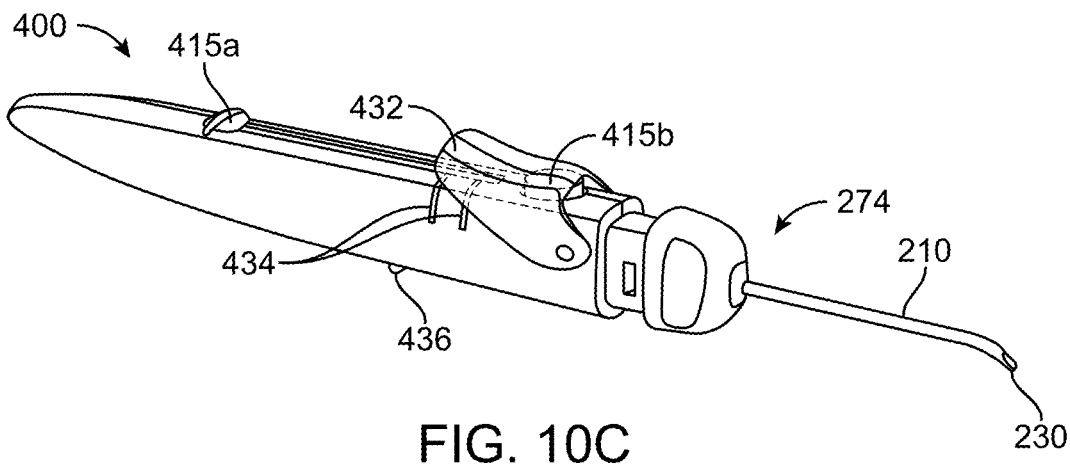
FIG. 10C illustrates the nose cone engaged and attached with the distal end region of the delivery device.

As mentioned elsewhere herein, the cartridge need not be configured to hold the patch of material 101 for cutting by the cutting device 300. Rather, the cutting device 300 can be configured to hold the patch of material 101 for cutting and then transfer the cut stent into the cartridge that is coupled to the cutting device 300. FIGS. 10A-10C and also FIGS. 16A, 17B-17C illustrate an implementation of a cartridge 200 that forms a nose cone 274 having a shaft 210 into which the cut stent can be loaded prior to insertion in the eye. The nose cone 274 can reversibly couple to a cutting device 300 having an integrated loading component or can reversibly couple with a loading device 600 configured to load the shaft 210 with the cut stent. Once loaded with the cut stent, the cartridge 200 can be removed from the cutting device 300 or the loading device 600 so that it may be coupled with the delivery device 400. The cartridge 200 can be positioned relative to the cutting device 300 that is configured to hold the patch of material 101 and cut it into a stent 105. Alternatively, the cartridge 200 can be positioned relative to a loading device that is configured to receive the cut stent and load the stent into the shaft 210. The coupling between the cutting device 300 (or loading device 600) and the cartridge 200 can align the longitudinal axis of the distal shaft 210 relative to a region of the device so that the cut stent 105 can be transferred into the distal shaft 210 such as with a rod or other tool that will be described in more detail below. The cartridge 200 with the distal shaft 210 having the stent 105 positioned inside it can then be uncoupled from the cutting device 300 or loading device 600 and transferred to a portion of the delivery device 400. Thus, the cartridge 200 need not include a portion configured to hold the patch of material 101 for cutting and instead includes a transferrable portion that can couple alternatingly with a region of the cutting device 300 or loading device 600 and a region of the delivery device 400. Where reference is made to a cutting device 300 having an integrated loading component, the cutting device 300 need not incorporate a loading component. Instead, a separate loading device 600 can be used that is configured to couple with the cartridge 200 to transfer the cut stent into the cartridge 200 prior to coupling the cartridge 200 with the delivery device 400. Each of these embodiments will be described in more detail below.

FIGS. 4A-4J and also FIG. 8 show implementations of a cutting device 300 having a cutting assembly for cutting a stent from a patch of material 101. FIGS. 14A-14H illustrate various implementations of a cutting assembly 500 that can be incorporated into the cutting device 300. The cutting device 300 is configured to cut or otherwise prepare the biologically-derived tissue or patch of a material 101 having a first contour or shape (e.g., a wider, square sheet or patch of material) into a second contour or shape (e.g., a narrower, rectangular strip of material) that conforms to an implantable stent 105 having the dimensions described herein. The cutting performed using the cutting devices 300 described herein can involve guillotine, punch, rotating, sliding, rolling, or pivoting blade cutting motion. In some implementations, the cutting is performed orthogonal to the plane of the patch of material. In some implementations, the cutting is performed axially along the conduit of implantation such that the axis of cutting can be aligned, within, or parallel to an implantation conduit to allow unimpeded tissue loading and transfer for implantation without manipulating, tearing, or damaging the fragile stent tissue.

As mentioned above, the cutting process is preceded by a tissue fixation step wherein the biologically-derived tissue that forms the stent is firmly fixed between two appositional planar surfaces to ensure the tissue is not wrinkled or malformed and the subsequent cut is of accurate dimensions. The fixation can optionally provide compression as well as tension or stretching of the tissue within at least one plane to ensure clean cutting through the tissue. The cutting assembly 500 can hold the patch of material 101 prior to cutting or the patch of material 101 can be held within a region of the tissue cartridge 200 prior to cutting by the cutting assembly 500. In some implementations, the cutting device 300 in combination with the cover 214 of the cartridge 200 can incorporate an anterior-to-posterior capture such that the material 101 to be cut is held fixed on the z-plane preventing movement prior to engaging the tissue with the cutting member 312.

The cutting can be performed within a path or conduit formed within the cartridge 200. Thus, implant 105 cut from the patch of material 101 can simultaneously or subsequently position the implant 105 within the conduit for delivery or align the implant 105 with the conduit for delivery so that the cut implant 105 can be delivered to the eye through the conduit without the cut implant 105 needing to be transferred from the cartridge 200.

As an example, the patch of material 101 held within the recess 221 of the cartridge 200 is cut by the cutting member 312 of the cutting device 300 forming a cut stent 105 within the recess 221 of the cartridge that can be urged distally from the recess 221 into the lumen 238 of the shaft 210 of the cartridge 200 so it can be deployed in the eye all without removing the cut stent 105 from the cartridge 200 or at least the distal portion 205 of the cartridge 200.

Figure 4A:
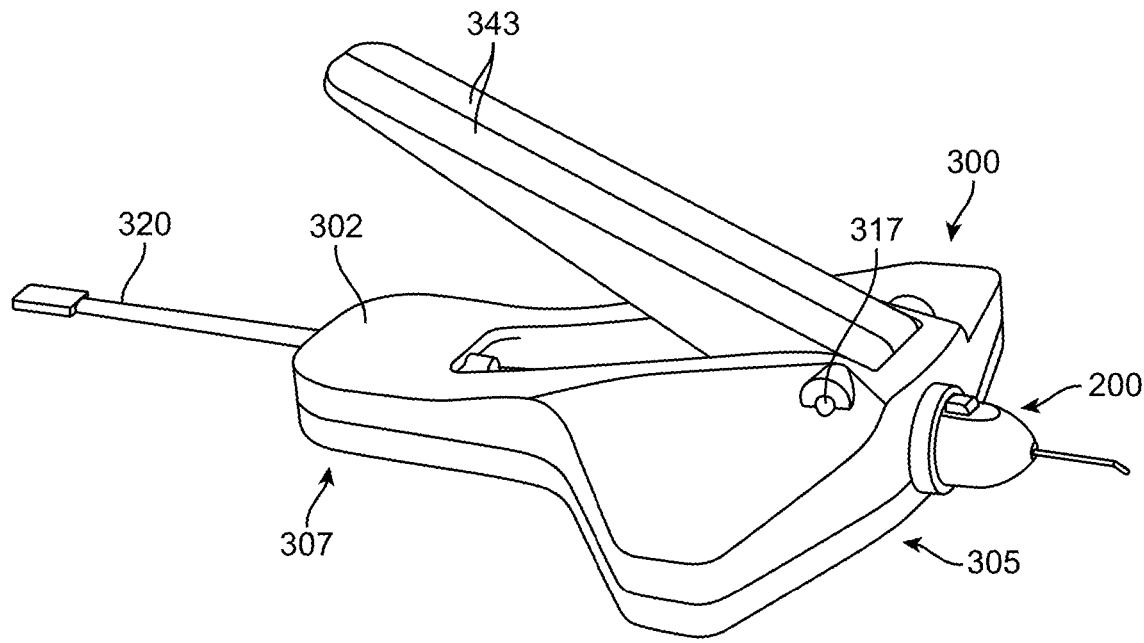
FIG. 4A illustrates the cutting device of the system of FIG. 2 having the tissue cartridge installed and the cutter in the open configuration.
Figure 4B:
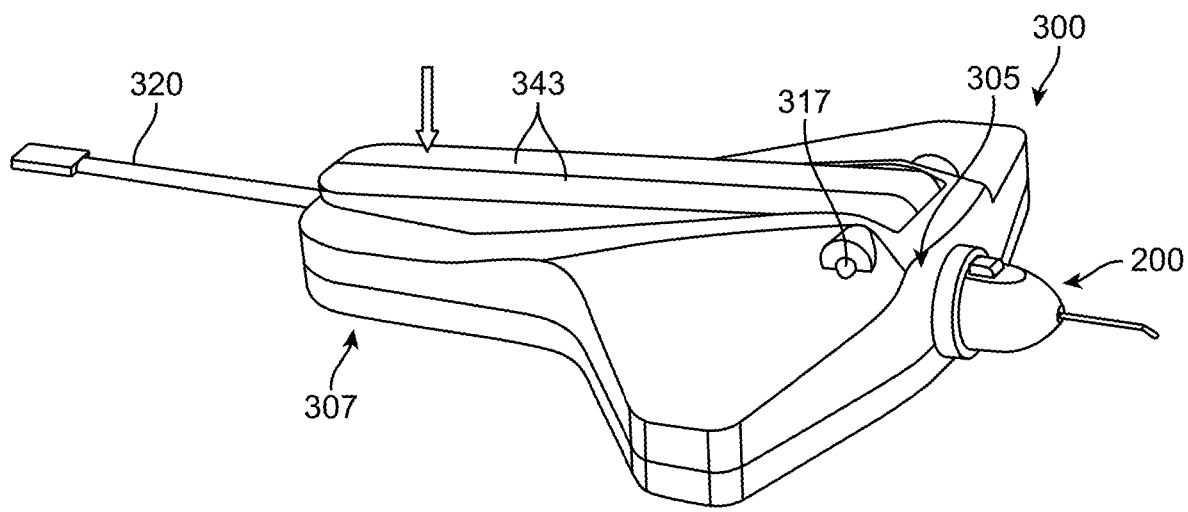
FIG. 4B illustrates the cutting device of FIG. 4A with the tissue cartridge installed and the cutter in the cut configuration.

With respect to FIGS. 4A-4B and also FIG. 6, the cutting device 300 can include a base 302 having a distal portion 305 and a proximal portion 307. The distal portion 305 can include a distal opening or receptacle 306 sized and shaped to receive the proximal portion 207 of the cartridge 200. The inner diameter of the receptacle 306 can be sufficient to receive an outer dimension of the proximal portion 207 so that the proximal portion 207 can be inserted a distance within the receptacle 306. The cover 214 of the cartridge 200 positioned within the slot 215 to maintain the patch of material 101 within the recess 221. An upper surface of the cover 214 can extend above the upper surface of the base 224 such that the outer dimension of the proximal portion 207 is keyed. In other words, the outer dimension of the cartridge 200 is keyed and can only be inserted within the receptacle 306 of the cutting device 300 in a single orientation (e.g., the cover 214 positioned on an upper side).

Figure 4C:
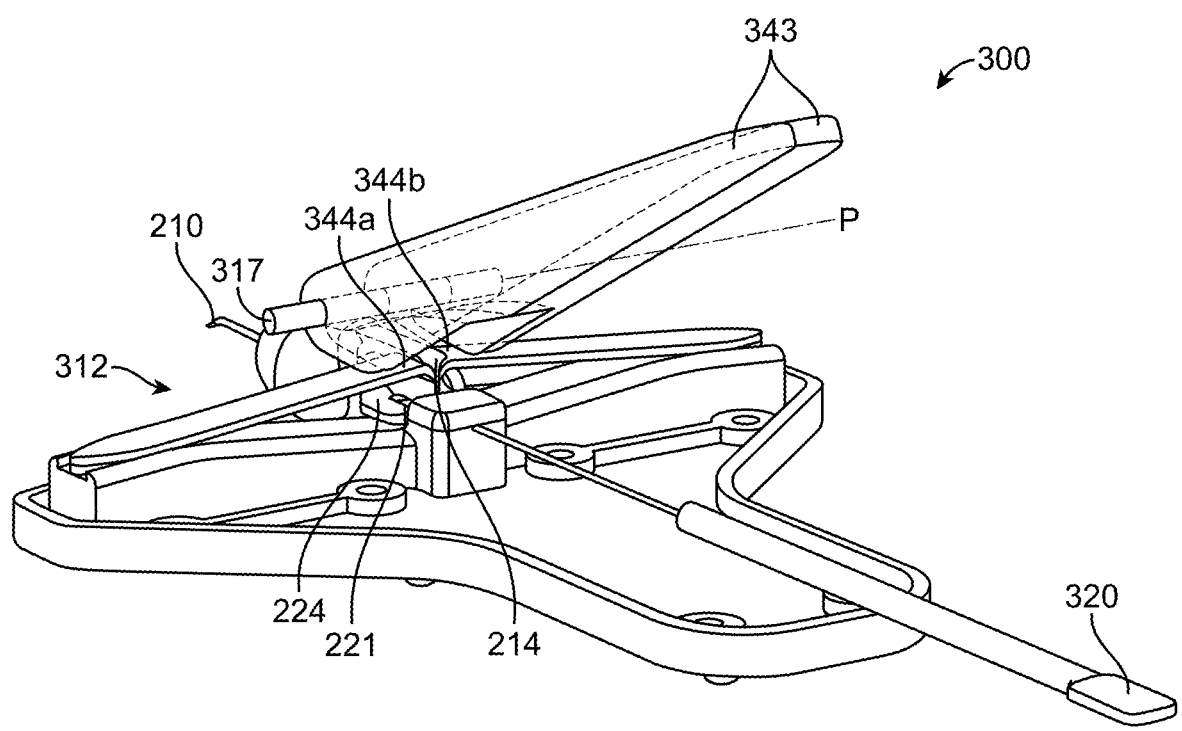
FIG. 4C is a partial view of the cutting device of FIG. 4B showing the cutter.

The cutting device 300 can additionally include a cutting assembly 500 having a cutting member 312 configured to cut the patch of material 101 within the recess 221 of the cartridge into a stent 105 (see FIG. 4C). The configuration of the cutting member 312 can vary. In this configuration, the cutting member 312 can include at least a first blade 344a and a second blade 344b separated a distance from the first blade 344a. The first and second blades 344a, 344b can be positioned above the patch of material 101 when the cartridge 200 is installed within the receptacle 306 of the cutting device 300. Actuation of the cutting member 312 causes the first and second blades 344a, 344b to be urged towards the patch of material 101 cutting through the thickness thereby forming the stent 105. The blades 344a, 344b can have a width along the longitudinal axis A of the cartridge 200 sufficient to cut a full length of the patch of material 101. The distance between the blades 344a, 344b can be designed to achieve the width desired for the cut stent 105. The blades 344a, 344b can be positioned parallel to one another or may be angled. The blades 344a, 344b may be angled relative to one another and/or angled relative to the tissue to be cut. Angling the blades improves the reproducibility of the tissue cut so that a very straight piece of tissue is formed from the patch 101 without any bulging along the sides of the new cut stent. Angling of the blades will be described in more detail below. The cutting member 312 can also include only a single blade 344 configured to trim a stent to size from the patch of material 101. Additionally, the recess 221 to receive the patch of material 101 prior to cutting need not be within the cartridge 200, but can be within a region of the cutting device 300, which will be described in more detail herein.

In some implementations, the blades 344a, 344b can be positioned above the patch of material 101 to be cut and corresponding lower blades 345a, 345b can be positioned below the patch of material 101. Thus, as the blades 344a, 344b are urged downward towards the patch of material 101, they urge the patch of material 101 towards the lower blades 345a, 345b such that the corresponding upper and lower blades cut completely through the material 101 in two locations creating the stent 105.

The cutting member 312 can be actuated by a user to move the blades. The cutting device 300 can include one or more handles 343 that movably coupled to the base 302 to actuate the cutting member 312. The handle(s) 343 can be coupled by a hinge 317 such that the handles 343 rotate around a pivot axis P of the hinge 317 relative to the base 302. For example, the handles 343 can be lifted to pivot into an open configuration as shown in FIG. 4A and rotated back around the pivot axis P into the cutting configuration as shown in FIG. 4B.

Figure 4D:
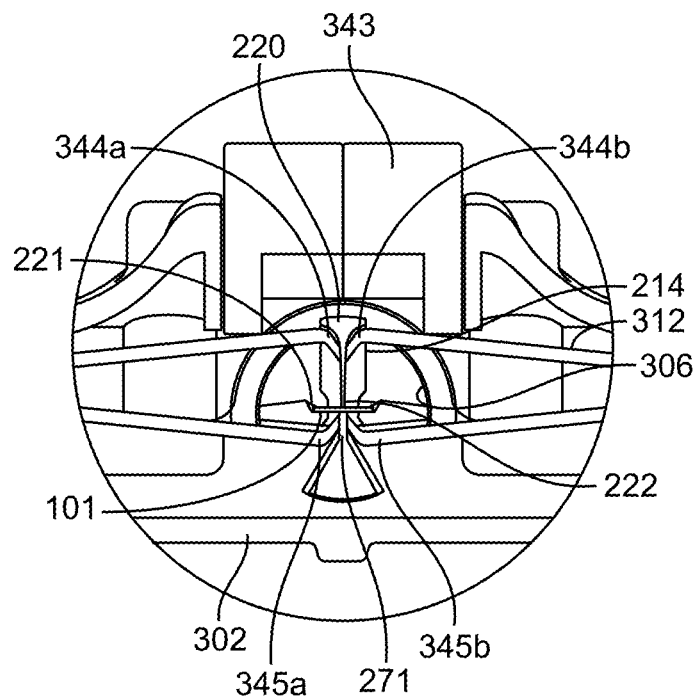
FIG. 4D is a cross-sectional partial view of the cutting device of FIG. 4A.
Figure 4E:
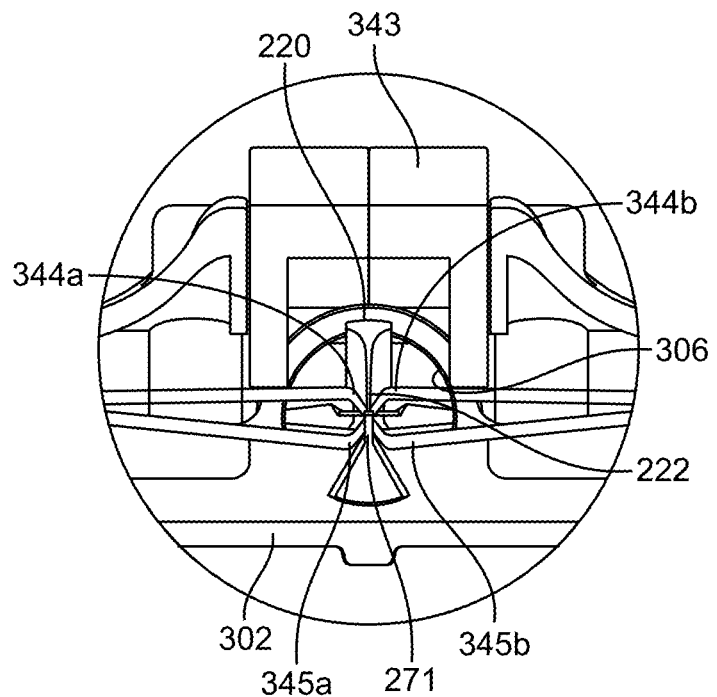
FIG. 4E is a cross-sectional, partial view of the cutting device of FIG. 4B.

The cartridge 200 may be inserted within the receptacle 306 of the cutting device 300 when the handles 343 are lifted into the open configuration and the cutting member 312 is positioned away from the cutting configuration. As best shown in FIGS. 4D-4E, the cartridge 200 may be slid into the receptacle 306 to position the recess 221 holding the patch of material 101 below the upper blades 344a, 344b and above the lower blades 345a, 345b. The cover 214 holding the patch of material 101 within the recess 221 can include an upper portion 220 that tapers into a narrower lower portion 222. The lower portion 222 of the cover 214 is aligned with the projection 271 of the recess 221 and traps the patch of material 101 therebetween. The upper portion 220 of the cover 214 can slide above the upper blades 344a, 344b as the cartridge 200 is installed with the cutting device 300. The lower portion 222 of the cover 214 is sized to slide between the upper blades 344a, 344b as the cartridge 200 is inserted within the receptacle 306 of the cutting device 300. FIG. 4D shows the upper blades 344a, 344b separated a distance from the lower blades 345a, 345b and the narrow lower portion 222 of the cover 214 positioned between them. FIG. 4E shows the handles 343 rotated back down into the cutting configuration and the upper blades 344a, 344b urged downward towards the patch of material 101 and toward the lower blades 345a, 345. The patch of material 101 is cut by the corresponding upper and lower blades forming the stent 105. The distance between the upper and lower blades determines the width of the stent 105 that is cut from the patch of material 101.

The handles 343 can open along any of a number or orientations relative to the base 302. For example, the pivot axis P of the hinge 317 can be substantially orthogonal to the longitudinal axis of the base A. In this implementation, the hinge 317 can be positioned on a distal end of the base 302 such that the handles 343 hinge open by rotating upward and toward the distal end of the base 302. The upper blades 344a, 344b may be spring-loaded such that they readily return to an open configuration as the handle 343 is lifted or released.

The stent 105, once cut, can be contained on all sides by the cartridge 200 and the cutting member 312 creating a complete enclosure or stent cutting chamber for the stent 105 within the assembly of the cutting device 300 and the cartridge 200. For example, the floor and ceiling of the stent cutting chamber can be formed by the lower portion 222 of the cover 214 and the projection 271 of the recess 221. The walls of the stent cutting chamber can be formed by the upper blades 344a, 344b, and the lower blades 345a, 345b of the cutting member 312. Together, the walls of the stent cutting chamber can form a rectangle to help constrain and direct the pusher 320 of the cutting device 300 that is advanced to push the stent 105 from the stent cutting chamber distally into the lumen 238 of the shaft 210. In an implementation, the stent cutting chamber can be at least partially arced or circular in cross-section. The upper and lower surfaces of the cutting chamber can be curved or non-planar. As an example, the lower portion 222 of the cover 214 can be recessed forming a concavity forming arched ceiling to the cutting chamber. The floor of the cutting chamber formed by the projection 271 may incorporate a corresponding concavity. The arched ceiling and recessed floor of the cutting chamber reduces the amount of open space created around the cut stent 105 relative to the inner walls of the shaft that could otherwise result in the push rod going off-track or allowing the cut stent 105 to divert off the desired path during deployment. Minimizing the air space within the shaft relative to the trephine stent 105 improves advancement of the stent 105 through the device. The cut stent 105, in turn, can have a cross-sectional shape that conforms more closely to the cross-sectional shape of the delivery conduit through which the stent 105 must be advanced. The corresponding shape eliminates excess space on the upper and lower sides of the cut stent 105 relative to the conduit. This, in turn, provides better guidance for the pusher 320 to advance the cut stent 105 towards the distal end of the shaft. The stent 105 can also be cut to be oversized relative to the conduit as discussed elsewhere herein and compressed, compacted, or otherwise manipulated within the conduit prior to deployment.

Figure 4F:
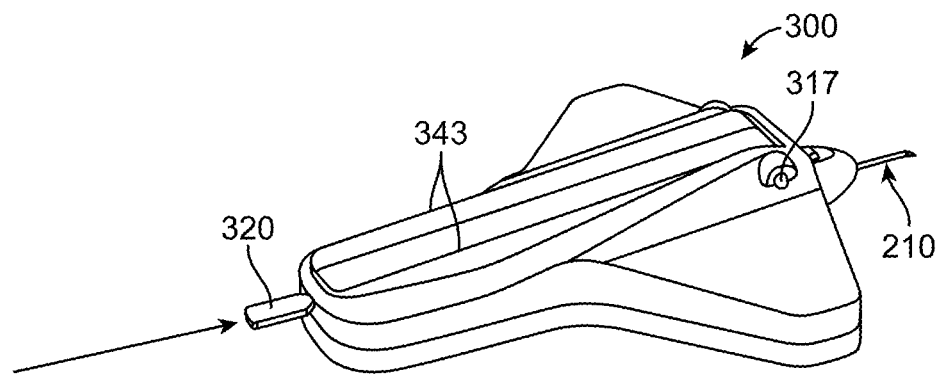
FIGS. 4F-4G illustrate the pusher of the cutting device of FIG. 4A in advanced and withdrawn configurations, respectively, relative to the base of the cutting device.
Figure 4G:
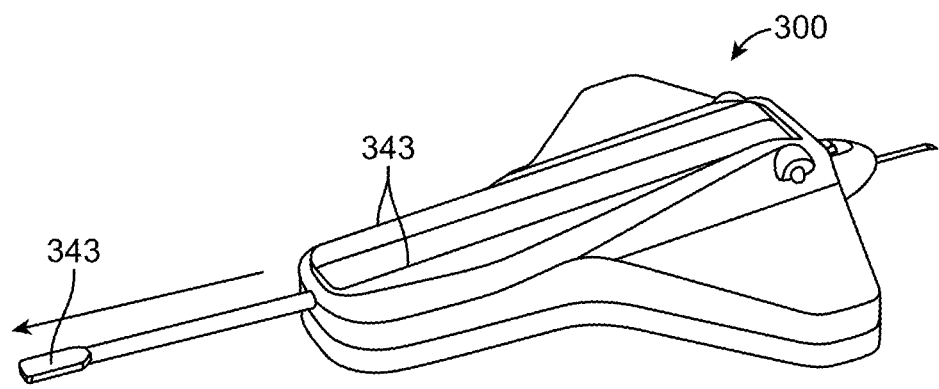
Figure 4H:
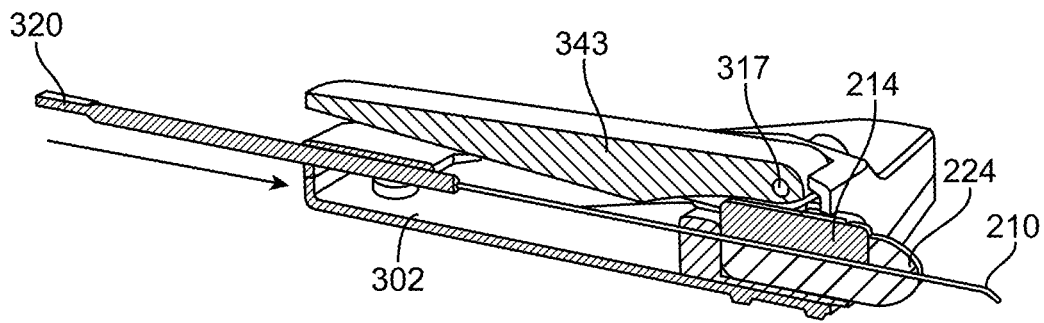
FIG. 4H is a cross-sectional view of the cutting device of FIG. 4G.
Figure 4I:
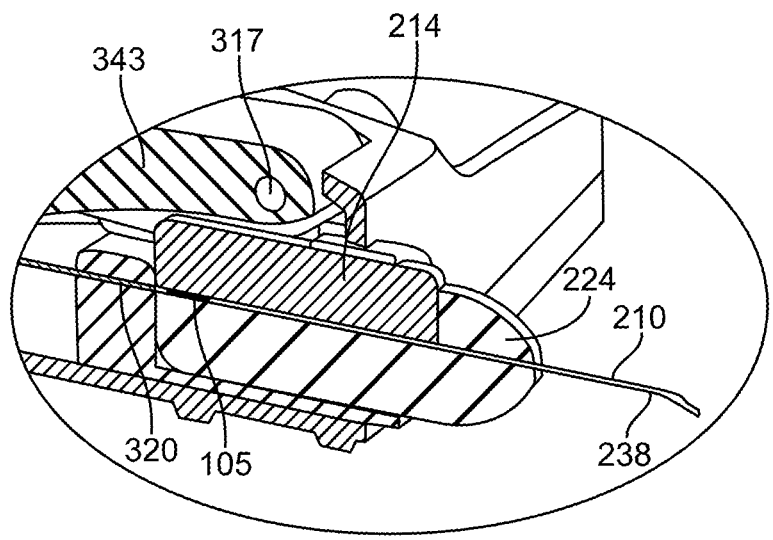
FIGS. 4I-4J are cross-sectional partial views of the cutting device of FIG. 4F.
Figure 4J:
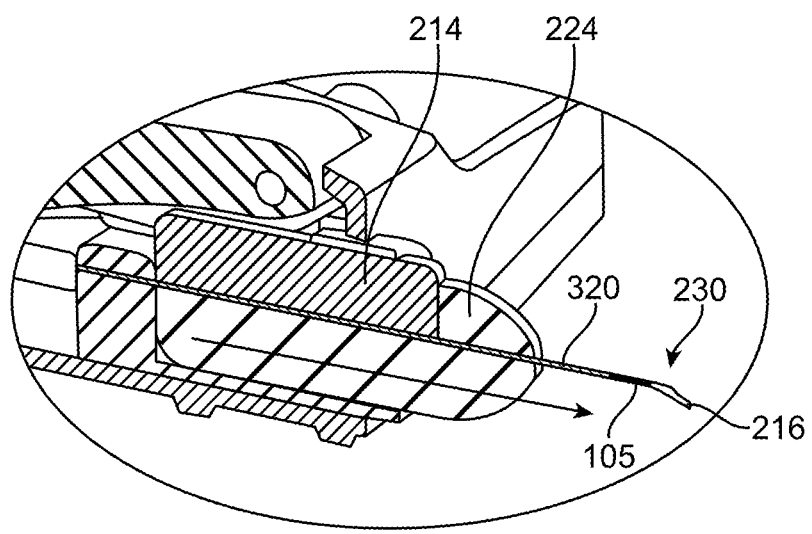

The stent 105, once cut, can be axially aligned with the lumen 238 of the shaft 210 of the cartridge 200. FIGS. 4F-4G and also FIGS. 4H-4J show the cutting device 300 can include a pusher 320 configured to slide distally relative to the base 302 into a proximal end region the cartridge 200 to advance the cut stent 105 from the location of this complete enclosure along the implantation conduit into the lumen 238 of the shaft 210. The pusher 320 is not visible in the implementation of FIG. 6. However, the base 302 can include an actuator 304 such as a dial, button, slider, or other input that is operatively coupled to a proximal end region of the pusher 320 that upon actuation causes the pusher 320 to move distally relative to the base 302. Any of a variety of user actuators 304 are considered herein to move the pusher 320 to prime the stent 105 in place relative to the lumen 238. This priming step with the pusher 320 of the cutting device 300 ensures the cut stent 105 is held within a fully enclosed space on all sides (i.e. a region of the shaft 210) after removal of the cartridge 200 from the cutting device 300 and before coupling of the cartridge 200 with the delivery device 400.

FIG. 4H shows that while the handles 343 are urged downward towards the base 302 (e.g., the blades 344 positioned in the cutting configuration relative to the implant 105), the pusher 320 of the cutting device 300 can be advanced distally through the base 302. FIG. 4I shows the pusher 320 ready to engage the stent 105 within the recess 221 on a proximal end. FIG. 4J shows the pusher 320 has advanced the stent 105 distally into the lumen 238 of the shaft 210 of the cartridge 200. As mentioned above, the blades 344 besides, the cover 214 above, and the projection 271 below created the complete enclosure for the cut stent 105 on all sides preventing the stent 105 from buckling within the lumen 238 during this distal advancement into the lumen 238. The conduit within which the stent 105 is held is size-matched (or under-sized) to the outer dimension of the stent being implanted thereby preventing buckling and wrinkling as the stent 105 is urged into the primed position.

The stent 105 can be urged into a distal end region 212 of the shaft 210 and the cartridge 200 removed from the cutting device 300. Once the cutting device 300 and the cartridge 200 are disengaged with one another, the cartridge 200 is ready to be loaded with the delivery device 400 to insert the stent 105 into the eye.

The patch of material 101 can be cut and loaded within the shaft 210 of the cartridge 200 in a variety of ways. As discussed elsewhere, the patch of material 101 can be cut to substantially the same size as the conduit through which it will be delivered. The patch of material 101 can preferably be cut to a size that is slightly larger than the size of the conduit through which it is delivered so that the stent 105 is compressed and packed within the conduit so that it may be more easily advanced through the lumen 238. The cutting can be performed as described above with respect to FIGS. 4A-4E. The cutting of the patch of material and transfer into the shaft 210 can also be performed using other cutting assemblies 500 as described below and with respect to FIGS. 14A-14H. The cutting assemblies 500 described herein can form part of the tissue cartridge 200, the cutting device 300, or the delivery device 400. Preferably, the cutting assembly 500 is part of the cutting device 300. The cutting device 300 can couple to at least a portion of the cartridge 200 such as the nose cone assembly 274 with the distal shaft 210 extending from the nose cone 275 so that the cut stent 105 can be primed within the shaft 210 for delivery using the delivery device 400. The cartridge 200 can include a proximal portion 207 configured to hold the patch of material for cutting as shown in FIG. 2, 3A-3C, or 7A-7C or the removable nose cone 274 and shaft 210 as shown in FIGS. 9A-9D, 10A that does not include a proximal portion 207 for holding the patch of material. The loading of the stent 105 need not be performed by the cutting device 300 nor does the cutting device 300 need to engage with the cartridge 200 for loading of the cut stent into the cartridge. The cut stent 105 can be manually transferred from the cutting device 300 into a separate loading device 600 that is configured to engage with the cartridge 200 and load the cartridge with the cut stent 105. The cartridge 200 whether configured to hold a patch of material for cutting or not can be a transferrable component that is designed to couple with a cutting assembly, primed with the cut stent, removed from the cutting assembly, and coupled with a delivery device for deployment of the cut stent in the eye.

FIG. 14A shows an implementation of a cutting assembly 500. The cutting assembly can be part of a cutting device 300 configured to engage with a cartridge. The cutting assembly 500 can also be a separate component of a tissue preparation system that is configured to hold the patch of material 101 and cut the patch of material 101, but that is not configured to load the cut stent into a delivery shaft. The cutting assembly 500 can cut a patch of material 101, which can be held within the cartridge or within a region of the cutting assembly 500. The cut stent can be transferred from the cutting assembly 500 into a distal shaft 210 of the cartridge 200 for delivery through the shaft into an eye. The cut stent can be transferred, for example manually with tweezers, from the cutting assembly 500 into a loading system configured to load the cut stent into the distal shaft 210. The cutting assembly 500 can incorporate a cutting die 511 positioned relative to a slot 507 in a base 509 and a movable member 505 having planar bearing surface 513 coupled to the base 509. The movable member 505 can be swiveled 90 degrees relative to the base 509 from a first position to a second position. When the movable member 505 is swiveled to its second position the patch of material 101 can be placed against the bearing surface 513. The cutting die 511 can compress the patch of material 101 against the bearing surface 513. Advancing the cutting die 511 towards the bearing surface 513 can cut through the patch of material 101 (e.g., in one or two locations as described elsewhere herein). The excess tissue can be removed from the bearing surface 513 and the movable member 505 still holding the cut stent 105 on its bearing surface 513 swiveled back towards the first position. This arranges the cut stent 105 on the bearing surface 513 within the path of the slot 507 so that a compacting tool 517 or other member can load the cut stent 105 into the slot 507. The slot 507 can have a terminal region 508 that aligns with a longitudinal axis A of the distal shaft 210 when the cartridge 200 is coupled to the cutting device 300. The cut stent 105 can be urged by the compacting tool 517 at an angle to the longitudinal axis of the shaft 210, for example, orthogonal to the longitudinal axis of the shaft 210. The terminal region 508 can have a cross-sectional shape that is rounded similar to a cross-sectional shape of the distal shaft 210. The cut stent 105 positioned within the terminal region 508 can then be urged into the lumen of the distal shaft 210 so that it is primed for delivery. The size of the slot 507 and/or the terminal region 508 can be smaller than the size of the cut stent 105 so that advancement of the compacting tool 517 urging the cut stent 105 into the slot 507 causes the stent 105 to be compressed and compacted into a plug. Once the cut stent 105 is positioned within the distal shaft 210 of the cartridge 200, the cartridge 200 can be removed from the cutting device 300 and transferred to a delivery device 400 for deployment in the eye. The cutting, transferring, loading, and priming can be incorporated into a single assembly or into separate components configured to work in conjunction with one another.

FIG. 14B shows an interrelated implementation of a cutting assembly 500 for cutting the patch of material 101 and transferring the cut stent 105 for delivery. As with the embodiment of FIG. 14A, the cutting assembly 500 can be part of a cutting device 300 configured to engage with a cartridge. The patch of material can be held within a region of the cartridge for cutting or can be held by a portion of the cutting assembly 500. The cutting die 511 can insert through a movable element 515 referred to herein as a door, pad, or other component to cut the patch of material 101. The pad 515 can be configured to hold, apply pressure, and/or compress the tissue below it. The patch of material 101 can be positioned against a bearing surface 513. The bearing surface 513 need not be part of a movable member as in the prior implementation, but can be at least a portion of the base 509. The patch of material 101 can be compressed between the bearing surface 513 of the base 509 and the pad 515. The cutting die 511 can be advanced through the pad 515 so that blade(s) of the cutting die 511 slice through the patch of material 101. If the cutting die 511 has two blades (for example, two blades as shown in FIGS. 14A-14B, 14E, 14F-1 and also FIGS. 18E-18G, 22A, and 23C), the cutting die 511 slices through the patch 101 in two locations. If the cutting die 511 has a single blade, the cutting die 511 slices through the patch 101 at a single location. In the case of two blades, the blades can be positioned parallel to one another or may be angled. Angling the blades improves the reproducibility of the tissue cut so that a very straight piece of tissue is formed from the patch 101 without any bulging along the sides of the new cut stent. Angling of the blades will be described in more detail below.

After the patch of material 101 is cut the excess tissue can be removed and pressure applied by the pad 515 released. The cutting die 511 can include a spring 516 so that it returns to its initial position and the pad 515 and cutting die 511 no longer apply a pressure against the cut stent 105. The cut stent 105 can be positioned relative to a slot 507 in the base 509 so that the compacting tool 517 can urge the cut stent 105 through the slot 507 toward the terminal region 508. The positioning of the stent 105 can be performed manually by a user such as with tweezers or with a tool that is part of the cutting/loading system. FIG. 14B illustrates the cut stent 105 being loaded into the conduit from the side or orthogonal to the axis of the shaft 210. As discussed elsewhere, the cut stent 105 can be oversized relative to the size of the slot 507 so that urging the stent into the conduit compresses and compacts the stent 105 for delivery. The slot 507 can have a terminal region 508 that aligns with a longitudinal axis A of the distal shaft 210 when the cartridge is coupled to the cutting device 300. The cut stent 105 positioned within the terminal region 508 can then be urged into the distal shaft 210 so that it is primed for delivery. The cut stent 105 can be positioned within the terminal region 508 by urging the stent in a first direction (e.g., laterally relative to the longitudinal axis of the shaft 210) and then positioned within the distal shaft by urging the cut stent 105 in a second direction (e.g., along the longitudinal axis of the shaft 210). The cartridge, now containing the cut stent 105, can be removed from the cutting device 300 and transferred to a delivery device 400 for deployment in the eye.

Figure 14C:
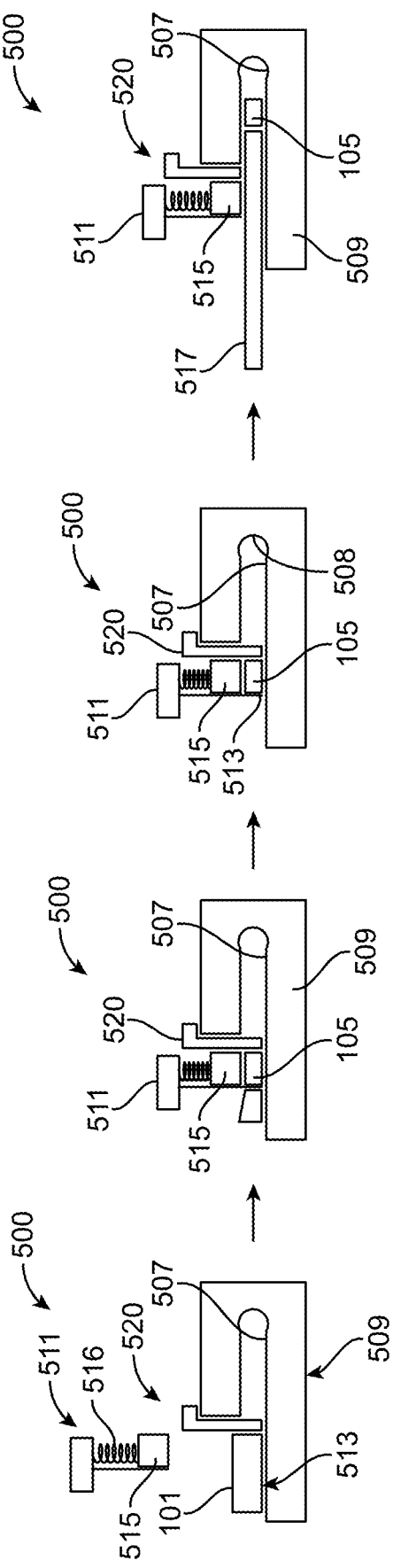

FIG. 14C shows an interrelated implementation of a cutting assembly 500 for cutting the patch of material 101 and transferring the cut stent 105 for delivery. The cutting assembly 500 can additionally incorporate a movable stop 520 positioned between the patch of material 101 and the slot 507 through which the cut stent 105 is to be advanced. The pad 515 and cutting die 511 can compress the patch of material 101 against a bearing surface 513 of the base 509. The patch of material 101 can be enclosed between the bearing surface 513 on an underside, the movable stop 520 on a distal side and the pad 515 on an upper side. The cutting die 511 can include a single blade (or two blades) and be advanced through the compressed patch of material 101 to cut the patch in a single location creating a stent 105. The cutting die 511, pad 515, and movable stop 520 can be withdrawn away from the cut stent 105 so that the compacting tool 517 can urge the cut stent 105 distally into the slot 507 for delivery. The terminal region 508 of the slot 507 can align with a longitudinal axis A of the distal shaft 210 when the cartridge is coupled to the cutting device 300. The cut stent 105 positioned within the terminal region 508 can then be urged into the distal shaft 210 so that it is primed for delivery as described elsewhere. FIG. 14I shows a nose cone assembly 274 arranged relative to the cutting assembly 500 of FIG. 14C. The longitudinal axis A of the distal shaft 210 of the nose cone assembly 274 can be aligned with the terminal region 508 of the slot 507 so that the compacting tool 517 can urge the cut stent 105 into the shaft 210. Once the cut stent 105 is compacted into the lumen 238 of the shaft 210 the nose cone assembly 274 can be removed from its association with the cutting assembly 500 and transferred to a delivery device 400 for deployment in the eye.

The position of the movable stop 520 relative to the cutting blade of the die 511 can be adjusted to achieve different stent widths. For example, the movable stop 520 can be moved toward the single blade of the cutting die 511 to decrease the width of the stent and moved away from the cutting die 511 to increase the width of the stent. The location of the movable stop 520 relative to the cutting die 511 can be selected by a user, for example, via a dial or other user interface that allows for incremental adjustments. The dial range can be between about 0.6 mm and about 1.9 mm and can include markings that are laid out per a ¼ to ¹⁄₁₆ thread. The cutting die 511 of the cutting assembly 500 can be attached to a lever, handle, or other actuator 343 as described elsewhere herein, to advance the single blade through the patch of material 101 held against the bearing surface 513 by the pad 515 upon selection of the width. In an implementation, the bearing surface 513 can be a soft plastic material (e.g., ¹⁄₁₆" 90 A silicone).

Figure 15A:
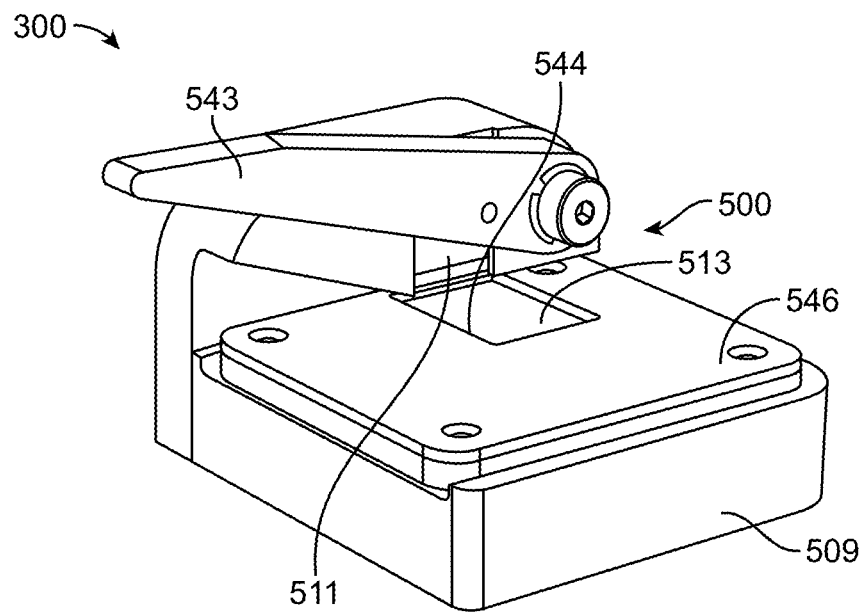
FIGS. 15A-15B illustrate another implementation of a cutting device for cutting a stent.
Figure 15B:
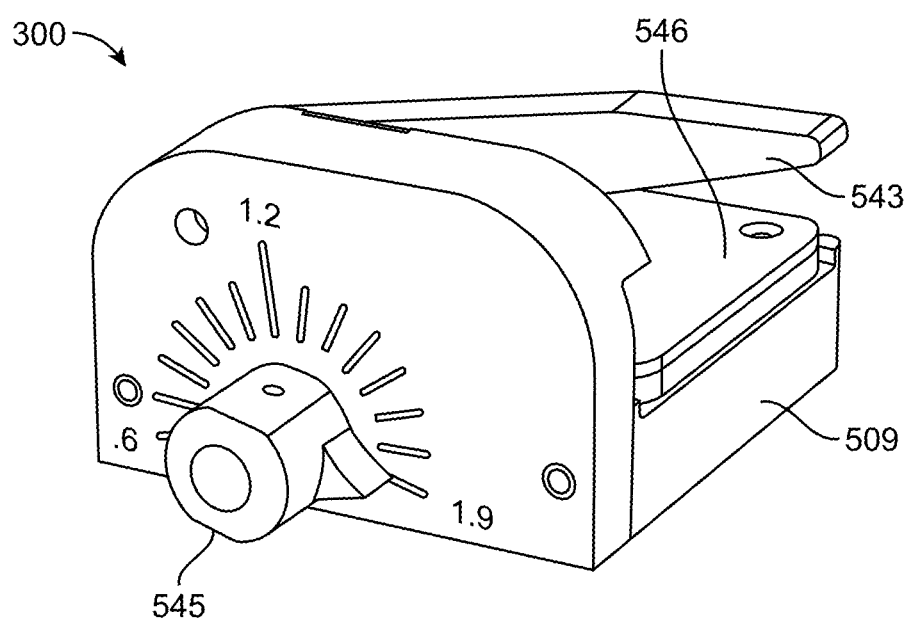

FIGS. 15A-15B illustrate a trephination or cutting device 300 having a cutting assembly 500. The cutting device 300 can include a handle or actuator 543 movably coupled to the base 509 to actuate the cutting assembly 500. For example, the actuator 543 is configured to raise and lower a cutting die 511 relative to the bearing surface 513 of the base 509. The actuator 543 configuration can vary as described herein including a lever or scissoring handles.

In other implementations, the actuator 543 is a lever configured to be raised and lowered to engage with a cutting die 511 that lies above the bearing surface 513 of the base 509. The actuator 543 can have a lower surface configured to pressed against an upper surface of the cutting die 511 urging it downward towards the bearing surface 513 of the base 509. The lever can provide a mechanical advantage for depressing the cutting die 511 although it need not be part of the cutting device 300. In some implementations, the upper surface of the cutting die 511 can form a button configured to be directly manually actuated to cut the stent. The bearing surface 513 is preferably a planar surface configured to hold the patch of material flat for cutting. The bearing surface 513 can be a recess 544 within the base 509 sized to hold a patch of material (not shown). The bearing surface 513 can be movable relative to the base 509 to expose the recess 544 for positioning the patch of material 101 within the recess 544.

In some implementations, the cutting die 511 includes a single blade that is movable to select a size of the stent being cut. The cutting device 300 can incorporate an actuator 545 such as a dial, button, slider, switch, or other type of actuator configured to adjust the position of the die 511 relative to the bearing surface 513 as discussed above. The actuator 545 can move the base 509 side-to-side via a threaded screw or other mechanism to change the position of the patch of material 101 on the bearing surface 513, such as held within the recess 544, relative to the cutting die 511 and thereby modify the width of the stent cut from the patch. Alternatively, the actuator 545 can move the die 511 relative to the bearing surface 513 to change the width of the stent. The cutting device 300 can incorporate a stage 546 configured to be movable relative to the base 509 such as by sliding, swiveling, or lifting away from the base 509. In some implementations, the stage 546 can slide within a single plane relative to the underlying base 509 while remaining connected to the base 509 at least in part. Alternatively, the stage 546 can be removed entirely from the base 509. Moving the stage 546 relative to the base 509 can reveal the recess 544 out from under the area of the device where the cutting die 511 and actuator 543 are located. This allows for loading of a patch on the bearing surface without the components of the cutting assembly 500 obstructing a user's view or blocking access physically. The cutting device 300 can be a solo cutter and need not incorporate a compression or holding mechanism or a transferring mechanism. Rather, the cut stent 105 following cutting with the cutting assembly 500 can be manually transferred to another tool for priming the cut stent 105 for deployment through a shaft. The cutting device 300 can be a micro-trephination device for minimal modification of a biologically-derived tissue. The device 300 is configured to cut the biologically-derived tissue in an elongated strip of tissue having a length that is greater than the width. The width can be less than about 3 mm and the length can be greater than about 3 mm. The biologically-derived tissue can be any of a variety of tissues described herein including scleral tissue or corneal tissue harvested from a donor the patient receiving the strip of tissue as an implant. The cutting die 511 can include a single sharpened edge to trim a larger portion of the biotissue to a desired width. The sharpened edge of the die 511 can be substantially straight such that the die 511 can cut a length of the tissue. The cutting die 511 can alternatively incorporate two sharpened edges that lie parallel to one another that are separated a corresponding width apart to achieve the width desired for the stent.

Figure 22B:
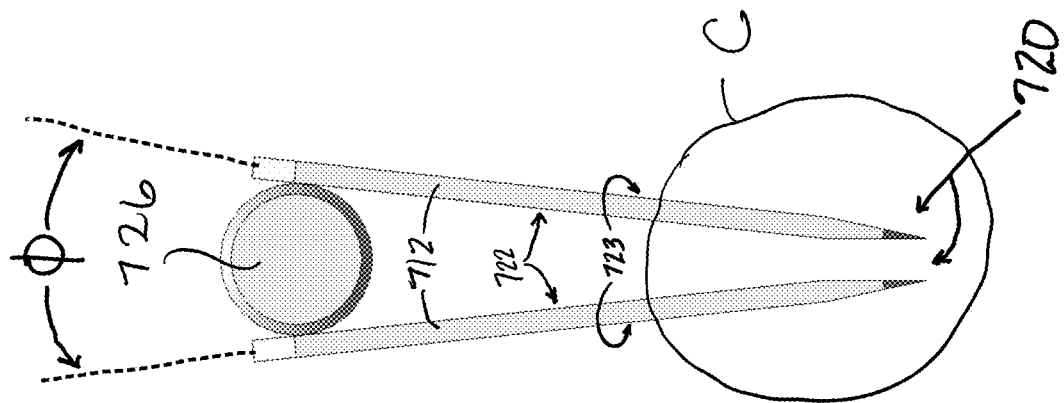
FIG. 22B is a detailed view of the blades of the trephining device of FIG. 21A.

The cutting die 511 can include a single blade having a sharpened edge or two blades each with sharpened edges. The sharpened edges can be formed by a single distal bevel or by dual distal bevels. The two blades can be spaced apart from one another in a precise manner in order to cut the patch of material in a single cutting actuation of the cutting die 511. The two blades can be spaced parallel to one another. In a preferred implementation (as best shown in FIGS. 22B-22C), the blades can be mounted at an angle to one another that accommodates for the angle of the distal bevel to ensure the inside spacing between the blades formed by the distal bevel is parallel to one another and orthogonal to the bearing surface. The various embodiments of the cutter described herein can include two blades that are angularly positioned in this manner. Where the cutter is described as having a single blade, the cutter can also include dual blades spaced a distance apart. And where the cutter is described as having dual blades spaced a distance apart, the blades can be positioned at an angle relative to one another so that their bevels are arranged parallel to one another.

Figure 14D:
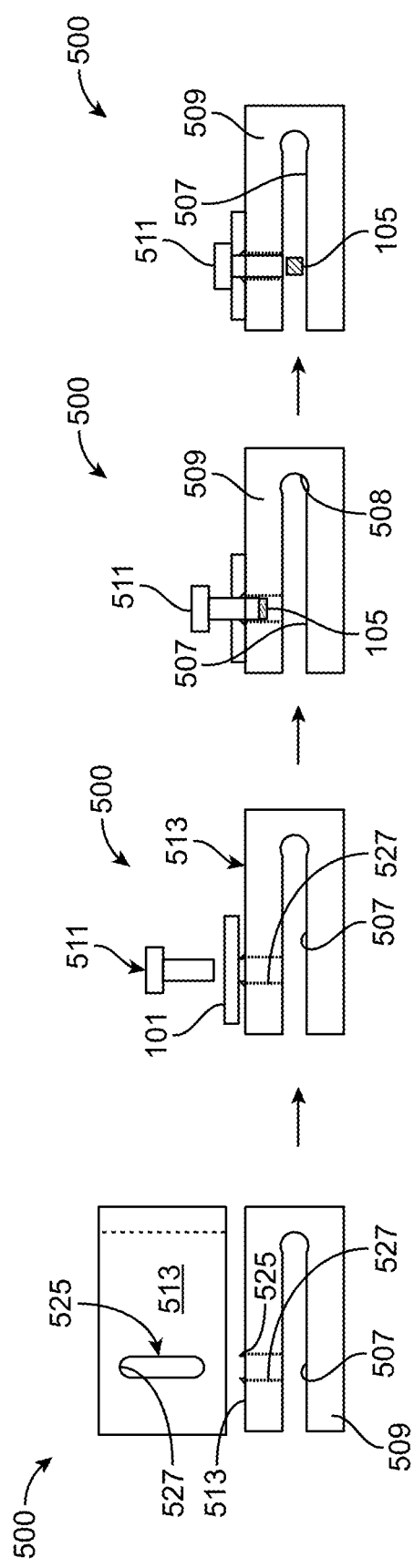

FIG. 14D shows an interrelated implementation of a cutting assembly 500 for cutting the patch of material 101. The cutting assembly 500 can include a paper hole punch sort of cutting. The left side of FIG. 14D illustrates the cutting assembly from a top-down view and also the cutting assembly from a cross-sectional view. Sharp corners or raised sharp edges 525 can project from the bearing surface 513. The sharp edges 525 can surround a hole 527 through the bearing surface 513 that leads directly into the slot 507 of the base 509. A patch of material 101 can be positioned against the bearing surface 513 over the hole 527 and against the sharp edges 525. A punch 511 can be urged against the patch of material 101 from above so that the patch of material 101 is cut by the sharp edges 525 and the cut stent 105 is urged through the hole 527 into the slot 507 by the punch 511. The cut stent 105 can then be arranged within the slot 507 so that a pusher (not shown in FIG. 14D) may urge the cut stent 105 through the slot 507 towards the terminal end 508. The terminal region 508 of the slot 507 aligns the cut stent 105 with the longitudinal axis A of the distal shaft 210 so that the stent can be urged into the distal shaft 210 so that it is primed for delivery. The cartridge can be removed from the cutting device 300 and transferred to a delivery device 400 for deployment in the eye.

Figure 14E:
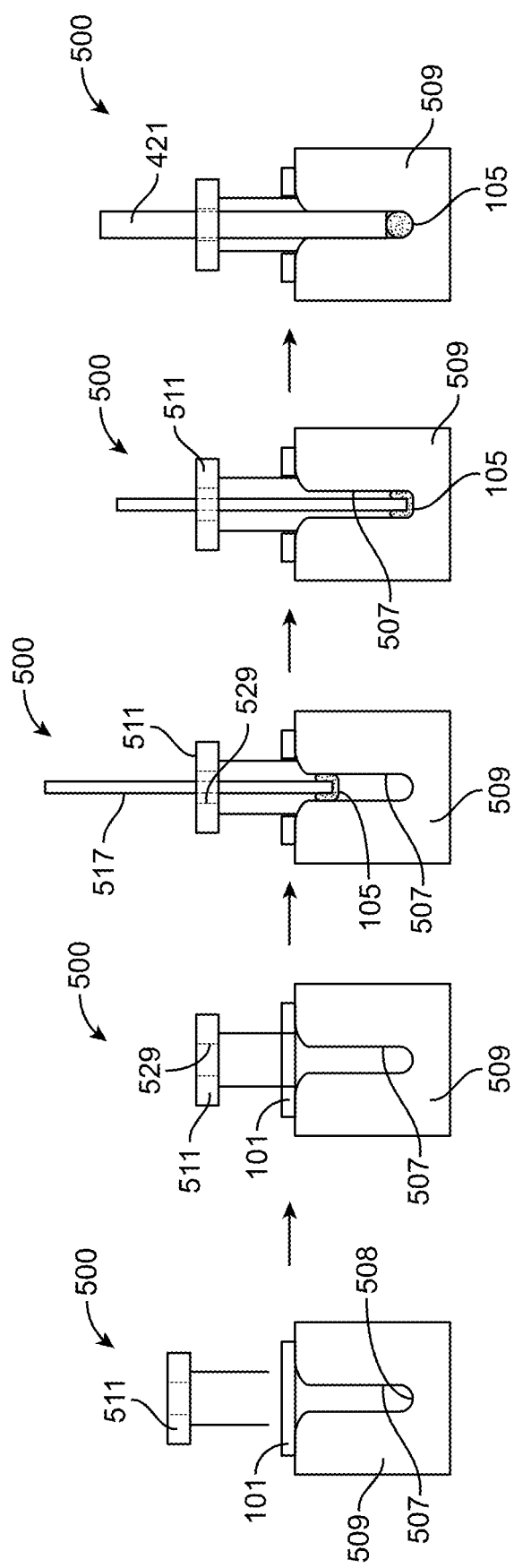

FIG. 14E shows an interrelated implementation of a cutting assembly 500 for cutting the patch of material 101. The cutting assembly 500 can also incorporate a money plunger sort of cutting. The patch of material 101 can be positioned over a slot 507 in a base 509 and a cutting die 511 urged from above against the material 101 so that the cutting edges of the die 511 can slice through the patch of material 101 in two locations to cut the stent 105 to length. A compacting tool 517 can be advanced through a bore 529 in the die 511 to drive the cut stent 105 into the slot 507 urging it to a terminal region 508 of the slot 507. The compacting tool 517 or an additional compression tool 421 can be advanced through the bore 529 in the die 511 to compress the cut stent 105 within the terminal region 508 of the slot 507 to compact it and align the cut stent 105 with the distal shaft 210 so that it is primed for delivery. The cartridge can be removed from the cutting device 300 and transferred to a delivery device 400 for deployment in the eye.

Figures 1, 14F:
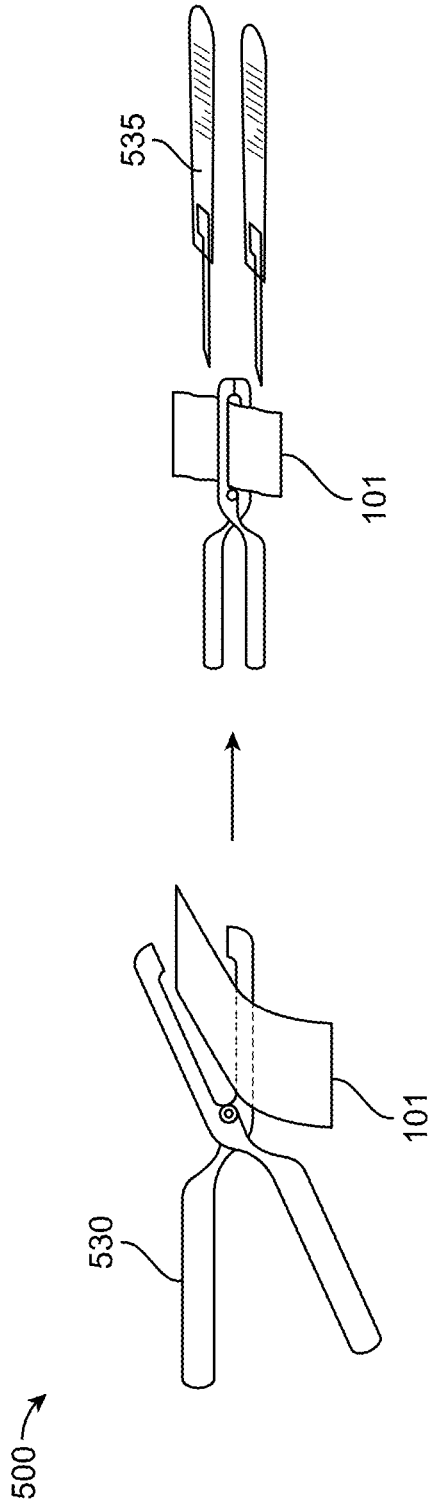
Figures 2, 14F:
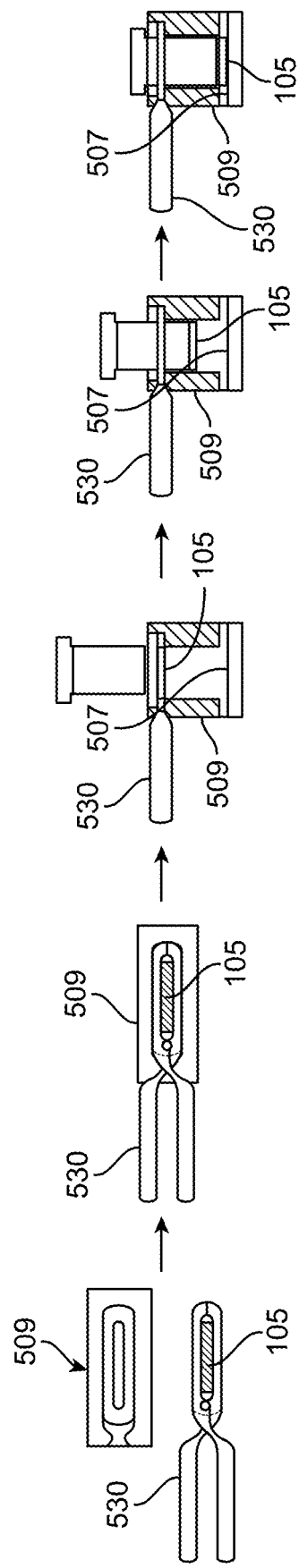

FIG. 14F-1 through FIG. 14F-2 show an interrelated implementation of a cutting assembly 500 for cutting the patch of material 101. The cutting assembly 500 can incorporate forceps-like tool 530 to clamp the patch of material 101. A scalpel or other cutting tool 535 can be used to trim the patch of material 101 held by the forceps 530 to length. The forceps 530 holding the cut stent 105 can be arranged relative to a base 509 and the clamp pressure of the forceps 530 released. A compacting tool 517 can be advanced through the forceps 530 to urge the cut stent 105 from the forceps 530 into a slot 507 of the base 509 for compressing and compacting the cut stent 105 for delivery as described above.

Figure 14G:
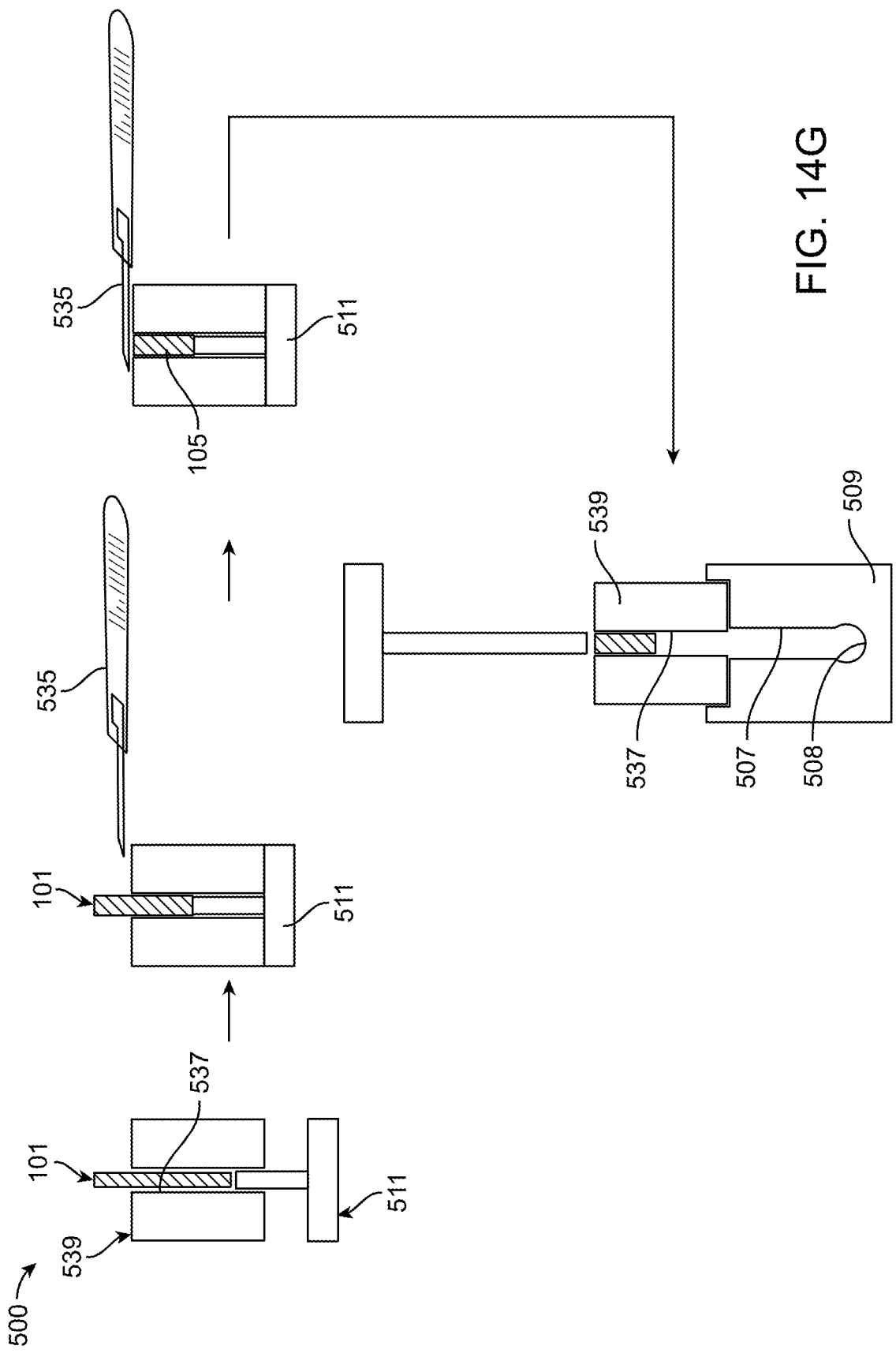

FIG. 14G shows an interrelated implementation of a cutting assembly 500 for cutting the patch of material 101. The cutting assembly 500 can incorporate a plunger 511 configured to compress a patch of material 101 within a transfer slot 537 of a transfer base 539. The patch of material 101 can be trimmed to size with a scalpel or other cutting tool 535. The cut stent 105 within the transfer slot 537 can be transferred by attaching to the transfer base 539 to a base 509 with a defined slot 507 in a manner that aligns transfer slot 537 to slot 507 for compressing and loading of the cut stent 105 using a compacting tool 517 for deployment.

FIG. 14H shows an interrelated implementation of a cutting assembly 500 for cutting the patch of material 101. The cutting assembly 500 can incorporate a rotating cylinder 540 configured to cut and arrange the cut stent 105 relative to a slot 507 in a base 509 for loading and compressing the stent 105 for delivery. The rotating cylinder 540 can incorporate an internal slot 542 for receiving at least a portion of the patch of material 101. Rotation of the cylinder 540 trims the excess tissue extending beyond the slot 542 in the cylinder 540. The cut stent 105 trimmed to length within the slot 542 of the cylinder 540 is then arranged relative to the slot 507 in the base 509 for loading and compression for delivery.

FIGS. 18A-18H show another implementation of a cutting device 300, also referred to herein as a trephining cartridge. The cutting device 300 can include a base 302 coupled to an actuator 343. The actuator 343 can be a lever configured to rotate around a pivot axis of a hinge 317. The actuator 343 is configured to actuate the cutting assembly 500 of the cutting device 300 to cut the patch 101 into a stent 105. The cutting assembly 500 can include a cutting die 511 attached to at least one blade 547 and a pad 515 movably coupled to the base 302. The cutting die 515 is movable relative to the pad 515 so that the blade(s) 547 can move between a retracted and extended position. The blade(s) 547 remains enclosed within the pad 515 when in the retracted position. The blade 547 penetrates a hole 527 in the pad 515 and extends through to the lower surface of the pad 515 when in the extended position. The base 302 can include a bearing surface 513 positioned below the location of the hole 527 so that the blade(s) 547 is urged against the bearing surface 513 upon actuation of the cutting die 511. The bearing surface 513 can be located within a recessed region of the base 302, the recessed region having a shape and size configured to receive the patch of material 101 to be cut into a stent by the blade(s) 547. The recessed region of the base 302 can be positioned relative to the hole 527 so that a desired stent width is achieved when cutting the patch with the blade(s) 547. A region of the recessed bearing surface 513 can extend beyond an edge of the hole 527 by a distance that is equal to a desired width for the cut stent. A user can place the patch of material within the recessed region so that an edge of the material abuts against the far end of the recessed region so that upon extension of the blade(s) 547 through the hole 527 and against the bearing surface 513 the patch is cut into the desired width. The region of the base 302 that holds the patch need not be recessed, but is preferably planar so that the patch of material 101 sits relatively flush to the base 302 and substantially orthogonal to the blades during cutting.

Figure 18C:
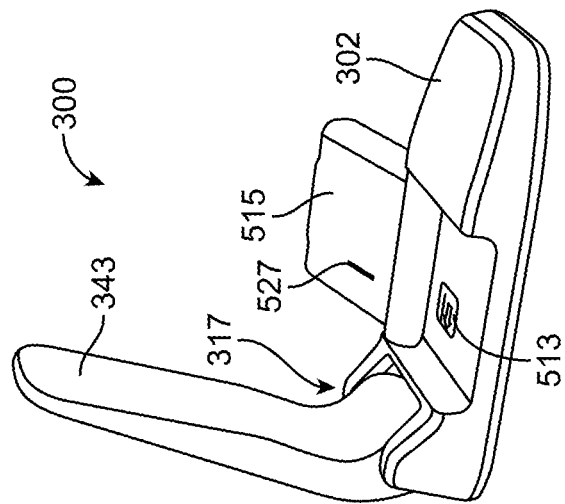
FIG. 18C illustrates the cutting device of FIG. 18B with the pressure pad in an open configuration revealing the bearing surface.
Figure 18B:
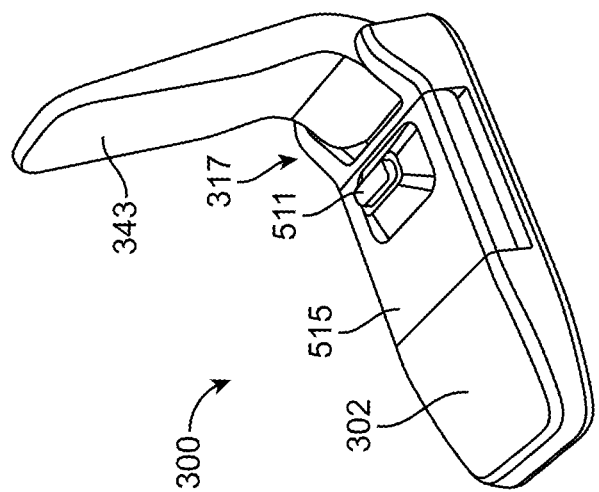
FIG. 18B illustrates the cutting device of FIG. 18A having the handle articulated into an open configuration.
Figure 18A:
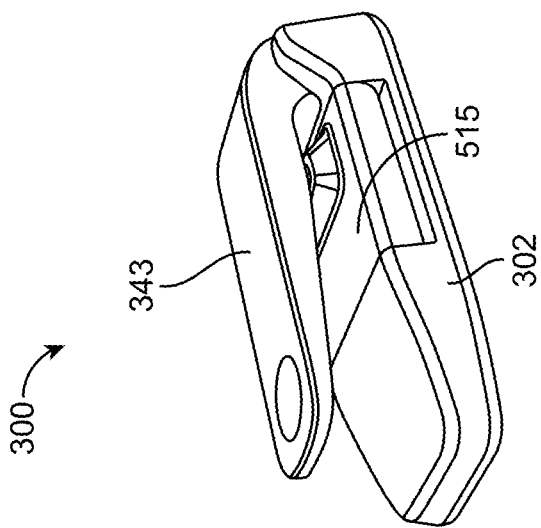
FIG. 18A illustrates an implementation of a cutting device.
Figure 18E:
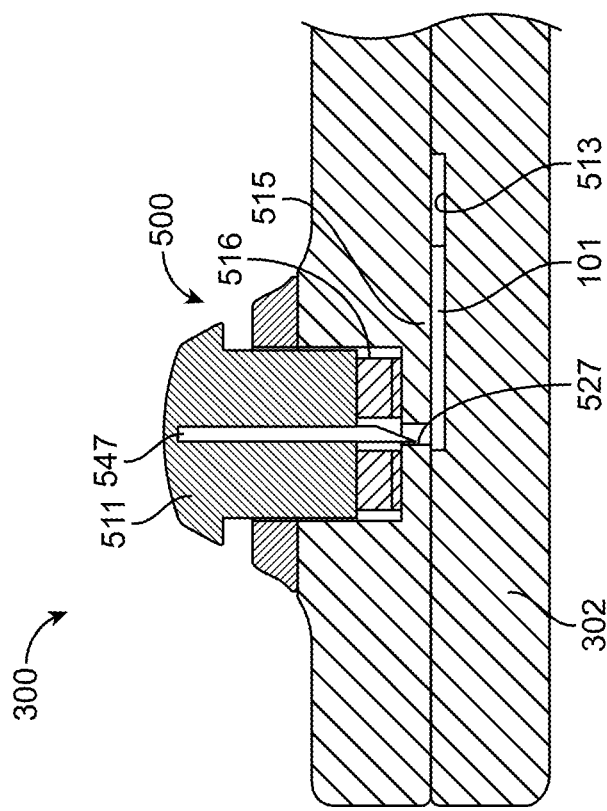
FIG. 18E is a schematic of the cutting assembly of the cutting device of FIG. 18A.
Figure 18D:
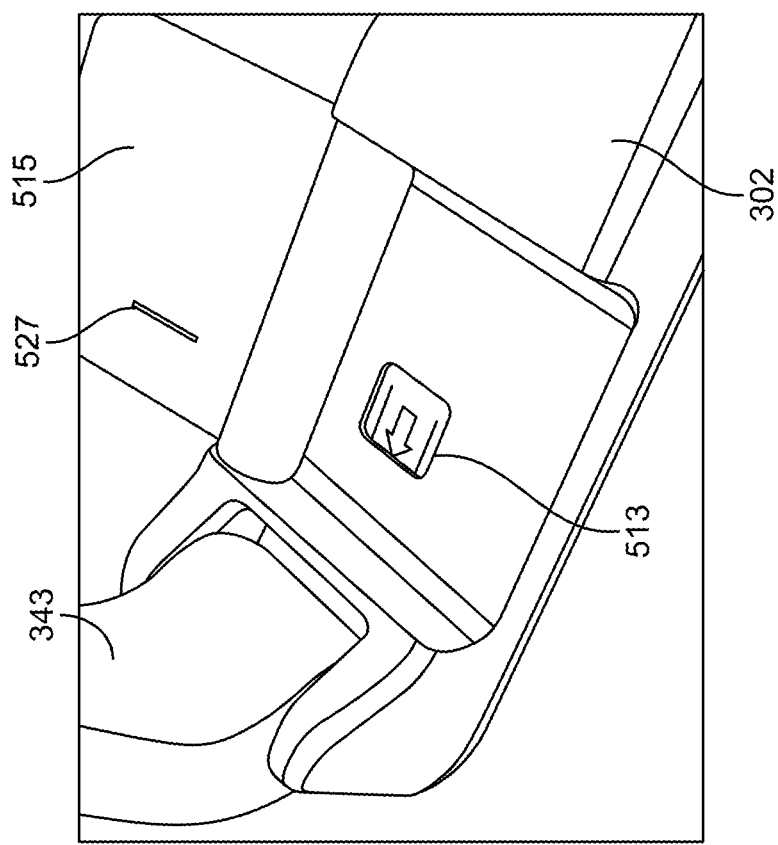
FIG. 18D is a detailed view of the cutting device of FIG. 18C.

The pad 515, which may be referred to as a door, pressure pad, or compression element, can be coupled to the base 302 so that it articulates between an open configuration as shown in FIGS. 18C-18D and a closed configuration as shown in FIGS. 18A-18B. The open configuration reveals the bearing surface 513 of the base 302 so that the tissue patch 101 may be positioned against it. The pad 515 can be articulated to the closed configuration over the tissue patch 101. FIG. 18E illustrates the patch 101 positioned against the bearing surface 513 of the base 302 under the hole 527 in the pad 515 with an edge of the patch 101 up against an end of the recessed region. The blade(s) 547 of the cutting die 511 is in a retracted configuration. One or more leaf spring(s) 516 can urge the cutting die 511 upward away from the base 302 so that the blade(s) 547 retracts inside the pad 515. The handle 343, which is an open configuration to load the patch 101, can be articulated to the closed configuration over the cutting die 511. Articulation of the handle 343 so that its lower surface presses against the upper surface of the cutting die 511 urges the cutting die 511 downward and compresses the springs 516. The pad 515 can fix and compress the patch 101 against the bearing surface 513 prior to actuating the blade(s) 547 of the cutting assembly 500. The handle 343 can additionally apply compression on the patch 101 urging it against the bearing surface 513. The blade(s) 547 of the cutting die 511 travels through the hole 527 and penetrates the patch 101 to form the cut stent. Upon release of the handle 343, the springs 516 urge the cutting die 511 upward so the blade(s) 547 is moved away from the bearing surface 513 back into the hole 527 of the pad 515. The handle 343 can be articulated to an open configuration and the pad 515 articulated to an open configuration revealing the cut stent within the recessed region of the base 302. The cut stent can be transferred manually to a loading device 600.

As mentioned, the cutting die 511 can include a pair of blades 547. The blades 547 can be spaced apart from one another in a precise manner in order to cut the patch of material 101 in a single cutting actuation of the lever 343. The blades 547 can be spaced parallel to one another. In a preferred implementation, the blades 547 are mounted at an angle to one another. The angle between the blades 547 accommodates for the angle of the bevel at the distal cutting edge of the blades 547 ensuring the inside space between the blades 547 (at least the portion of the blades 547 that penetrate the tissue) is parallel and straight faced.

Each blade 547 includes a sharp, distal cutting edge formed by at least one distal bevel. The two blades 547 are mounted at an angle relative to one another so that the inner faces are non-parallel and the distal bevels are parallel to one another. As described in more detail below, the distal bevels of the blades 547, despite the inner faces of the blades 547 themselves being non-parallel, are parallel to one another and substantially orthogonal to the planar surface of the bearing surface and thus, the patch of tissue being cut. The angling of the blades is described in more detail below with regarding to FIGS. 22B-22E and FIGS. 23A-23C. The embodiment of the blade cartridge described below with the angled blades is relevant to the blades of the cutting die of the embodiment shown in FIGS. 18A-18H and others.

Figure 18F:
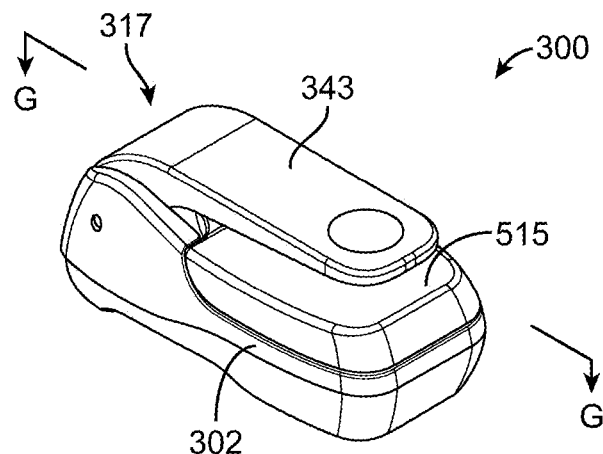
FIG. 18F is a perspective view of an interrelated cutting device of FIG. 18A.
Figure 18G:
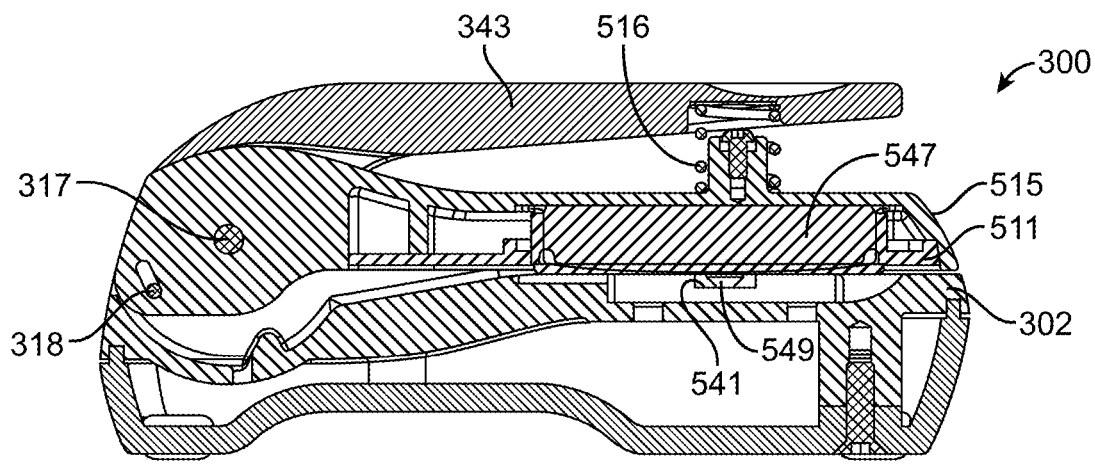
FIG. 18G is a cross-sectional view of the device of FIG. 18F taken along lines G-G.
Figure 18H:
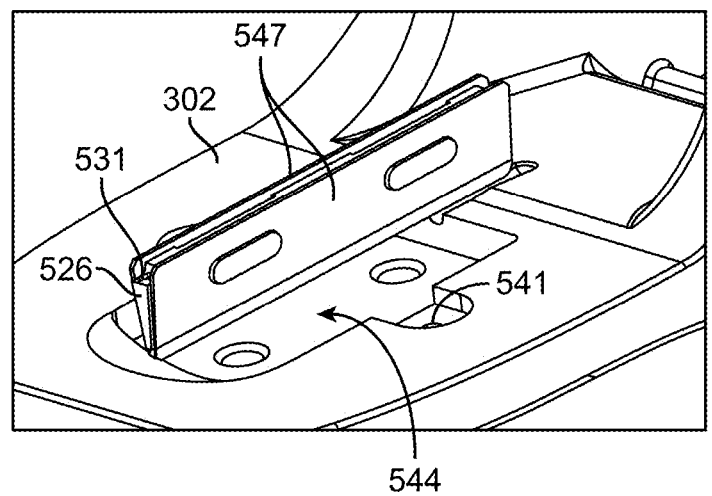
FIG. 18H is a detail view of the dual blades of the device of FIG. 18F.

FIG. 18F is an interrelated embodiment of the cutter of FIGS. 18A-18E. FIG. 18G is a cross-sectional view of the cutting device 300 of FIG. 18F taken along line G-G. FIG. 18H shows the dual angled blades 547 of the cutting device 300 with the upper half of the device including the lever actuator 343 removed.

Like the embodiment in FIG. 18A, the cutting device 300 includes a base 302 coupled to an actuator 343. The actuator 343 can be a lever configured to rotate around a pivot axis of a hinge 317. The actuator 343 is configured to actuate the cutting assembly 500 of the cutting device 300 to cut the patch 101 into a stent 105. The cutting assembly 500 can include the cutting die 511 attached to at least one, and preferably two blades 547. The cutting die 511 and blades 547 can be coupled to a pad 515 that is movably coupled to the base 302 around hinge 317. In some configurations, the cutting die 511 and attached blades 547 are movable relative to the pad 515. In other configurations, the cutting die 511 and attached blades 547 are fixed relative to the pad 515 so as to move together with the pad 515 around the hinge 317. The blades 547 can, but need not be fully enclosed within the pad 515 prior to actuation of cutting. The blades 547 can extend through the lower surface of the pad 515 (either via actuation or simply by being fixed relative to the pad 515 in that manner) so that the blades 547 can be urged against the bearing surface (not shown in FIG. 18G-18H) upon actuation of the cutting die 511.

The bearing surface 513, which is sized and shaped to receive the patch of material 101 to be cut into a stent by the blades 547, can be located within a recessed region 544 of the base 302. The bearing surface 513 and be a removable planar element configured to be affixed to the base 302 relative to the blades 547 for supporting the patch of material 101. The coupling of the bearing surface 513 to the base 302 can be reversible such that the bearing surface 513 can be replaced over time, if desired, without needing to dispose of the entire cutting. The bearing surface 513 can be coupled to the base 302, such as by one or more fixators like a screw. FIGS. 18G-18H illustrates two bores 541 located near the recessed region 544 of the base 302 that are sized to receive screws 549 that affix the bearing surface relative to the base 302. Other mechanisms to ensure the bearing surface 513 remains in place within the base 302 are considered as well including a tool-less snap fit or interference fit between the removable bearing surface 513 and the base 302. The planar bearing surface 513 is preferably positioned orthogonal to the sharpened edges of the blades 547 during use, as will be described in more detail below. The blades 547 can also be removably attached to the pad 515 so that they may be replaced, if desired, if the cutting edges of the blades 547 have become dull.

The pad 515 is coupled to the base 302 so that it articulates around hinge 317 between an open configuration and a closed configuration as described above with regard to FIGS. 18A-18E. The open configuration reveals the bearing surface 513 of the base 302 so that the patch 101 may be positioned within the cutting device 300 against the bearing surface 513. The pad 515 can be articulated to the closed configuration such that the blades 547 are located over the patch 101. In some implementations, closing the pad 515 relative to the base 302 can hold (with or without compression or pressure) the patch 101 within the cutter 300 until actuation of the lever 343 relative to the pad 515 causes the blades 547 to cut through the patch 101. A return spring 516 can urge the lever 343 and the cutting die 511 with the attached blades 547 upward away from the bearing surface 513 of the base 302. The return spring 516 thus retracts the blades 547 slightly relative to the pad 515. The lever 343 can be moved around the pivot axis of hinge 317 to close the pad 515 relative to the base 302. The lever 343 may also be moved around its own pivot axis of a second hinge 318 so as to move relative to the pad 515. This articulation relative to the pad 515 causes complete cutting of the patch 101 by the blades 547 because the blades 547 are urged fully against the bearing surface 513. Thus, the pad 515 can act to close the cutting device 300 and fix the patch relative to the base 302 prior to actual cutting, which can occur upon further actuation of the lever 343 relative to the pad 515 around axis 318. The blades 547 of the cutting die 511 may travel further downward relative to the bearing surface 513 to form the cut stent from the patch 101. Upon release of the lever 343, the springs 516 urge the cutting die 511 upward so that the blades 547 are moved away from the bearing surface 513. The lever 343 can be articulated around axis 317 back to an open configuration opening the pad 515 revealing the bearing surface 513. The cut stent can be transferred manually to a loading device such as those described herein.

In other implementations, the blades 547 are fixed relative to the pad 515 so that merely closing the pad 515 relative to the base 302 causes the cutting edges of the blades 547 to penetrate and cut the patch 101. A user can actuate the cutting device 300 using the lever 343. The pad 515 can be rotated around the pivot axis of hinge 317 by the lever 343 to close the pad 515 relative to the base 302. The lever 343 can be movable relative to the pad 515 to rotate around the pivot axis of the second hinge 318. This motion compresses the return spring 516 and applies an amount of cutting pressure against the pad 515 urging it toward the tissue on the bearing surface 513. The return spring 516 in this configuration provides a tactile feel to a user that prevents a user from squeezing the pad 515 closed too tightly against the bearing surface 513 and causing damage to the cutting edges of the blades 547. Motion of the lever 343 relative to the pad 515 provides the user with some feedback that they have reached the end of travel of the pad 515 to prevent inadvertent damage to the blades 547 during cutting.

The blades 547 can be mounted at an angle relative to one another to accommodate for the angle of the bevel of the distal cutting edges. The mount angle of the blades 547 ensures the cutting edges are spaced parallel and straight-faced to one another and orthogonal to the bearing surface 513. FIG. 18H shows a spacer 526 positioned between the blades 547 providing the angle of the blades 547 relative to one another. The angling of the blades 547 relative to one another and with regard to the geometry of their cutting edges is described in more detail below with regard to FIGS. 22A-22E and also FIGS. 23A-23C. Description of blades 712 shown in those figures are relevant to the blades 547 of FIGS. 18A-18E, and also blades 547 of FIGS. 18-18H.

The cutting die 511 can include an ejection spring 531 positioned between the blades 547. The ejection spring 531 aids in ejecting the cut stent 105 from between the blades 547 after cutting action is complete. Ejecting the cut stent 105 out from between the blades 547 allows for a user to more easily grasp the cut stent 105, such as with forceps, in order to load the stent into a delivery device. The spring 531 can be a coil spring, leaf spring, foam, or other sprung mechanism that aids in pushing the stent 105 out from between the two blades 547. The ejection spring is described and shown in more detail below in FIGS. 23A-23C.

Figure 21A:
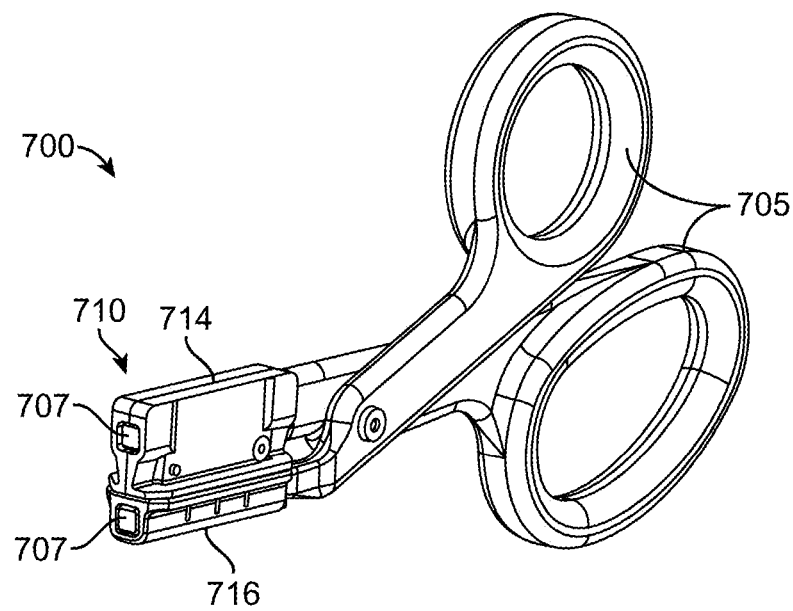
FIG. 21A is a perspective view of an implementation of a trephining device engaged with a blade cartridge.
Figure 21B:
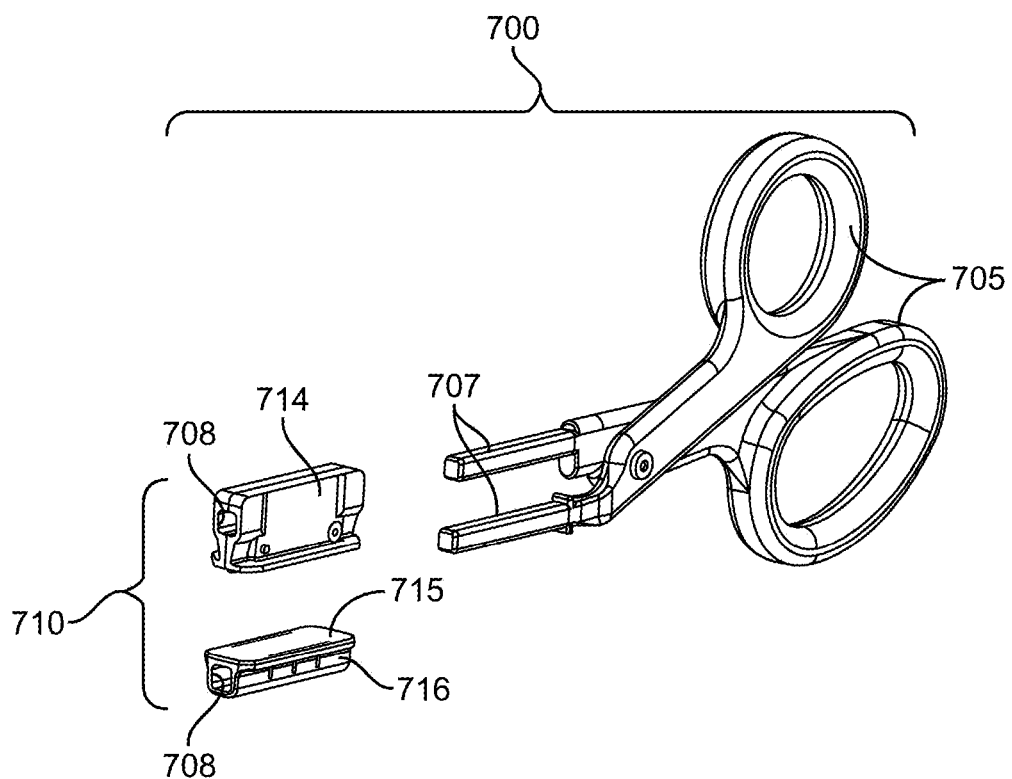
FIG. 21B is a perspective view of the trephining device of FIG. 21A with the blade cartridge uncoupled.

FIGS. 21A-21B illustrate an interrelated implementation of a trephining or cutting device 700 having a blade cartridge 710 with at least one, and preferably two, blades 712. The two blades 712 allow a user to cut a patch of material 101 at two locations of a patch of material 101 in a single actuation to form the stent 105. The blade cartridge 710 can include an upper component or jaw 714 and a lower component jaw 716. The upper jaw 714 can include the blades 712 and the lower jaw 716 can include the bearing surface 715. The bearing surface 715 is a planar surface sized to hold the patch of material 101 in a flat orientation relative to the blades 712 so that it may be cut upon actuation. Use of the relative positional terms, "upper" and "lower" are for purposes of clarity in orientation of the components relative to one another and are not intended to be limiting. For example, the blades may be positioned on the upper component and over the lower component as shown in the embodiments of FIGS. 18A-18H and 21A-21B. Alternatively, the blades may be positioned on the lower component and under the upper component.

The cutting device shown in FIGS. 18A-18H has an actuator configured to cause the blades to cut the patch of material into the implant. The actuator is a lever 343 configured to move the cutting die 511 relative to the patch. The cutting device shown in FIGS. 21A-21B also has an actuator configured to cause the blades to cut the patch. In this implementation, actuation is achieved using scissoring handles 705 that are reversibly coupled to the blade cartridge 710. For example, the handles 705 can include first and second handle portions coupled together by a hinge in a scissoring arrangement. The scissor design of the handles 705 opens the blade cartridge 710 attached to the handles 705 upon spreading the handles 705 apart and closes the blade cartridge 710 upon returning the handles 705 to a closed configuration. Opening the blade cartridge 710 separates the upper jaw 714 from the lower jaw 716 of the blade cartridge 710 revealing the bearing surface 715 of the lower jaw 716. This allows for the patch of material 101 to be placed on the bearing surface 715 prior to cutting. Closing the blade cartridge 710 after positioning the patch of material 101 on the bearing surface 715 causes the upper jaw 714 to approach the lower jaw 716 of the blade cartridge 710 until the blades 712 penetrate the patch of material 101 on the bearing surface 715. The actuation of the cutting devices described herein can vary including the scissoring actuation of the handles as well as actuation using a lever to move a cutting die as described with regard to FIGS. 18A-18H. It should be appreciated that the blade cartridge shown in FIGS. 21A-21B may also be actuated using a lever system like in FIGS. 18A-18H and vice versa. Any of a variety of actuations of cutting are considered herein.

The bearing surface 715 can be soft plastic material (e.g., silicone having Shore 90 A hardness) that is configured to prevent dulling or harming the blades 712. The bearing surface 715 can incorporate one or more markings that aid in guiding a user to cut the tissue to the desired shape.

The relative configuration of the blades 712 and the bearing surface 715 can vary. For example, the blades 712 may be positioned on the upper or the lower jaw with the bearing surface 715 positioned on the opposite jaw. The scissoring handles 705 of the trephining device 700 can be universal in that the device 700 may be usable by both right and left-handed users.

As mentioned, the blade cartridge 710 can be removably installed on the handles 705. This allows for disposal of the blades when the cutting edges become dull. The blade cartridge 710 can be removed from the handles 705 and replaced with a new blade cartridge 710 having fresh and sharp blades 712. Similarly, the cutting die 511 in the embodiment shown in FIG. 18E can be replaced. The cutting assembly 500 includes a cutting die 511 with at least one blade 547 that is configured to be movable relative to the pad 515 and to the bearing surface 513 upon actuation of the lever 343. The cutting die 511 with its attached blade(s) 547 may be removed from the pad 515 so that upon dulling of the blade(s) 547, the die 511 can be replaced with a new die 511 having fresh blade 547.

FIG. 21A shows the trephining device 700 with the blade cartridge 710 installed on the handles 705 and FIG. 21B shows the blade cartridge 710 removed from the handles 705. Each handle portion of the handles 705 can include rod-shaped protrusions 707 at their distal ends having a size, shape, and length that are configured to receive corresponding bores 708 extending through the upper and lower jaws 714, 716 of the blade cartridge 710 from at least a proximal end towards a distal end. The first handle portion has a first protrusion 707 configured to insert through a proximal opening into the bore 708 of the lower jaw and the second handle portion has a second protrusion 707 configured to insert through a proximal opening into the bore 708 of the upper jaw. The bores 708 can be positioned through a region of the jaws that avoid interfering with the cutting by the blades 712. Spreading the handle portions apart scissors the protrusions 707 apart and thus the jaws apart. The attachment between the bores 708 and the protrusions 707 can incorporate features configured to provide reversible, toolless engagement between them including slip fit, interference fit, snap fit, bayonet, and other types of attachments. It is desired that the jaws 714, 716 of the blade cartridge 710 are prevented from rotating relative to their respective protrusion 707 to ensure the blades 712 and the bearing surface 715 are kept normal to each other. The projections 707 are shown having a square cross-section to prevent the jaws 714, 716 of the blade cartridge 710 from rotating around the axis of the protrusions 707. In an implementation, the attachment is a slip fit or an interference fit onto the protrusions 707 that prevents rotation of the blade cartridge 710 following attachment. Any of a variety of shape is considered (e.g., oval, rectangular, triangular, or other non-circular geometric shape). The attachment between the handles 705 and the blade cartridge 710 may vary as is known in the art. The upper and lower attachments may be identical allowing a user to select a desired orientation relative to the handles 705.

The upper and lower jaws 714, 716 are shown in FIG. 21B fully separate components that aside from their attachment to the protrusions 707 on the handles 705 are not coupled to one another. The upper and lower jaws 714, 716 may also be hingedly coupled to one another.

The blade cartridge 710 also need not be removable from the handles 705 although it is preferred to remove the cartridge 710 from the handles 705 so that the cartridge 710 can be disposed of after a single-use and the handles 705 can be reused after re-sterilization with further blade cartridges 710. The handles 705 can be made of a material such as a metal or a plastic that is configured to be re-sterilized. One or more components of the blade cartridge 710 (e.g., the lower jaw 714 having the bearing surfaces 715) can be made of a material such as a plastic that is not configured for re-sterilization and is thus, single-use.

Figure 22A:
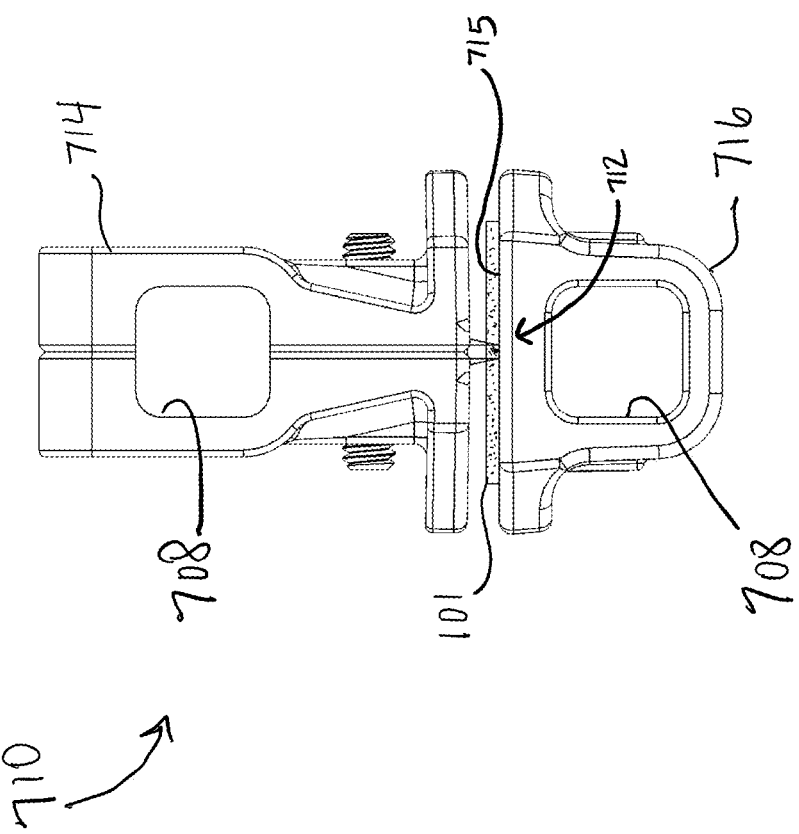
FIG. 22A is an end view of the trephining device of FIG. 21A showing the blades of the blade cartridge relative to the bearing surface.

FIG. 22A illustrates the blades 712 of the upper jaw 714 relative to the bearing surface 715 of the lower jaw 716. The blades 712 are spaced apart from one another in a precise manner in order to cut the patch of material 101 in a single cutting actuation of the handles 705 at two locations. In some implementations, the blades 712 are spaced parallel to one another. In a preferred implementation and as best shown in FIGS. 22B-22C, the blades 712 are mounted at an angle to one another that accommodates for the angle of the bevel ensuring the inside space between the blades 712 (at least the portion of the blades 712 that penetrate the tissue) is parallel and straight faced.

FIG. 22B is a detailed view of the blades 712 illustrating the angled mount and FIG. 22C is a detailed view of the blades of FIG. 22B taken at circle C. Each blade 712 includes a sharp, distal cutting edge 720 formed by at least one distal bevel. The two blades 712 are mounted at an angle relative to one another so that the inner faces are non-parallel and the distal bevels are parallel to one another. As described in more detail below, the distal bevels of the blades 712, despite the inner faces of the blades 712 themselves being non-parallel, are parallel to one another and substantially orthogonal to the planar surface of the bearing surface 715 and thus, the patch of tissue being cut.

At least the inner face, or both the inner and outer faces, of each blade 712 can be beveled to form the distal cutting edge 720. The inner face 722 of the blades 712 can be ground to achieve a first cutting surface 724 having a first cutting angle A1. The outer face 723 of the blades 712 can be ground to achieve a second cutting surface 725 having a second cutting angle A2. The first cutting angle A1 can be smaller than the second cutting angle A2. The cutting angle A1 of the first cutting surfaces 724 allow for the first cutting surface 724 of the first blade 712a to be arranged parallel to the first cutting surface 724 of the second blade 712b when the inner faces 722 of the blades 712a, 712b are positioned at an angle 4 relative to one another, for example, using a spacer 726 (shown in FIG. 22B). In other words, the non-parallel angle 4 of the blades 712a, 712b relative to one another ensures the cutting surfaces 724 of the inner faces 722 of the blades 712a, 712b are parallel to one another and also arranged orthogonal to the bearing surface 715 and thus, the tissue being cut that lies against the bearing surface 715. The spacer 726 can position and distance of the blade(s) 712 to be within a very tight tolerance (e.g., +/−0.1 mm) in order to aid not only in achieving a very consistent and very straight stent 105 from the patch of material 101, but also to aid in loading the cut stent into the cannula for delivery as is described elsewhere herein.

The angling of the blades so the bevels are parallel to one another and orthogonal to the bearing surface 715 prevents the patch of material 101 lying on the bearing surface 715 from being "squished" inward during cutting. Eliminating the "squish" cuts the patch with a more consistent cross-section and with increased performance of the cutting. The blades can cut more varied thicknesses of tissue and with less damage to the tissue itself as the blades penetrate the tissue. Although the blades are shown having dual bevel cutting edge (see FIG. 22E), the blade cartridge may also include single bevel blades mounted parallel and flat to one another (see FIG. 22D). If the beveled faces were to face each other on an angle such that the resulting inside space between the blades had perfectly parallel and straight faces.

Figure 23A:
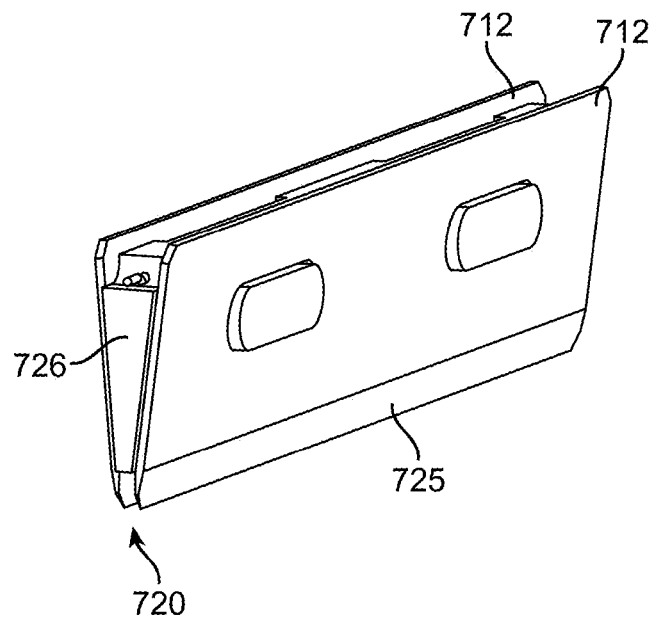
FIGS. 23A-23C are perspective and end views of an ejection spring between the blades of the blade cartridge of the trephining device of FIG. 21A.
Figure 23B:
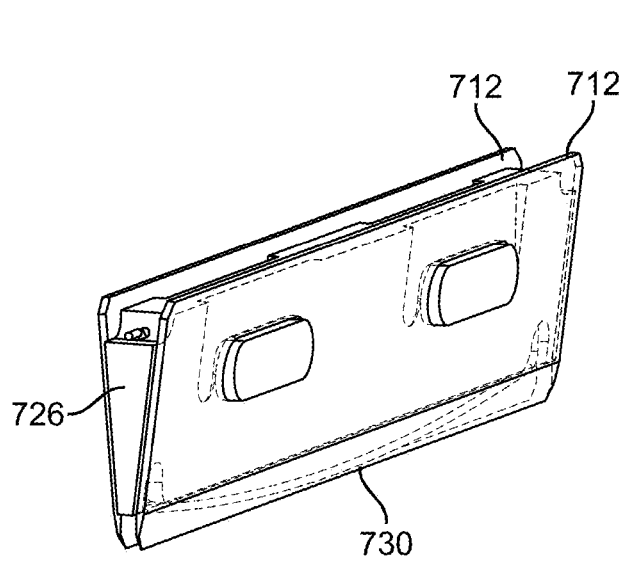
Figure 23C:
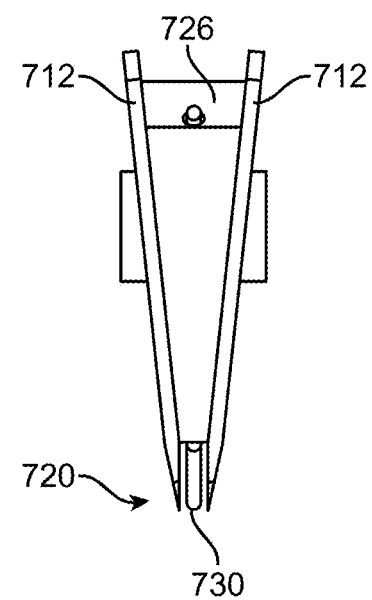

FIGS. 23A-23C illustrate an implementation of an ejection spring 730 that can be positioned between the blades 712 of the blade cartridge 710. The ejection spring 730 aids in ejecting the cut stent 105 from between the blades 712 after the cutting action is complete so that the user may grasp the cut stent 105 (e.g., with forceps) in order to proceed on to the next step of the procedure (e.g., loading the cut stent 105 into the delivery device). FIG. 23A is a perspective view of the blades 712. FIG. 23B is a perspective view with one blade 712 made transparent to show the position of the spring 730 relative to the blades 712 and the spacer 726. FIG. 23C is a front end view of the blades 712 showing the spring 730. The ejection spring 730 (e.g., a coil spring, foam, leaf spring, or other sprung mechanism) can be coupled to the spacer 726 positioned between the blades 712. The spring 730 acts in to move the cut stent 105 out from between the blades 712. The spring 730 in a sprung configuration projects between the distal-most tips of the blades (see FIG. 23C). This pushes any tissue located between the blades 712 downward such that upon opening the blade cartridge 710 by spreading the handles 705 the tissue is urged towards the bearing surface 715 of the lower jaw 716 rather than between the blades 712 in the upper jaw 714. The spring 720 is flexible enough to be compressed upward between the blades 712 during cutting motion towards the bearing surface 715 without impacting the cutting motion of the trephining device 700. The cut stent 105 can then be loaded within a delivery cannula for implantation into an eye. The ejection spring 730 can be incorporated in any of the embodiments of the cutter described herein including the cutting device 300 shown in FIGS. 18A-18H to ensure the cut stent remains available for a user to grasp.

The relative arrangement of the various components of the cutting assembly relative to the cutting device can vary. The arrangement described above with reference to a blade being "above" the patch can just as easily be performed with the blade being "below" the patch. Directional language used herein is for purposes of clarity and understanding and is not intended to limit the devices to a particular arrangement.

Figures 19A, 19B:
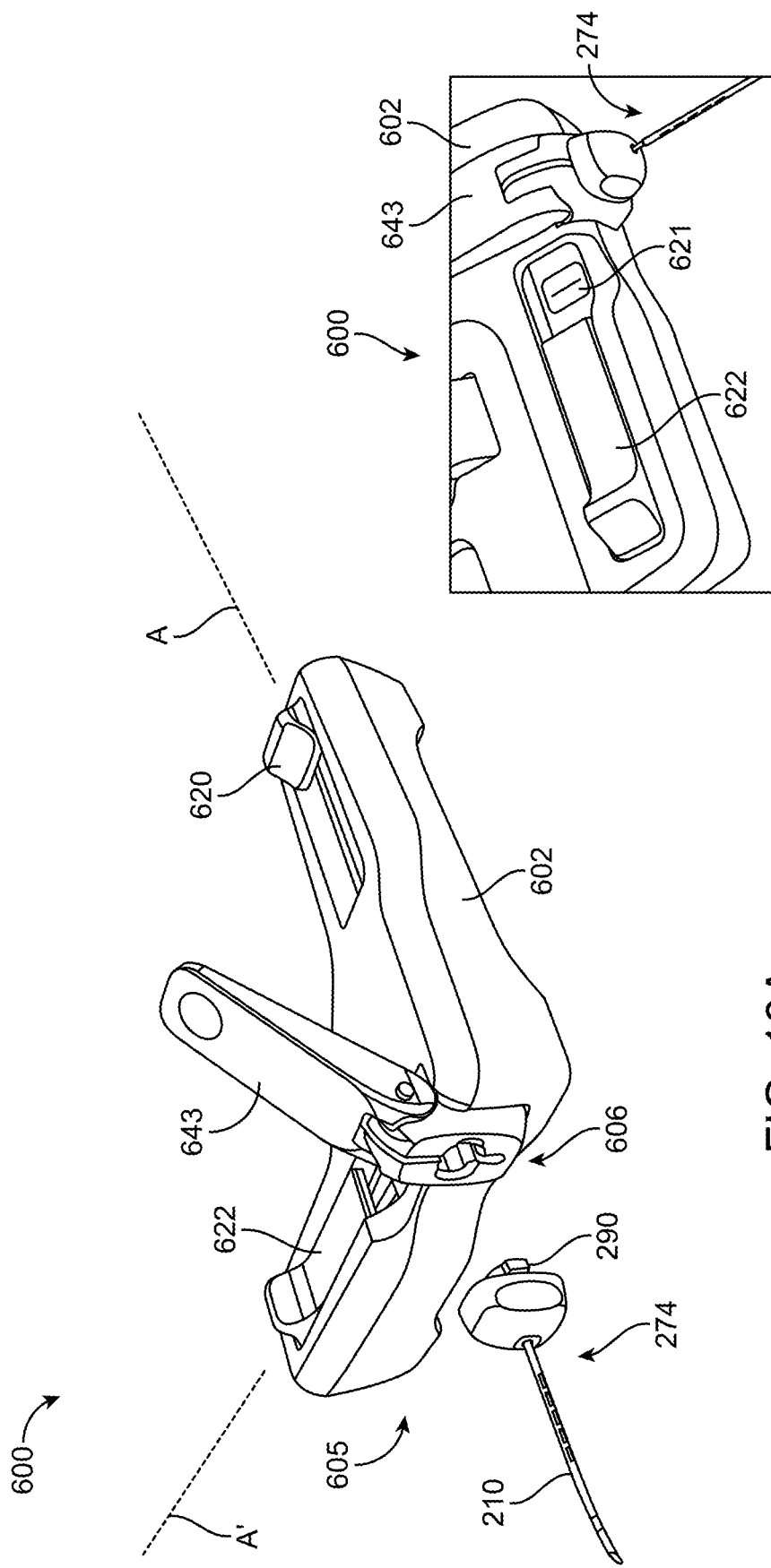
FIG. 19A is an implementation of a loading device prior to coupling the nose cone assembly to the receptacle.
FIG. 19B is an implementation of a loading device after coupling the nose cone assembly to the receptacle.

FIGS. 19A-19B show an implementation of a loading device 600. The loading device 600 can include a base 602 having a distal portion 605 that includes a distal opening or receptacle 606 sized and shaped to receive at least a portion of a tissue cartridge, such as a nose cone assembly 274. The proximal end region of the nose cone assembly 274 can be keyed relative to the receptacle 606 so that it can only be inserted within the receptacle 606 in a single orientation similar to the keyed connection between the nose cone assembly 274 and the delivery device housing 405. For example, a projection 290 of the proximal end of the nose cone assembly 274 can insert within at least a portion of the receptacle 606 to align the lumen 238 of the distal shaft 210 with a pusher 620 of the loading device 600. The projection 290 of the nose cone assembly 274 can be inserted within the receptacle 606 of the loading device 600 when the handle 643 is in a first configuration relative to the base 602, for example, lifted upwards away from the base 602 as shown in FIG. 19A. The handle 643 can be urged into a second configuration, for example rotated towards the base 602, to secure the nose cone assembly 274 relative to the loading device 600 (see FIG. 19B). The receptacle 606 can clamp against at least a region of the nose cone assembly 274 to fix it relative to the loading device 600.

Figure 20A:
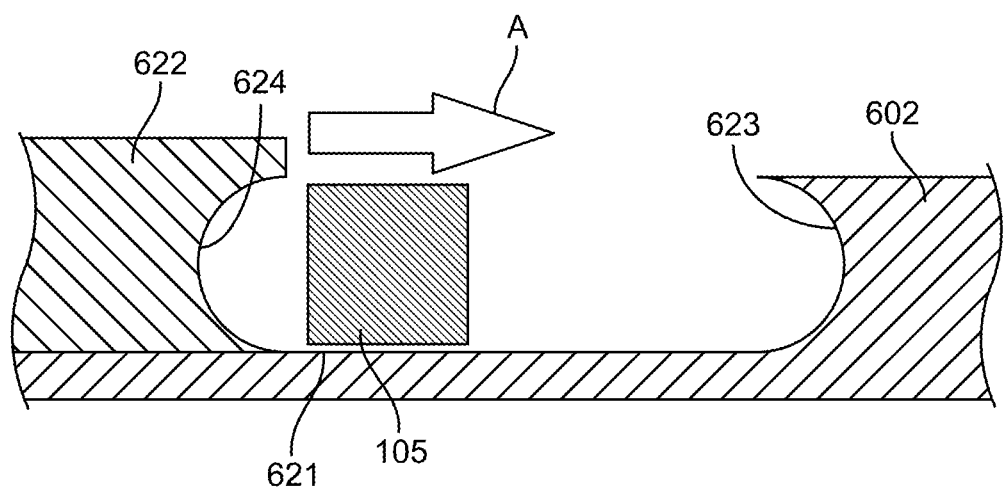
FIGS. 20A-20B are schematic cross-sectional views of the loading device for aligning and compressing the cut stent prior to loading the cut stent in the delivery shaft.
Figure 20B:
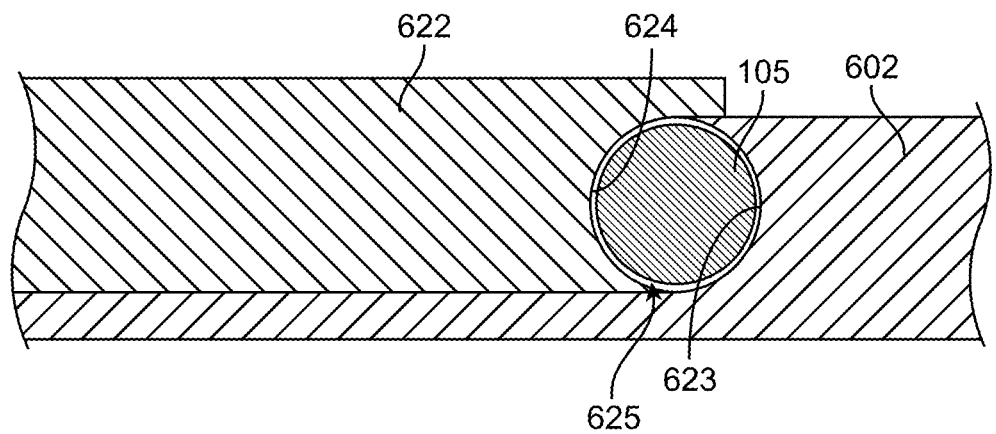

The loading device 600 can receive the cut stent 105 from the cutting device 300 on a portion of the device 600 relative to a movable plow 622. The device 600 can incorporate a recess or loading mark 621 to provide guidance to a user about where to place the cut stent 105 relative to the plow 622. The plow 622 can be moved forward along the base 602 and relative to the stent 105 positioned at the mark 621 to urge the stent 105 into alignment with the lumen 238 of the distal shaft 210. FIGS. 20A-20B are cross-sectional schematics illustrating the bidirectional movement of the plow 622 relative to the base 602 in order to align the cut stent 105 with the lumen of the shaft 210. FIG. 20A shows the plow 622 in a retracted configuration so that loading mark 621 is in front of the forward surface 624 of the plow 622. The cut stent 105 can be positioned at loading mark 621 in front of the forward surface 624 of the plow 622. Movement of the plow 622 in the direction of arrow A urges the cut stent 105 towards a terminal region 623 of the base 602. The forward surface 624 of the plow 622 and the terminal region 623 of the base 602 form a space that is coaxial and substantially size-matched to the lumen of the shaft (not visible in FIGS. 20A-20B). The forward surface 624 of the plow 622 can be curved so as to form at least a portion of a circle. The terminal region 623 opposite the forward surface 624 of the plow 622 can have a curvature that mirrors the curvature of the forward surface 624 so that upon placing the plow 622 near the terminal region 623 a tubular structure 625 is formed that contains the cut stent 105 (see FIG. 20B). The tubular structure 625 formed when the plow 622 is urged into contact with the terminal region 623 of the base 602 can have an inner diameter that is substantially the same as the inner diameter of the distal shaft. As discussed elsewhere herein, the cut stent 105 can be slightly oversized relative to the lumen of the shaft so that the cut stent 105 is compressed or compacted within the shaft. Similarly, the tubular structure 625 can compress or compact the cut stent 105 when the plow 622 is placed into contact with the terminal region 623 of the base 602. The relative curvatures of the forward surface 624 of the plow 622 and the terminal region 623 of the base 602 can vary, but upon mating one with the other form a complete shape without gaps so that the stent 105 is fully contained within the tubular structure 625. The curve of the forward surface 624 can be at least about 90 degrees of a circle up to about 170 degrees of a circle. The terminal region 623 of the base 602 can have a curve that is at least about 190 degrees up to about 270 degrees of a circle so that together with the forward surface 624 the cut stent 105 is enclosed 360 degrees. Any of a variety of curvatures are considered here so that the cut stent 105 can be urged forward from the mark 621 towards the terminal region 632 so that it is aligned coaxially with the longitudinal axis of the shaft 210. The surface 624 can form a tubular structure 625 with terminal region 623 that is not circular in cross-section including oval or other curved shape.

Once the cut stent 105 is compressed within the tubular structure 625 and aligned with the lumen of the distal shaft, a pusher 620 of the loading device 600 can be used to compress, compact, or otherwise manipulate the cut stent 105 to enter the lumen of the shaft. The plow 622 can be manipulated in a first direction relative to the base 602, such as with an actuator that is operatively coupled to the plow 622. The pusher 620 can be manipulated in a second direction relative to the base 602, such as with an actuator that is operatively coupled to the pusher 620. Any of a variety of actuators are considered herein to move the plow 622 and/or pusher 620 including a dial, button, slider, or other actuator. The plow 622 can be moved laterally along an axis A' that is at a 90 degree angle relative to the longitudinal axis A of the shaft 210. The pusher 620 can be moved longitudinally or along the longitudinal axis A of the shaft 210. The plow 622 aligns the cut stent 105 with the long axis A of the lumen 238 of the shaft 210 and the pusher 620 loads the cut stent 105 within the lumen 238 of the shaft 210. The pusher 620 is configured to pass through the tubular structure 625 so that the cut stent 105 moves along the longitudinal axis A entering the lumen 238. Once the cut stent 105 is loaded within the nose cone assembly 274, the nose cone assembly 274 can be removed from its attachment with the loading device 600 and coupled to the delivery device 400 as described elsewhere herein.

The cutting device 300 and loading device 600 can be configured to couple to one another or be integrated with one another so that they form a single system component configured to work in conjunction with the other. For example, the cutting device 300 can couple to the base 602 of the loading device 600. The base 602 of the loading device 600 can include a handle configured to actuate the cutting assembly 500 of the cutting device 300. In this configuration the cutting device 300 need not incorporate its own handle 343 configured to actuate the cutting assembly 500. Similarly, the pad 515 can be formed by at least a portion of the loading device 600 so that the cutting assembly 500 and feature of the loading device 600 work in conjunction with one another to create the stent. The fixing of the tissue, cutting of the tissue, transferring of the cut stent, loading of the cut stent into the tissue cartridge can all be combined into a single system or can be separated into different devices.

The cut stent 105 that is loaded and compressed for delivery can be positioned within at least a portion of the cartridge 200, such as within a lumen 238 of the shaft 210. At least a portion of the cartridge 200 can be removed from the cutting device 300 (or the loading device 600) and engaged with a delivery device 400 for deployment of the stent 105 from the cartridge 200 into the eye. The compression and transfer of the cut stent 105 described above in relation to the cutting assembly 500 prepares the cut stent 105 for delivery without the cut stent 105 being removed from the cartridge 200.

The cartridge 200 can couple with a cutting device 300 having a cutting assembly 500 for cutting a patch of material 101 and a loading assembly for loading the cut stent into the cartridge 200. The cartridge 200 can then be removed from engagement with the cutting device 300 so that it can be coupled to a delivery device 400. The cutting device 300 need not incorporate a loading assembly or couple to the cartridge 200. For example, the cut stent 105 can be manually transferred from the cutting device 300 to a separate a loading device 600 that couples with the cartridge 200 for loading the cut stent 105 into the cartridge 200 as described above. This relationship can include removing and re-engaging the entire cartridge 200 or just a portion of the cartridge 200, such as just the nose cone assembly 274 (e.g., the nose cone 275 and the shaft 210). Both arrangements are considered herein. The nose cone assembly 274 may be referred to herein simply as the cartridge 200. Where the cartridge 200 is described as removed from engage with one device to engagement with another device, the description is relevant to just the nose cone assembly 274 being removed or the entire cartridge 200 being removed. Where the cartridge 200 is described as configured to engage with the delivery device 400 that the description is relevant to just the nose cone assembly 274 being engaged or the entire cartridge 200 being engaged to the delivery device 400. Each instance of coupling between the cartridge 200 and another component of the system 100 may be the entire cartridge 200 or just a portion of the cartridge 200 such as the nose cone assembly 274.

The patch of material 101 can be placed within a portion of the cartridge 200 for cutting or the patch of material 101 can be placed within a portion of the cutting device 300 for cutting by the cutting assembly 500 and the cut stent 105 transferred to the cartridge 200 (or just a portion of the cartridge 200 such as the nose cone assembly 274). The cut stent 105 can be transferred using a component of the cutting assembly 500 or cutting device 300 into the cartridge 200, which is then decoupled from the cutting device for coupling with the delivery device. The patch of material 101 can be placed within a region of the cutting assembly 500 for cutting and then the cut stent 105 manually transferred from the cutting assembly 500 for compacting within a delivery shaft 210, for example, using a loading device 600 that is separate from the cutting device 300. The cut stent 105 can be transferred using a separate device from the cutting assembly 500 including manually. In an implementation, the system includes a cutting device 300 having a cutting assembly 500. The cut stent 105 from the cutting assembly 500 can be manually transferred (e.g., by forceps) to a transfer device having a compacting tool 517 to compact the cut stent 105 into a distal shaft 210. The distal shaft 210 having the cut stent 105 compacted therein can then be coupled to a delivery device 400 for deployment of the cut stent 105 in an eye. The system can have separate cutting, transferring, and delivery devices rather than one or more of the devices being integrated. The cutting assemblies 500 shown in FIGS. 14A-14H can be part of a cutting device. The transferring components can be integrated with the cutting device 300 or can be a separate transferring device such as the loading device of FIGS. 19A-19B.

The system 100 can include a delivery device 400 that is configured to couple with at least a portion of the cartridge 200 holding the cut stent 105. In some implementations, the entire cartridge 200 with the cut stent 105 is removed from the cutting device 300 and engaged with the delivery device 400 (see FIG. 2). In interrelated implementations, a portion of the cartridge 200 with the cut stent 105 positioned therein is removed from the cutting device 300 and engaged with the delivery device 400 (see FIGS. 6, 9A-9D).

In the implementation shown in FIGS. 5A-5B, the cartridge 200 holding the cut stent 105 can be removed and loaded into the delivery device 400. FIGS. 5C-5F illustrate loading of the tissue cartridge 200 within the delivery device 400 and deployment of the cut stent 105 using the delivery device 400. The delivery device 400 together with the cartridge 200 can be used to deliver the stent 105 into the implanted location, such as via an ab interno delivery pathway. This allows for loading the stent and deploying the stent without having to remove the cut stent 105 from its location within the cartridge 200 in order to load the cut stent 105 into the delivery device 400. At least a portion of the cartridge 200 (e.g., the proximal portion 207 of the cartridge 200 or a region of the nose cone assembly 274) can be held by the delivery device 400 and the distal portion 205 of the cartridge 200 can be inserted into the eye.

The delivery device 400 can include a proximal housing 405 that is sized and shaped to be grasped by a single hand of a user and a distal end region 410 defining an attachment mechanism 425 such as a receptacle 412 sized to engage with at least a portion of the cartridge 200. In an implementation, the receptacle 412 can be sized to receive at least a length of the proximal portion 207 of the cartridge 200 (see FIG. 5C and also FIGS. 17A-17D).

Figure 17A:
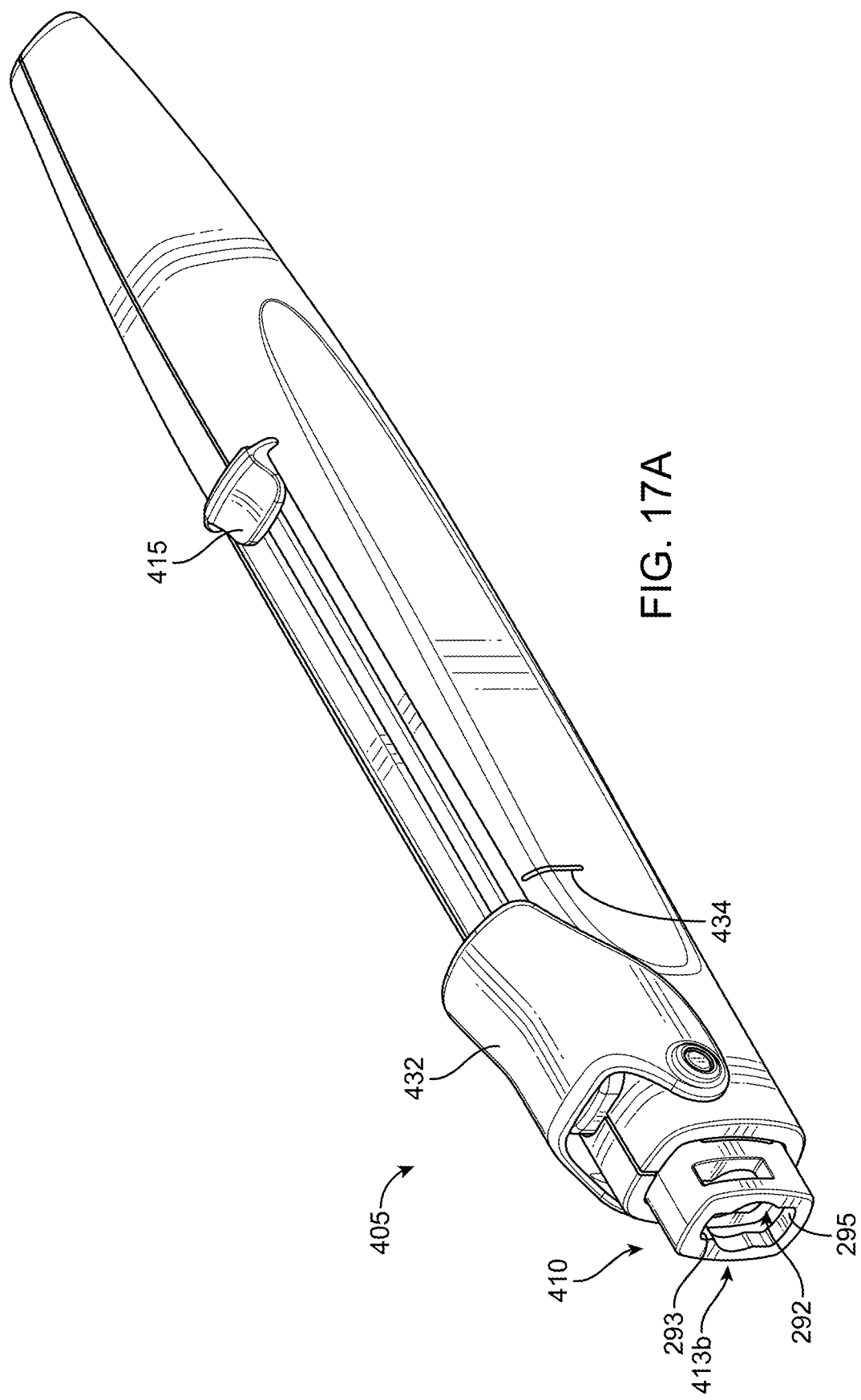
FIG. 17A illustrates a proximal housing of the delivery device of FIG. 10A having a keyed coupling for receiving the nose cone assembly.
Figure 17D:
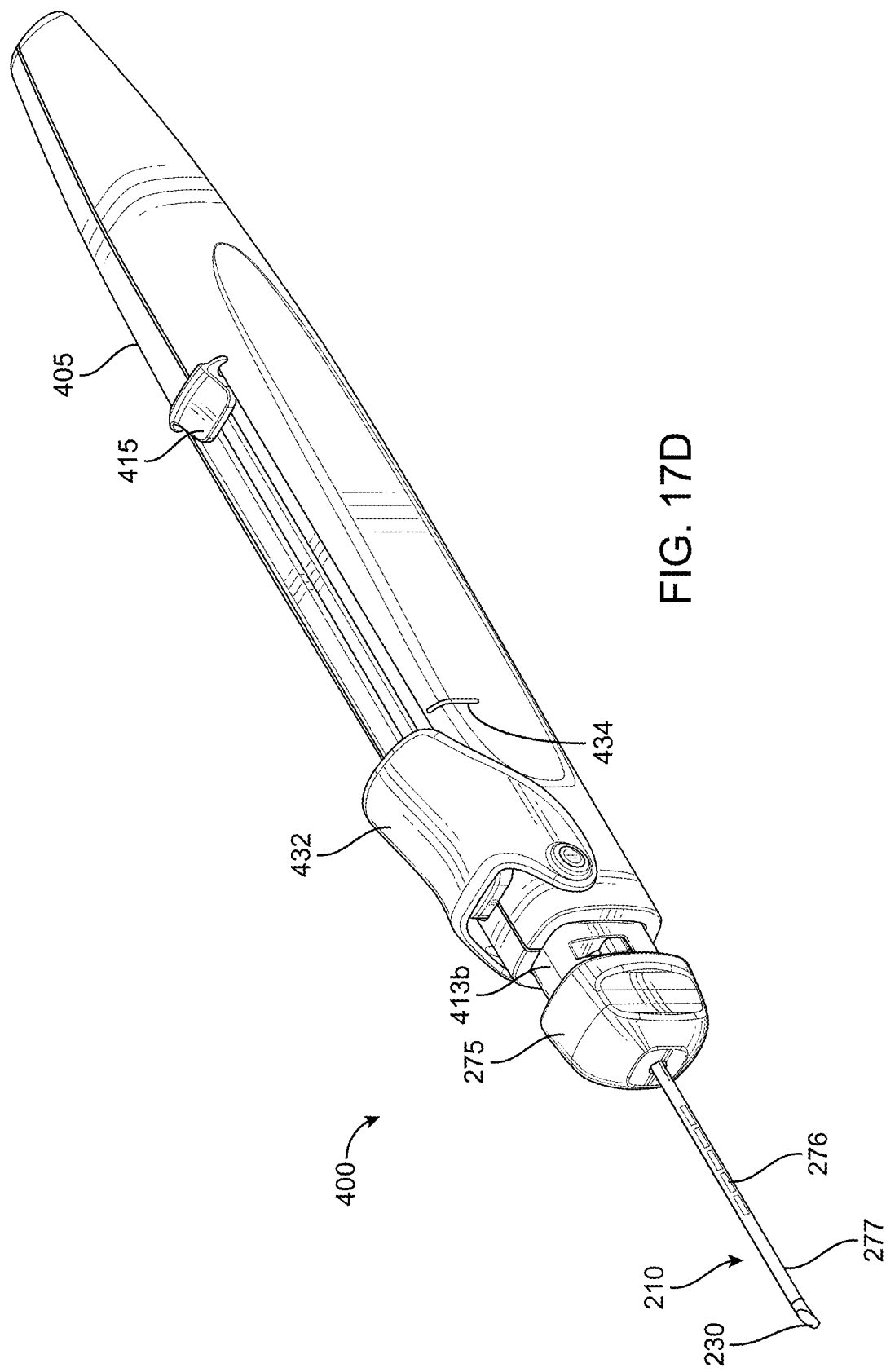
FIG. 17D illustrates the nose cone assembly coupled with the proximal housing.
Figure 17E:
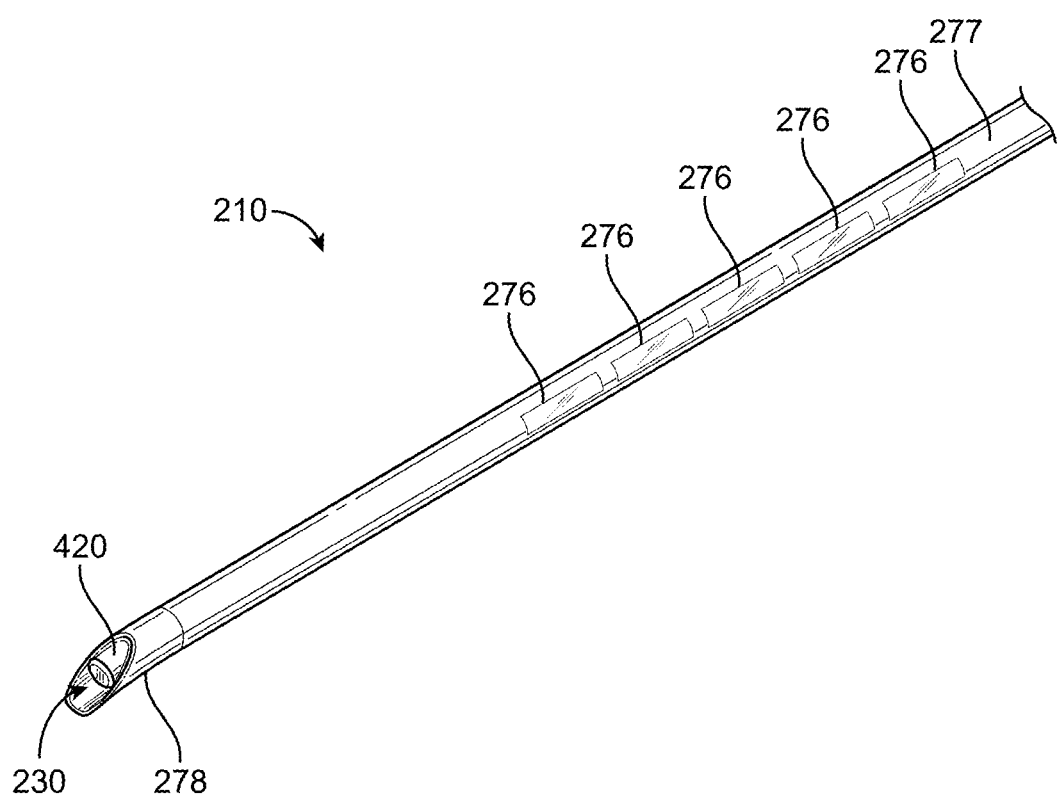
FIG. 17E illustrates a detail view of a distal shaft of the nose cone assembly of FIG. 16A having a pusher visible within the bevel.

In an interrelated implementation, the attachment mechanism 425 can incorporate another male-to-female attachment mechanism such as a bayonet connection 413 (see FIGS. 10A-10C, 17A-17C). FIGS. 17B-17C shows a proximal coupler 413a projecting from a proximal end region of the nose cone 275 and a corresponding distal coupler 413b projecting from a distal end region of the housing 405. The proximal coupler 413a can have a projection 290 having a shape that corresponds to a shape of a receptacle 292 on the distal coupler 413b forming a keyed interface. The projection 290 of the proximal coupler 413a can insert in a first orientation through the receptacle 292 on the distal coupler 413b. The nose cone assembly 274 can then be rotated around an axis in a first direction to fix the nose cone assembly 274 relative to the housing 405 (see arrow in FIG. 10B). To uncouple the nose cone assembly 274 from the housing 405 the reverse is performed. The shape of the receptacle 292 and projection 290 can be selected so that rotation of the projection 290 relative to the receptacle 292 results in the projection 290 being prevented from withdrawing back out of the receptacle 292. The rotation can be about 90 degrees up to about 180 degrees to ensure fixation between the nose cone assembly 174 and the housing 405. The shape is shown in FIG. 10A as being oval, but the shape can vary including rectangular or other geometric shapes, as well as freeform shapes. The shape of the projection 290 and the receptacle 292 can be selected so that they couple together in only a single orientation. FIG. 17A shows the receptacle 292 can be an elongate shape top-to-bottom and incorporate an upper region 293 that is smaller in size than a lower region 295 of the receptacle 292. The projection 290 can have a corresponding shape that can only insert into the receptacle 292 when its smaller upper region is positioned at the top and the larger lower region is positioned at the bottom. Upon insertion within the receptacle 292, the projection 290 can be rotated, for example 90 degrees in a clockwise direction, relative to the receptacle 292 to fix the nose cone assembly 174 relative to the housing 405.

As mentioned above with respect to the cutting device 300, the attachment mechanism 425 can be keyed such that the cartridge 200 with the cover 214 in place on the base 224 can be received within or otherwise engage the attachment mechanism 425 in a single orientation. When the cartridge 200 is coupled with the attachment mechanism 425 of the housing 405, the shaft 210 of the cartridge 200 extends in a distal direction outward from the housing 405. The keying features of the attachment mechanism 425 can prevent attachment in the wrong orientation. The attachment mechanism 425 can also provide a secure connection with tactile feedback to the user to indicate when the connection is fully engaged. The attachment mechanism 425 also is dimensioned to ensure alignment of the lumen 238 of the shaft 210 with the internal mechanisms of the delivery device 400 such as the push rod 420.

Figure 5C:
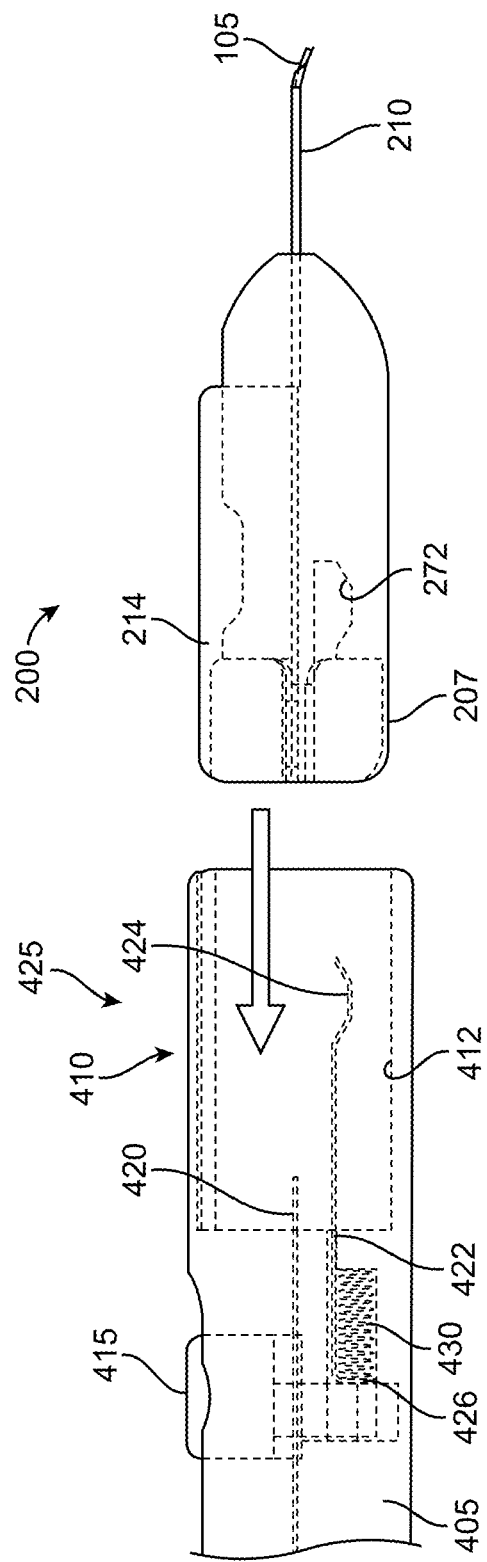
FIG. 5C illustrates the tissue cartridge and distal end region of the delivery device of FIG. 5A.

The attachment mechanism 425 of FIGS. 5A-5C can be a receptacle 412 having a depth sufficient to contain a length of the proximal portion 207 of the cartridge 200 while the shaft 210 remains outside the receptacle 412. A flexible hook 422 can extend into at least a portion of the receptacle 412 (see FIG. 5C). A distal end 424 of the hook 422 can be received within a correspondingly shaped detent 272 near a proximal end region of the tissue cartridge 200. As the cartridge 200 slides within the receptacle 412, the distal end 424 of the hook 422 can slide through the proximal end 207 of the cartridge 200 and insert within the detent 272. The flexibility of the hook 422 allows for the hook 422 to be urged upward as the distal end 424 of the hook 422 is advanced through a first region of the cartridge 200 and flex back downward as the distal end 424 is advanced further to thereby engage the detent 272 (see FIG. 5D). The spring-loaded hook 422 engaging with the detent 272 can provide a tactile and/or auditory "click" to inform a user that the cartridge 200 is fully installed within the delivery device 400, retained and ready for delivery of the stent 105.

One or more actuators 415 can be positioned on a region of the housing 405. The actuator 415 can also be manipulated by the single hand of the user such as with a thumb or finger. The configuration of the actuator 415 can vary. For example, the actuator 415 can include any of a variety of knob, button, slider, dial, or other type of actuator configured to move one or more components of the delivery device 400 as will be described in more detail below.

The delivery device 400 can include a push rod 420 configured to be moved by the one or more actuators 415. The push rod 420 (also referred to herein as a pusher or compacting tool) can be used together with the cartridge 200 to deliver the stent 105 from the cartridge 200 once the desired position is reached with the distal end of the shaft 210. The push rod 420 can be sized and shaped complementary to the inner dimension of the shaft 210. For example, where the shaft 210 of the cartridge 200 has a rectangular cross-sectional shape, the push rod 420 may be rectangular in cross-section. This allows the push rod 420 to effectively urge the cut stent 105 through the lumen 238 of the shaft 210.

Figure 5D:
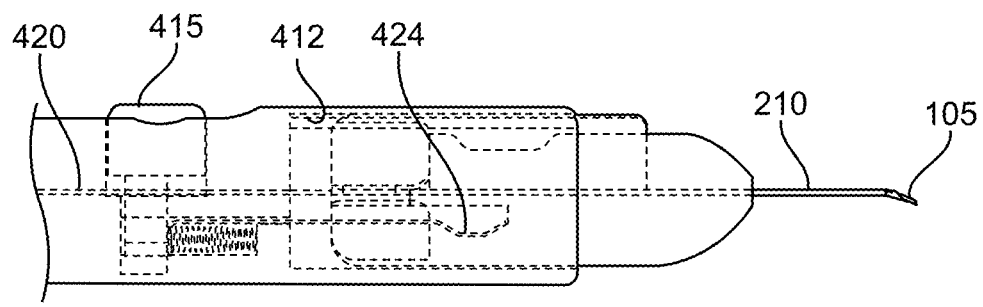
FIG. 5D illustrates the tissue cartridge installed within the delivery device of FIG. 5C.

The push rod 420 can be fully retracted in a proximal position prior to coupling of the tissue cartridge 200 within the delivery device 400 so the push rod 420 does not interfere with loading of the cartridge 200. Once the cartridge 200 is installed and retained within the delivery device 400 as shown in FIG. 5D and FIG. 9B, the push rod 420 can be advanced distally through a proximal port in the cartridge 200 and into the lumen 238 of the shaft 210 (see FIG. 5E and FIG. 9C). In some implementations, the push rod 420 can be advanced through the lumen 238 and out the distal opening 230 from the lumen 238 to deploy the stent 105. In other implementations, the push rod 420 is advanced to a distal location near the proximal end of the stent 105 within the lumen 238 and the shaft 210 is withdrawn proximally while the push rod 420 remains stationary to deploy the stent 105 (see FIG. 5F and FIG. 9D).

Figure 5E:
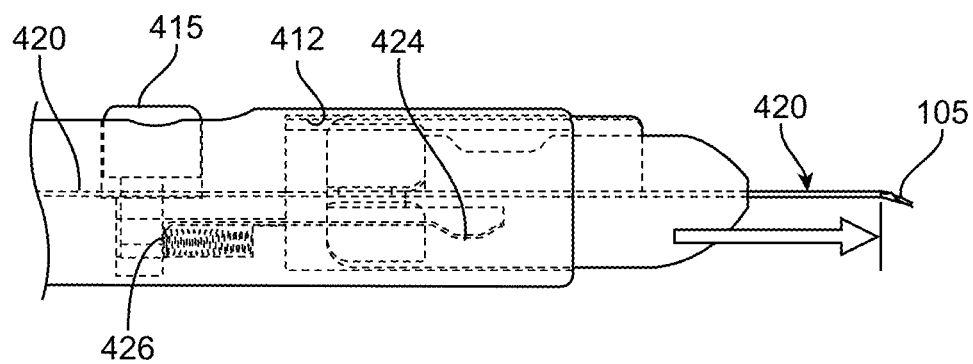
FIG. 5E illustrates the pusher of the delivery device of FIG. 5A advanced to deployment position.
Figure 5F:
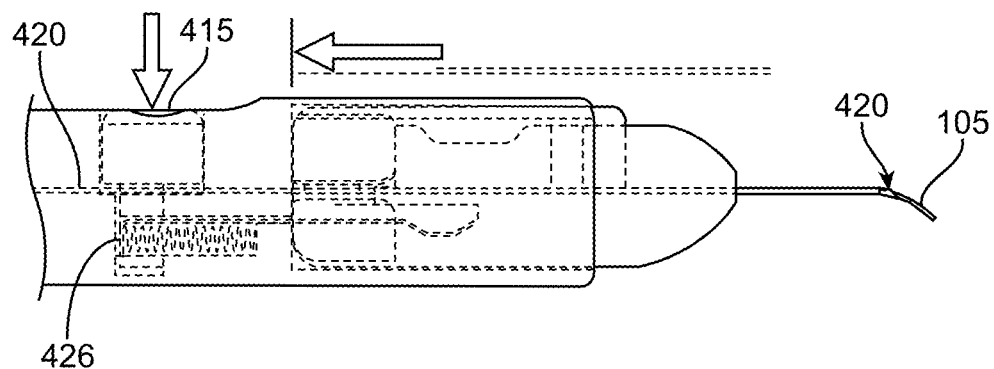
FIG. 5F illustrates the tissue cartridge retracted by the delivery device to deploy the cut stent within the eye.

The shaft 210 can be withdrawn proximally via motion of the cartridge 200 in a proximal direction relative to the delivery device 400 while the push rod 420 remains stationary in order to deploy the stent 105 within the eye (see FIG. 5F and FIG. 9D). The push rod 420 therefore can act as a stopper thereby preventing the stent 105 from following the shaft 210 as it is retracted. The result is that the stent 105 is unsheathed from the shaft 210 and left within the tissues. In other implementations, both the cartridge 200 and the push rod 420 are movable to effect deployment of the stent from the shaft 210. In some implementations, the push rod 420 can be advanced relative to the shaft 210 to fully deploy the stent 105 from the lumen.

In some implementations, the push rod 420 can be coupled to a first actuator 415 and the cartridge 200 can be coupled to a second actuator 415. The first and second actuators 415 can be sliders, buttons, or other configuration or combination of actuators configured to advance and retract their respective components. The first actuator 415 coupled to the push rod 420 can be withdrawn proximally such that the push rod 420 is in its most proximal position when the cartridge 200 is engaged by the attachment mechanism 425 of the delivery device 400. The user can advance the first actuator 415 to urge the push rod 420 distally to advance the stent 105 within the lumen 238 of the cartridge 200 towards the distal opening 230 of the shaft 210. After the cut stent 105 is primed into its distal position within the lumen 238, the shaft 210 of the cartridge 200 can be used to dissect tissue of the eye until a target location is accessed. Once the shaft 210 is in position to deploy the stent 105 in the eye, the first actuator 415 coupled to the push rod 420 can be maintained in this distal position and the second actuator 415 actuated (e.g., withdrawing a slider or pushing a button) to retract the cartridge 200 a distance relative to the delivery device 400. This relative movement of the shaft 210 of the cartridge 200 to the push rod 420 deploys the stent 105 from the lumen 238 in the anatomy. The stent 105 can be deployed from the lumen 238 by advancing the push rod 420 so the stent 105 is fully externalized from the lumen 238.

FIG. 5E shows the cartridge 200 installed within the receptacle 412 of the delivery device 400 such that a space exists between the terminal end of the receptacle 412 and the proximal-most end of the cartridge 200. The depth of this space defines the maximum distance the cartridge 200 can be retracted. The stent 105 is located near the distal opening 230 from the lumen 238 and the push rod 420 is advanced to its distal position such that the distal end of the push rod 420 abuts against a proximal end of the stent 105. The distal end 424 of the hook 422 is retained within the detent 272 and the second actuator 415 is not yet actuated. A proximal end 426 of the hook 422 is coupled to a spring 430. When the second actuator 415 is in a resting state prior to actuation, the hook 422 is urged distally into a first configuration. The spring 430 is compressed between the proximal end 426 of the hook 422 and the distal end of the spring 430 housing when the hook 422 is urged distally into the first configuration. When the second actuator 415 is actuated (e.g., pushed downward), the spring 430 is released and urges the proximal end 426 of the hook 422 towards a proximal end of the housing 405. The hook 422 moves proximally and drags along with it the cartridge 200, which is coupled to the hook 422 due to engagement of the distal end 424 of the hook 422 within the detent 272. The distance the hook 422 moves proximally thus, retracts the cartridge 200 deeper into the receptacle 412. The push rod 420 can remain stationary during cartridge 200 retraction. The relative motion between the shaft 210 and the push rod 420 deploys the stent 105 from the lumen 238 (see FIG. 5F).

It should be appreciated that additional distal movement of the push rod 420 can be used to aid in deployment of the stent 105 from the lumen 238. It should also be appreciated that push rod 420 advancement and cartridge 200 retraction can be controlled by dual actuators 415 as described above or by a single actuator 415 capable of both pusher and cartridge 200 movement depending on degree of actuation. Additionally, the shaft 210 can be used to inject a viscous material such as viscoelastic during the procedure using the push rod 420 as a plunger. The methods of implantation and delivery of the stent 105 are described in more detail below.

Figure 11A:
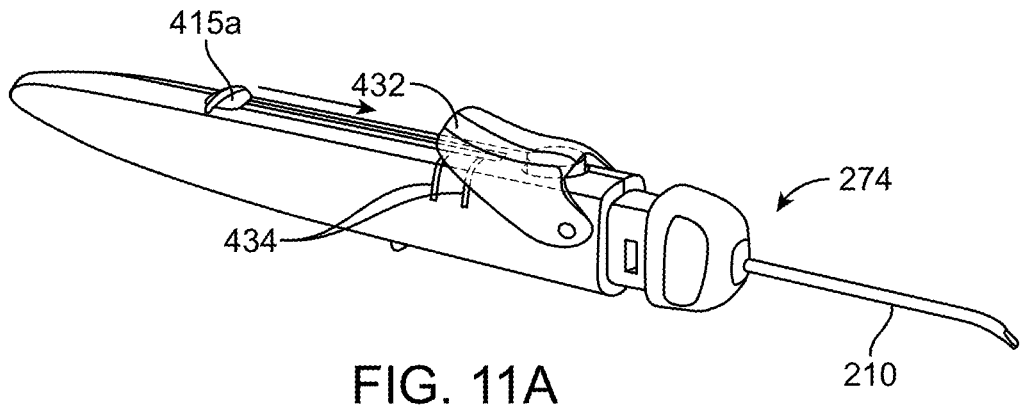
FIG. 11A illustrates the pusher of the delivery device of FIG. 10A in the first, retracted position.
Figure 11B:
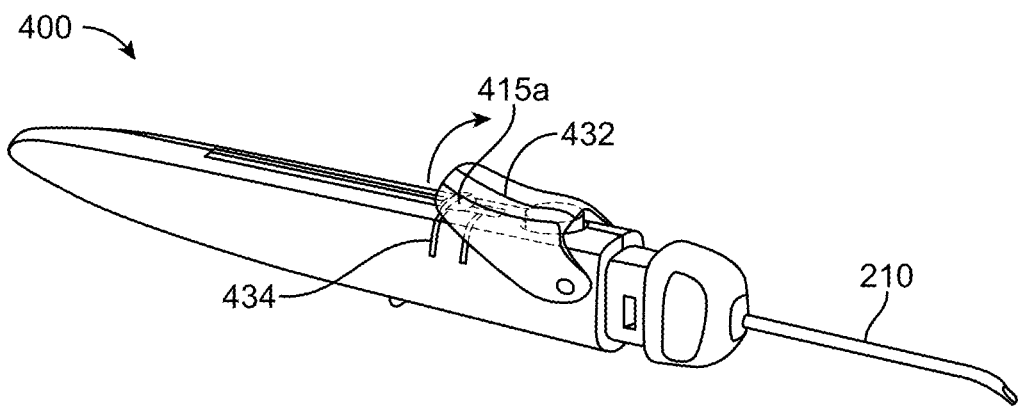
FIG. 11B illustrates the pusher of the delivery device of FIG. 10A advanced to the second, primed position.
Figure 11C:
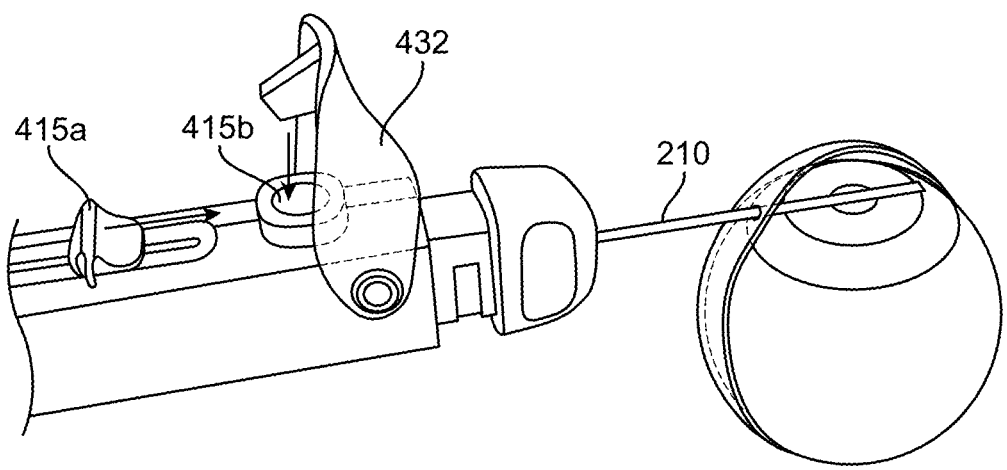
FIG. 11C shows the distal shaft of the delivery device of FIG. 10A positioned within the eye and the third actuator ready to be activated.

FIGS. 11A-11C illustrate steps in the deployment of the stent using a first actuator 415a, which in this case can be a slider, of the delivery device 400 to move the pusher from a first loading position (fully retracted) to a second primed position (at least partially advanced). The first loading position retracts the pusher away from the distal end region of the delivery device 400 allowing the nose cone assembly 274 (or entire cartridge 200) to be coupled to the delivery device 400. The second, primed position advances the pusher towards the distal end of the delivery device 400 to advance the cut stent 105 through the lumen 238 of the shaft 210. Preferably, the pusher is advanced to the second, primed position prior to insertion of the shaft 210 through the cornea. The delivery device 400 can additionally incorporate a movable guard 432 arranged to prevent a user from inadvertently pushing the slider beyond the second primed position. The guard 432 can be pushed down toward the housing 405 of the delivery device so that a second actuator 415b is covered by the guard 432 preventing the second actuator 415b from being inadvertently activated. The guard 432 has a length so that the guard 432 extends over (or has a feature 433 that extends within) at least a portion of the slider track 435 thereby blocking the first actuator 415a from moving further distal in addition to blocking the second actuator 415b (FIG. 11B). Once the stent 105 is advanced to the primed position and is ready to be deployed in the eye, the guard 432 can be rotated up out of the way revealing the second actuator 415b and removing the features 433 from the track 435. The first actuator 415a is free to slide further distal along the track 435 and the second actuator 415b is available to be depressed (FIG. 11C). The guard 432 can also be fully removed from the device 400 or the device 400 not include any guard 432. The housing of the device 400 can include one or more marks 434 intended to provide feedback to a user regarding the position of the push rod 420 through the shaft 210. The advancement of the push rod 420 into one or more positions relative to the housing can also provide tactile feedback to a user as described elsewhere herein.

FIGS. 12A-12D illustrate the delivery device 400 in cross-section prior to advancing the push rod 420 to the second position and after advancing the push rod 420 to the second position. Once the nose cone assembly 274 is attached to the delivery device 400, the first actuator 415 and the push rod 420 can be advanced from the initial, retracted first position to a second position. The first actuator 415a and the push rod 420 can be advanced to the second position causing the push rod 420 to insert into the lumen 238 behind the material to be delivered (e.g. cut stent 105). The guard 432 having the projecting feature 433 on its underneath side can prevent the first actuator 415a from sliding beyond the second position. The location of the second position is designed to place the leading face of the push rod 420 a predefined distance away from the distal tip of the shaft 210 (e.g. 6 mm). Once the user has created the desired cleft and is ready to deliver material from the lumen, the push rod 420 can be advanced to its third, forward-most position (with the guard 432 out of the way or otherwise removed or absent from the device 400). The second actuator 415b can be engaged to release the material from the shaft 210. The second actuator 415b as described elsewhere herein can retract the shaft 210 while the push rod 420 remains fixed ultimately releasing the stent 105 from the lumen. The nose cone assembly 274 withdraws and the push rod 420 stays fixed. The push rod 420 can also be advanced to deploy the stent 105 from the lumen 238. The stent 105 can be deployed from the lumen 238 so that at least a portion of the stent 105 is positioned between tissue layers, such as within a supraciliary space between ciliary tissue and scleral tissue, or within Schlemm's Canal. The stent 105 can be deployed so that it is positioned within the supraciliary space so that at least a distal region is positioned between ciliary tissue and the sclera and a proximal end is within the supraciliary cleft. The proximal end need not project into the anterior chamber when positioned within the supraciliary cleft. Preferably, the proximal end of the stent 105 is positioned so that it remains flush with the cleft positioned between ciliary tissue and scleral tissue and does not extend into the anterior chamber. The one or more fenestrations 276 within the shaft 210 and/or the presence of the substantially transparent or translucent outer tube member 278 forming the distal end region 212 of the shaft 210 can aid in positioning the stent 105 to be flush with the cleft by assisting in visual inspection of the lumen 238 and the stent 105 inside the lumen 238 as it is urged distally through the lumen 238.

Maintaining the fixed location of the push rod 420 during deployment of the stent 105 can be aided by a mechanical backstop 450. The backstop 450 can prevent the push rod 420 from being forced proximally by the stent 105 within the lumen 238 of the shaft 210. The backstop 450 can be located within the housing 405 below a slider track 435 in the housing 405 through which the actuator 415*a* slides. The backstop 450 is sized and shaped to engage with a corresponding region of the actuator 415*a* positioned within the housing 405. An external portion of the actuator 415*a* extends outside the slider track 435 of the housing 405 and is configured for a user to engage the actuator 415*a*. An internal portion of the actuator 415*a* is positioned within the housing 405 and is coupled to the proximal end region 444 of the push rod 420. Advancement of the actuator 415*a* along the slider track 435 urges the push rod 420 distally relative to the housing 405 so that the distal end of the push rod 420 is urged toward the opening of the shaft 210. The internal portion of the actuator 415*a* that is located within the housing 405 can also include a flexure 452 having a projection 451 that extends upward toward the slider track 435. The flexure 452 is movable between a compressed position and a relaxed configuration. When the actuator 415*a* is in the fully withdrawn position and slid to a proximal end of the slider track 435, the flexure 452 is urged downward by an inner surface of the housing 405 into the compressed position. As the actuator 415*a* slides distally along the slider track 435, the projection 451 also slides along inside the housing 405 until it reaches the backstop 450. The flexure 452 relaxes upward into the relaxed configuration upon reaching the location of the backstop 450. The projection 451 on the upper surface of the flexure 452 contacts an upper end of the housing 405 and the proximal surface of the projection 451 engages with the distal-facing surface of the backstop 450. The engagement between the surfaces of the backstop 450 and the projection 451 prevents any incidental proximal motion of the actuator 415*a* and thus, prevents proximal motion of the push rod 420 that might occur during deployment of the stent 105 from the shaft 210.

FIGS. 17G-17H show the external portion of the actuator 415*a* outside the housing 405 is abutting against the feature 433 on the button guard 432 projecting within the slider track 435. The projection 451 is engaged against the backstop 450. When the actuator 415*a* achieves this position, the stent 105 has been advanced to the primed position within the shaft 210 and is ready to be deployed in the eye. The button guard 432 can be rotated up out of the way revealing the second actuator 415*b*. Pressing the second actuator 415*b* causes the stent 105 to be deployed from the shaft 210, such as by retracting the shaft 210 while the push rod 420 remains fixed at the primed position. The backstop 450 prevents the push rod 420 from moving proximally along with the shaft 210. A user may retract the actuator 415*a*, if desired, by lifting the forward end region of the actuator 415*a* to cause the rearward end with the projection 451 to flex downward due to the flexibility of the flexure 452 (see FIG. 17I). Downward movement of the rearward end of the actuator 415*a* disengages the projection 451 from the backstop 450 allowing the actuator 415*a* to move proximally along the slider track 435, for example, to reset the instrument for a further use.

The delivery device 400 and the cartridge 200 (or nose cone assembly 274) can be single-use devices that incorporates a lock-out following deployment of the stent 105 or may be sterilized and re-used. Reset of the actuator 415*a* described above allows for the housing 405 to be reused following deployment of a stent 105. FIGS. 13A-13B illustrate an additional reset mechanism 436 so that the deployment structures can be reset and the delivery device 400 may be re-used. Activating the reset mechanism 436, for example sliding a button forward, can return the deployment structures to an armed position. The reset mechanism 436 may also be performed by pulling on the nose cone assembly 274 or the bayonet connector 413 of the delivery device 400 distally until the second actuator 415 returns to its original armed position. The nose cone assembly 274 can be removed from the delivery device 400, if desired, and additional material loaded into the shaft 210 as described elsewhere herein. The delivery device 400 may be provided in an actuated or unarmed state and a user arm the instrument at the time of use. The delivery device 400 may also be a single-use device that is incapable of being reset following deployment such as by having no reset mechanism 436.

A nose cone assembly transferable between the delivery device and the cutting device can be mounted relative to a main assembly of the cutting device. A patch of tissue can be cut by the cutting device and loaded into the nose cone assembly, which in turn, can be transferred from the main assembly of the cutting device back to being coupled with the delivery device for use in deployment in a patient. The configuration of the nose cone assembly can vary including any of the transferrable cartridges described herein. In an implementation, the nose cone assembly may be mounted relative to a cutting assembly by coupling a proximal end of the nose cone to the base such that a longitudinal axis of the lumen of the shaft extending distally from the nose cone aligns with a longitudinal axis of a corresponding conduit out from the slot. A tissue patch can be placed within a loading zone area of the base relative to a movable stopper plate on the main assembly. The loading zone area and movable stopper plate may both be part of the base of the main assembly. The patch can be laid inside of one or more alignment features of the loading zone and slid forward into a cutting zone until the patch abuts the stopper plate. Once positioned against the stopper plate, the tissue patch is positioned a specified width by the cutter. Thus, the stopper plate provides a calibrated stopping point for the tissue patch prior to cutting. An element designed to fix the tissue patch in this position can be activated such as being lowered down over the tissue patch to hold the tissue in place and optionally compress the tissue to a specific height prior to cutting. Once this holding plate is lowered down onto the patch to hold it in place, the cutting lever can be lowered to cut the tissue patch with one or more blades. The stopper plate and holding plate can be moved away from the cut stent and the remainder of the tissue patch removed from the assembly. The cut stent can be loaded using a tissue loader slider. The tissue loader slider can urge the cut stent into position relative to the longitudinal axis of the shaft in the nose cone assembly. For example, the tissue loader slider can be put into place and slid as far forward as possible until the slider abuts a ledge on the main assembly indicating that the cut stent has been fully delivered into the compression channel and is ready to be advanced into the shaft of the nose cone assembly. An elongate tool such as a tissue advancer rod can be inserted into the main assembly along the longitudinal axis to urge the cut stent from the main assembly into the shaft of the nose cone assembly. The rod can be designed to advance the tissue slide towards the tip of the nose cone assembly without pushing the cut stent entirely out of the lumen of the shaft. The nose cone assembly can then be disconnected from the main assembly and attached to a delivery device for deployment into a patient.

In other implementations the cartridge 200 itself holds the patch of tissue for cutting. For example, FIG. 3A shows the cover 214 of the cartridge 200 can be removed from the slot 214 in the base 224 revealing the recess 221. A patch of material 101 may be manually loaded within the recess 221. The patch of material 101 may be sized to be received within the recess 221 or may be trimmed to ensure it is sized to be received within the recess 221. The cover 214 of the cartridge 200 is replaced onto the base 224 and advanced through the slot 215 until the lower portion 222 of the cover 214 engages the patch of material 101 trapping it against the projection 271. The cover 214 can compress and/or tension the patch of material 101 within the cartridge 200 when in the closed configuration. FIG. 2 shows the loaded tissue cartridge 200 can be installed into the receptacle 306 of the cutting device 300 with the handles 343 in the open configuration. Once installed, the cutting member 312 can be actuated by lowering the handles 343 towards the base 302 thereby urging the blades 344 towards the patch of material 101 until the blades 344 of the cutting member 312 fully slice through the patch of material 101 (FIG. 4B). With the blades 344 still in the full cut position relative to the cartridge 200, the pusher 320 of the cutting device 300 can be urged distally to prime the shaft 210 and place the now cut stent 105 within the lumen 238 of the shaft 210 towards the opening 230 from the lumen 238 near the distal end region 212 of the shaft 210. The pusher 320 can be retracted from the cartridge 200 and the cartridge 200 removed from the cutting device 300. As described elsewhere herein, removal of the cartridge 200 from the cutting device 300 can include removing the entire cartridge 200 from the device 300 or detaching a nose cone assembly 274 of the cartridge 200 as shown in FIG. 6.

The primed tissue cartridge 200 having the cut stent 105 positioned within the lumen 238 of the shaft 210 can be installed with the delivery device 400 (e.g., inserted within the receptacle 412 or attached by a bayonet connector 413 or other attachment mechanism 425). The push rod 420 of the delivery device 400 is withdrawn in the proximal-most position and the cartridge 200 coupled to the delivery device 400. The push rod 420 can be advanced using a first actuator 415 from the first, retracted position suitable for loading the cartridge 200 to a second primed position so that the delivery device 400 and cartridge 200 are now ready to be used on a patient.

In general, the stent 105 positioned within the shaft 210 can be implanted through a clear corneal or scleral incision that is formed using the shaft 210 or a device separate from the cartridge 200. A viewing lens such as a gonioscopy lens can be positioned adjacent the cornea. The viewing lens enables viewing of internal regions of the eye, such as the scleral spur and scleral junction, from a location in front of the eye. The viewing lens may optionally include one or more guide channels sized to receive the shaft 210. An endoscope can also be used during delivery to aid in visualization. Ultrasonic guidance can be used as well using high-resolution bio-microscopy, OCT, and the like. Alternatively, a small endoscope can be inserted through another limbal incision in the eye to image the eye during implantation.

The distal tip 216 of the shaft 210 can penetrate through the cornea (or sclera) to access the anterior chamber. In this regard, the single incision can be made in the eye, such as within the limbus of the cornea. In an embodiment, the incision is very close to the limbus, such as either at the level of the limbus or within 2 mm of the limbus in the clear cornea. The shaft 210 can be used to make the incision or a separate cutting device can be used. For example, a knife-tipped device or diamond knife can be used initially to enter the cornea. A second device with a spatula tip can then be advanced over the knife tip wherein the plane of the spatula is positioned to coincide with the dissection plane. The spatula tip device can be the shaft 210.

The corneal incision can have a size that is sufficient to permit passage of the shaft 210. In an embodiment, the incision is about 1 mm in size. In another embodiment, the incision is no greater than about 2.85 mm in size. In another embodiment, the incision is no greater than about 2.85 mm and is greater than about 1.5 mm. It has been observed that an incision of up to 2.85 mm is a self-sealing incision.

After insertion through the incision, the shaft 210 can be advanced into the anterior chamber along a pathway that enables the stent 105 to be delivered from the anterior chamber into the target location, such as the supraciliary or suprachoroidal space. With the shaft positioned for approach, the shaft 210 can be advanced further into the eye such that the distal-most tip 216 of the shaft 210 penetrates the tissue at the angle of the eye, for example, the iris root or a region of the ciliary body or the iris root part of the ciliary body near its tissue border with the scleral spur.

The scleral spur is an anatomic landmark on the wall of the angle of the eye. The scleral spur is above the level of the iris but below the level of the trabecular meshwork. In some eyes, the scleral spur can be masked by the lower band of the pigmented trabecular meshwork and be directly behind it. The shaft 210 can travel along a pathway that is toward the angle of the eye and the scleral spur such that the shaft 210 passes near the scleral spur on the way to the supraciliary space, but does not necessarily penetrate the scleral spur during delivery. Rather, the shaft 210 can abut the scleral spur and move downward to dissect the tissue boundary between the sclera and the ciliary body, the dissection entry point starting just below the scleral spur near the iris root or the iris root portion of the ciliary body. In another embodiment, the delivery pathway of the implant intersects the scleral spur.

The shaft 210 can approach the angle of the eye from the same side of the anterior chamber as the deployment location such that the shaft 210 does not have to be advanced across the iris. Alternately, the shaft 210 can approach the angle of the eye from across the anterior chamber AC such that the shaft 210 is advanced across the iris and/or the anterior chamber toward the opposite angle of the eye. The shaft 210 can approach the angle of the eye along a variety of pathways. The shaft 210 does not necessarily cross over the eye and does not intersect the center axis of the eye. In other words, the corneal incision and the location where the stent 105 is implanted at the angle of the eye can be in the same quadrant when viewed looking toward the eye along the optical axis. Also, the pathway of the stent 105 from the corneal incision to the angle of the eye ought not to pass through the centerline of the eye to avoid interfering with the pupil.

The shaft 210 can be continuously advanced into the eye, for example approximately 6 mm. The dissection plane of the shaft 210 can follow the curve of the inner scleral wall such that the stent 105 mounted in the shaft, for example after penetrating the iris root or the iris root portion of the ciliary body CB, can bluntly dissect the boundary between tissue layers of the scleral spur and the ciliary body CB such that a distal region of the stent 105 extends through the supraciliary space and then, further on, is positioned between the tissue boundaries of the sclera and the choroid forming the suprachoroidal space.

Once properly positioned, the stent 105 can be released from the shaft 210. In some implementations, the stent 105 can be released by withdrawing the shaft 210 while the push rod 420 prevents the stent 105 from withdrawing with the shaft 210.

Once implanted, the stent 105 forms a fluid communication pathway between the anterior chamber and the target pathway (e.g., supraciliary space or suprachoroidal space). As mentioned, the stent 105 is not limited to being implanted into the suprachoroidal or supraciliary space. The stent 105 can be implanted in other locations that provide fluid communication between the anterior chamber and locations in the eye, such as Schlemm's Canal or a subconjunctival location of the eye. In another implementation, the stent 105 is implanted to form a fluid communication pathway between the anterior chamber and the Schlemm's Canal and/or communication pathway between the anterior chamber and a subconjunctival location of the eye. It should be appreciated the device described herein can also be used to deliver a stent trans-sclerally as well from an ab interno approach.

As mentioned above, the material used to form the stent can be impregnated with one or more therapeutic agents for additional treatment of an eye disease process.

A wide variety of systemic and ocular conditions such as inflammation, infection, cancerous growth, may be prevented or treated using the stents described herein. More specifically, ocular conditions such as glaucoma, proliferative vitreoretinopathy, diabetic retinopathy, uveitis, keratitis, cytomegalovirus retinitis, cystoid macular edema, herpes simplex viral and adenoviral infections can be treated or prevented.

The following classes of drugs could be delivered using the devices of the present invention: antiproliferatives, antifibrotics, anesthetics, analgesics, cell transport/mobility impending agents such as colchicine, vincristine, cytochalasin B and related compounds; antiglaucoma drugs including beta-blockers such as timolol, betaxolol, atenolol, and prostaglandin analogues such as bimatoprost, travoprost, latanoprost etc; carbonic anhydrase inhibitors such as acetazolamide, methazolamide, dichlorphenamide, diamox; and neuroprotectants such as nimodipine and related compounds. Additional examples include antibiotics such as tetracycline, chlortetracycline, bacitracin, neomycin, polymyxin, gramicidin, oxytetracycline, chloramphenicol, gentamycin, and erythromycin; antibacterials such as sulfonamides, sulfacetamide, sulfamethizole and sulfisoxazole; anti-fungal agents such as fluconazole, nitrofurazone, amphotericine B, ketoconazole, and related compounds; anti-viral agents such as trifluorothymidine, acyclovir, ganciclovir, DDI, AZT, foscamet, vidarabine, trifluorouridine, idoxuridine, ribavirin, protease inhibitors and anti-cytomegalovirus agents; antiallergenics such as methapyriline; chlorpheniramine, pyrilamine and prophenpyridamine; anti-inflammatories such as hydrocortisone, dexamethasone, fluocinolone, prednisone, prednisolone, methylprednisolone, fluorometholone, betamethasone and triamcinolone; decongestants such as phenylephrine, naphazoline, and tetrahydrazoline; miotics and anti-cholinesterases such as pilocarpine, carbachol, di-isopropyl fluorophosphate, phospholine iodine, and demecarium bromide; mydriatics such as atropine sulfate, cyclopentolate, homatropine, scopolamine, tropicamide, eucatropine; sympathomimetics such as epinephrine and vasoconstrictors and vasodilators; Ranibizumab, Bevacizamab, and Triamcinolone.

Non-steroidal anti-inflammatories (NSAIDs) may also be delivered, such as cyclooxygenase-1 (COX-1) inhibitors (e.g., acetylsalicylic acid, for example ASPIRIN® from Bayer AG, Leverkusen, Germany; ibuprofen, for example ADVIL® from Wyeth, Collegeville, Pa.; indomethacin; mefenamic acid), COX-2 inhibitors (CELEBREX® from Pharmacia Corp., Peapack, N.J.; COX-1 inhibitors), including a prodrug Nepafenac®; immunosuppressive agents, for example Sirolimus (RAPAMUNE®, from Wyeth, Collegeville, Pa.), or matrix metalloproteinase (MMP) inhibitors (e.g., tetracycline and tetracycline derivatives) that act early within the pathways of an inflammatory response. Anticlotting agents such as heparin, antifibrinogen, fibrinolysin, anticlotting activase, etc., can also be delivered.

Antidiabetic agents that may be delivered using the present devices include acetohexamide, chlorpropamide, glipizide, glyburide, tolazamide, tolbutamide, insulin, aldose reductase inhibitors, etc. Some examples of anti-cancer agents include 5-fluorouracil, adriamycin, asparaginase, azacitidine, azathioprine, bleomycin, busulfan, carboplatin, carmustine, chlorambucil, cisplatin, cyclophosphamide, cyclosporine, cytarabine, dacarbazine, dactinomycin, daunorubicin, doxorubicin, estramustine, etoposide, etretinate, filgrastin, floxuridine, fludarabine, fluorouracil, fluoxymesterone, flutamide, goserelin, hydroxyurea, ifosfamide, leuprolide, levamisole, lomustine, nitrogen mustard, melphalan, mercaptopurine, methotrexate, mitomycin, mitotane, pentostatin, pipobroman, plicamycin, procarbazine, sargramostin, streptozocin, tamoxifen, taxol, teniposide, thioguanine, uracil mustard, vinblastine, vincristine and vindesine.

Hormones, peptides, nucleic acids, saccharides, lipids, glycolipids, glycoproteins, and other macromolecules can be delivered using the present devices. Examples include: endocrine hormones such as pituitary, insulin, insulin-related growth factor, thyroid, growth hormones; heat shock proteins; immunological response modifiers such as muramyl dipeptide, cyclosporins, interferons (including α, β, and γ interferons), interleukin-2, cytokines, FK506 (an epoxy-pyrido-oxaazcyclotricosine-tetrone, also known as Tacrolimus), tumor necrosis factor, pentostatin, thymopentin, transforming factor beta2, erythropoetin; antineogenesis proteins (e.g., anit VEGF, Interfurons), among others and anticlotting agents including anticlotting activase. Further examples of macromolecules that can be delivered include monoclonal antibodies, brain nerve growth factor (BNGF), celiary nerve growth factor (CNGF), vascular endothelial growth factor (VEGF), and monoclonal antibodies directed against such growth factors. Additional examples of immunomodulators include tumor necrosis factor inhibitors such as thalidomide.

In various implementations, description is made with reference to the figures. However, certain implementations may be practiced without one or more of these specific details, or in combination with other known methods and configurations. In the description, numerous specific details are set forth, such as specific configurations, dimensions, and processes, in order to provide a thorough understanding of the implementations. In other instances, well-known processes and manufacturing techniques have not been described in particular detail in order to not unnecessarily obscure the description. Reference throughout this specification to "one embodiment," "an embodiment," "one implementation," "an implementation," or the like, means that a particular feature, structure, configuration, or characteristic described is included in at least one embodiment or implementation. Thus, the appearance of the phrase "one embodiment," "an embodiment," "one implementation, "an implementation," or the like, in various places throughout this specification are not necessarily referring to the same embodiment or implementation. Furthermore, the particular features, structures, configurations, or characteristics may be combined in any suitable manner in one or more implementations.

The use of relative terms throughout the description may denote a relative position or direction. For example, "distal" may indicate a first direction away from a reference point. Similarly, "proximal" may indicate a location in a second direction opposite to the first direction. The reference point used herein may be the operator such that the terms "proximal" and "distal" are in reference to an operator using the device. A region of the device that is closer to an operator may be described herein as "proximal" and a region of the device that is further away from an operator may be described herein as "distal". Similarly, the terms "proximal" and "distal" may also be used herein to refer to anatomical locations of a patient from the perspective of an operator or from the perspective of an entry point or along a path of insertion from the entry point of the system. As such, a location that is proximal may mean a location in the patient that is closer to an entry point of the device along a path of insertion towards a target and a location that is distal may mean a location in a patient that is further away from an entry point of the device along a path of insertion towards the target location. However, such terms are provided to establish relative frames of reference, and are not intended to limit the use or orientation of the devices to a specific configuration described in the various implementations.

As used herein, the term "about" means a range of values including the specified value, which a person of ordinary skill in the art would consider reasonably similar to the specified value. In aspects, about means within a standard deviation using measurements generally acceptable in the art. In aspects, about means a range extending to +/−10% of the specified value. In aspects, about includes the specified value.

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

The systems disclosed herein may be packaged together in a single package. The finished package would be sterilized using sterilization methods such as Ethylene oxide or radiation and labeled and boxed. Instructions for use may also be provided in-box or through an internet link printed on the label.

P Embodiments

P Embodiment 1. A system for preparation of an implant and ab interno insertion of the implant into an eye of a patient, the system comprising: a tissue cartridge configured to receive and hold a patch of a material; a cutting device; and a delivery device.

P Embodiment 2. The system of P Embodiment 1, wherein the tissue cartridge comprises a shaft extending from a distal end of the tissue cartridge, at least a distal end region of the shaft sized and shaped for insertion into an anterior chamber of the eye, wherein the shaft comprises a lumen.

P Embodiment 3. The system of P Embodiment 2, wherein the tissue cartridge further comprises a base and a cover, the base configured to receive the patch and the cover configured to hold the patch fixed against the base.

P Embodiment 4. The system of P Embodiment 3, wherein the cutting device comprises a cutting member configured to cut the patch of a material positioned within the tissue cartridge.

P Embodiment 5. The system of P Embodiment 4, wherein cutting the patch of a material with the cutting member forms an implant from the patch, the implant configured for implantation into the eye of the patient.

P Embodiment 6. The system of P Embodiment 5, wherein the delivery device comprises an actuator configured to deploy the implant positioned within the cartridge through the lumen of the shaft into the eye.

P Embodiment 7. A method of preparing an implant for implantation into, and of inserting said implant into, an eye of a patient, the method comprising: inserting a patch of a material into a tissue cartridge, the tissue cartridge comprising a shaft extending from a distal end of the tissue cartridge, at least a distal end region of the shaft sized and shaped for insertion into an anterior chamber of the eye, wherein the shaft comprises a lumen; coupling the tissue cartridge with a cutting device, the cutting device having a cutting member configured to cut the patch of a material within the tissue cartridge; cutting the patch with the cutting member to form the implant from the patch while the tissue cartridge is coupled with the cutting device; decoupling the tissue cartridge from the cutting device; coupling the tissue cartridge to a delivery device; inserting the distal end region of the shaft into the anterior chamber of the eye; positioning the distal end region adjacent eye tissue; and actuating the delivery device to deploy the implant from the cartridge through at least a portion of the lumen such that the implant engages the eye tissue.

P Embodiment 8. The method of P Embodiment 7, further comprising delivering a viscous material through the shaft.

P Embodiment 9. A system for preparation of an implant and ab interno insertion of the implant into an eye of a patient, the system comprising: a tissue cartridge configured to receive and hold a patch of a material; and a delivery device.

P Embodiment 10. The system of P Embodiment 9, wherein the tissue cartridge comprises a shaft extending from a distal end of the tissue cartridge, at least a distal end region of the shaft sized and shaped for insertion into an anterior chamber of the eye, wherein the shaft comprises a lumen.

P Embodiment 11. The system of P Embodiment 10, wherein the tissue cartridge further comprises a base and a cover, the base configured to receive the patch and the cover configured to hold the patch fixed against the base.

P Embodiment 12. The system of P Embodiment 11, further comprising a cutting device, wherein the cutting device comprises a cutting member configured to cut the patch of a material positioned within the tissue cartridge.

P Embodiment 13. The system of P Embodiment 12, wherein cutting the patch of a material with the cutting member forms an implant from the patch, the implant configured for implantation into the eye of the patient.

P Embodiment 14. The system of P Embodiment 13, wherein the delivery device comprises an actuator configured to deploy the implant positioned within at least a portion of the cartridge through the lumen of the shaft into the eye.

P Embodiment 15. The system of P Embodiment 10, wherein the tissue cartridge comprises a nose cone assembly comprising the distal end region of the tissue cartridge and the shaft, wherein the nose cone assembly is reversibly coupled to the tissue cartridge and reversibly coupled to the delivery device.

P Embodiment 16. The system of P Embodiment 10, wherein the shaft of the tissue cartridge is configured to deliver a viscous material.

P Embodiment 17. A method of preparing an implant for implantation into, and of inserting said implant into, an eye of a patient, the method comprising: inserting a patch of a material into a tissue cartridge, the tissue cartridge comprising a shaft extending from a distal end of the tissue cartridge, at least a distal end region of the shaft sized and shaped for insertion into an anterior chamber of the eye, wherein the shaft comprises a lumen; coupling the tissue cartridge with a cutting device, the cutting device having a cutting member configured to cut the patch of a material within the tissue cartridge; cutting the patch with the cutting member to form the implant from the patch while the tissue cartridge is coupled with the cutting device; decoupling at least a portion of the tissue cartridge from the cutting device; coupling the at least a portion of the tissue cartridge to a delivery device; inserting the distal end region of the shaft into the anterior chamber of the eye; positioning the distal end region adjacent eye tissue; and actuating the delivery device to deploy the implant from the cartridge through at least a portion of the lumen such that the implant engages the eye tissue.

P Embodiment 18. The method of P Embodiment 17, further comprising delivering a viscous material through the shaft.

P Embodiment 19. A system for preparation of an implant from a patch of a material and ab interno insertion of the implant into an eye of a patient, the system comprising: a tissue cartridge comprising a nose cone and a distal shaft defining a lumen between the nose cone and a distal end region of the distal shaft; a cutting device configured to couple to the nose cone; and a delivery device configured to couple to the nose cone.

P Embodiment 20. The system of P Embodiment 19, wherein at least the distal end region of the distal shaft is sized and shaped for insertion into an anterior chamber of the eye.

P Embodiment 21. The system of P Embodiment 20, wherein a distal-most tip of the distal shaft is configured to dissect tissue for implantation into the supraciliary cleft, Schlemm's canal or trans-sclerally.

P Embodiment 22. The system of P Embodiment 20, wherein the cutting device comprises a base configured to receive the patch.

P Embodiment 23. The system of P Embodiment 22, wherein the cutting device comprises a cutting member configured to cut the patch of a material into the implant.

P Embodiment 24. The system of P Embodiment 23, wherein the cutting device further comprises a compacting tool configured to urge the implant into the lumen of the distal shaft.

P Embodiment 25. The system of P Embodiment 24, wherein the delivery device comprises an actuator configured to deploy the implant compacted within the lumen of the distal shaft into the eye.

P Embodiment 26. The system of P Embodiment 25, further comprising a movable internal elongate member operatively coupled to the actuator to advance the implant through the lumen and out a distal opening of the distal shaft.

P Embodiment 27. A method of preparing an implant from a patch of a material for implantation into, and of inserting said implant into, an eye of a patient, the method comprising: coupling a tissue cartridge with a cutting device, the tissue cartridge comprising a shaft extending from a distal end of the tissue cartridge, at least a distal end region of the shaft sized and shaped for insertion into an anterior chamber of the eye, wherein the shaft comprises a lumen, the cutting device having a cutting member configured to cut the patch of a material; cutting the patch with the cutting member to form the implant from the patch; compacting the implant within the lumen of the shaft; decoupling the tissue cartridge from the cutting device; coupling the tissue cartridge to a delivery device; inserting the distal end region of the shaft into the anterior chamber of the eye; positioning the distal end region adjacent eye tissue; and actuating the delivery device to deploy the implant from the lumen such that the implant engages the eye tissue.

P Embodiment 28. The method of P Embodiment 27, further comprising delivering a viscous material through the shaft.

P Embodiment 29. A system for preparation of an implant and ab interno insertion of the implant into an eye of a patient, the system comprising: a tissue cartridge; and a delivery device.

P Embodiment 30. The system of P Embodiment 29, wherein the tissue cartridge comprises a shaft extending from a distal end of the tissue cartridge, at least a distal end region of the shaft sized and shaped for insertion into an anterior chamber of the eye, wherein the shaft comprises a lumen.

P Embodiment 31. The system of P Embodiment 30, further comprising a cutting device, wherein the cutting device comprises a cutting member configured to cut a patch of a material.

P Embodiment 32. The system of P Embodiment 31, wherein cutting the patch of a material with the cutting member forms an implant from the patch, the implant configured for implantation into the eye of the patient.

P Embodiment 33. The system of P Embodiment 32, wherein the delivery device comprises an actuator configured to deploy the implant positioned within the shaft through the lumen of the shaft into the eye.

P Embodiment 34. The system of P Embodiment 30, wherein the tissue cartridge comprises a nose cone assembly comprising the distal end region of the tissue cartridge and the shaft, wherein the nose cone assembly is reversibly coupled to the tissue cartridge and reversibly coupled to the delivery device.

P Embodiment 35. The system of P Embodiment 30, wherein the shaft of the tissue cartridge is configured to deliver a viscous material.

P Embodiment 36. A method of preparing an implant for implantation into, and of inserting said implant into, an eye of a patient, the method comprising: cutting a patch of a material with a cutting member of a cutting device to form an implant from the patch; compacting the implant within a lumen of a shaft extending from a distal end of a tissue cartridge; decoupling at least a portion of the tissue cartridge from the cutting device; coupling the at least a portion of the tissue cartridge to a delivery device; inserting a distal end region of the shaft into the anterior chamber of the eye; positioning the distal end region adjacent eye tissue; and actuating the delivery device to deploy the implant from the tissue cartridge through at least a portion of the lumen such that the implant engages the eye tissue.

P Embodiment 37. The method of P Embodiment 36, further comprising delivering a viscous material through the shaft.

P Embodiment 38. A method of treating an eye with minimally-modified biological tissue.

P Embodiment 39. The method of P Embodiment 38, wherein the biological tissue is scleral tissue, wherein minimally-modifying the scleral tissue comprises compressing the scleral tissue from a first size into a second, smaller size within a distal shaft.

P Embodiment 40. The method of P Embodiment 39, wherein the distal shaft is sized and shaped to be inserted through a self-sealing incision in a cornea of the eye into the anterior chamber.

P Embodiment 41. The method of P Embodiment 40, further comprising deploying the compressed scleral tissue from the distal shaft between tissue layers near the iridocorneal angle.

P Embodiment 42. The method of P Embodiment 41, wherein the compressed scleral tissue deployed from the distal shaft returns towards the first size.

P Embodiment 43. The method of P Embodiment 42, further comprising treating glaucoma with the compressed scleral tissue.

P Embodiment 44. The method of P Embodiment 41, wherein deploying the compressed scleral tissue from the distal shaft between tissue layers near the iridocorneal angle comprises deploying the compressed scleral tissue at least in part within Schlemm's Canal and at least in part within the anterior chamber, or at least in part between a ciliary body and sclera of an eye, or at least in part within a cyclodialysis cleft.

P Embodiment 45. The method of P Embodiment 41, wherein deploying the compressed scleral tissue from the distal shaft between tissue layers near the iridocorneal angle comprises deploying the compressed scleral tissue within the cyclodialysis cleft so that the proximal end of the compressed scleral tissue avoids protruding within the anterior chamber.

P Embodiment 46. The method of P Embodiment 41, wherein deploying the compressed scleral tissue from the distal shaft between tissue layers near the iridocorneal angle comprises retracting the distal shaft while maintaining the compressed scleral tissue position relative to the tissue layers.

P Embodiment 47. The method of P Embodiment 41, wherein deploying the compressed scleral tissue from the distal shaft between tissue layers near the iridocorneal angle comprises pushing the compressed scleral tissue out of the distal shaft and into position between the tissue layers.

P Embodiment 48. A system for deploying an implant cut from a biological tissue into an eye of a patient, the system comprising: a delivery device comprising: a proximal handle; at least one actuator; and a distal coupler; and a nose cone assembly comprising: a nose cone having a proximal end region and a distal end region; a coupler on the proximal end region of the nose cone configured to reversibly engage with the distal coupler of the delivery device; and a tubular shaft projecting from the distal end region of the nose cone, the tubular shaft comprising one or more fenestrations covered by a material that is translucent or transparent so as to reveal a lumen of the tubular shaft.

P Embodiment 49. The system of P Embodiment 48, wherein the one or more fenestrations form a metering system of the tubular shaft configured to identify depth of insertion of the tubular shaft and/or a length of the implant within the lumen.

P Embodiment 50. The system of P Embodiment 48, wherein the tubular shaft comprises an introducer tube and an outer tube, the introducer tube formed of an opaque material and the outer tube formed of the material that is translucent or transparent.

P Embodiment 51. The system of P Embodiment 48, wherein the tubular shaft comprises a distal end region distal to the one or more fenestrations.

P Embodiment 52. The system of P Embodiment 51, wherein the distal end region curves away from a longitudinal axis of a proximal end region of the tubular shaft such that a distal opening from the lumen surrounds an axis that is different from the longitudinal axis of the proximal end region.

P Embodiment 53. The system of P Embodiment 51, wherein the distal end region is formed of a translucent or transparent material.

P Embodiment 54. The system of P Embodiment 51, wherein the biological tissue is sclera or cornea.

P Embodiment 55. A trephination device for minimal modification of a biologically-derived tissue, the device configured to cut the biologically-derived tissue into an elongated strip of tissue having a length and a width, wherein the length is greater than the width.

P Embodiment 56. The device of P Embodiment 55, wherein the strip of tissue is for implantation in an eye of a patient.

P Embodiment 57. The device of P Embodiment 55, wherein the width is less than about 3 mm and the length is greater than about 3 mm.

P Embodiment 58. The device of P Embodiment 55, wherein the biologically-derived tissue comprises scleral tissue or corneal tissue harvested from a donor or the patient.

P Embodiment 59. The device of P Embodiment 55, further comprising at least one sharpened edge configured to cut the biologically-derived tissue to the width.

What is claimed is:

1. A system for deploying an implant cut from a biological tissue into an eye of a patient, the system comprising:
   a delivery device comprising:
      a proximal housing;
      at least one actuator; and
      a distal coupler; and
   a nose cone assembly comprising:
      a nose cone having a proximal end region and a distal end region;
      a coupler on the proximal end region of the nose cone configured to reversibly engage with the distal coupler of the delivery device; and
      a tubular shaft projecting from the distal end region of the nose cone and comprising a lumen, the tubular shaft comprising one or more fenestrations extending through a side wall of the shaft, the one or more fenestrations covered by a material that is translucent or transparent so as to reveal the lumen of the tubular shaft.

2. The system of claim 1, wherein the one or more fenestrations form a metering system of the tubular shaft configured to identify depth of insertion of the tubular shaft and/or a length of the implant within the lumen.

3. The system of claim 1, wherein the tubular shaft comprises an introducer tube and an outer tube, the introducer tube formed of an opaque material and the outer tube formed of the material that is translucent or transparent.

4. The system of claim 1, wherein the tubular shaft comprises a distal end region distal to the one or more fenestrations.

5. The system of claim 4, wherein the distal end region curves away from a longitudinal axis of a proximal end region of the tubular shaft such that a distal opening from the lumen surrounds an axis that is different from the longitudinal axis of the proximal end region.

6. The system of claim 4, wherein the distal end region is formed of a translucent or transparent material.

7. The system of claim 1, further comprising the implant.

8. The system of claim 7, wherein the biological tissue of the implant is scleral or corneal biological tissue.

9. A device for minimal modification of a biologically-derived tissue, the device comprising two blades spaced apart by a gap, each blade having an inner face and at least one distal bevel forming a cutting edge, wherein the two blades are mounted at an angle relative to one another so that the inner faces are non-parallel and the distal bevels are parallel to one another, wherein the device is configured to cut the biologically-derived tissue into an elongated strip having a length and a width, wherein the length is greater than the width.

10. The device of claim 9, wherein the distal bevels are orthogonal to the tissue.

11. The device of claim 9, wherein the strip is configured for implantation in an eye of a patient.

12. The device of claim 9, wherein the width is less than about 3 mm and the length is greater than about 3 mm.

13. The device of claim 9, wherein the biologically-derived tissue comprises scleral tissue or corneal tissue harvested from a donor or the patient.

14. A cutting device for preparation of an implant for ab interno insertion of the implant into an eye, the cutting device configured to be moved between an open configuration for loading a patch of a material in the cutting device and a closed configuration, the cutting device comprising:
   a lower component having an upper bearing surface configured to receive the patch of the material;
   an upper component having a lower surface configured to abut against the patch of the material when the cutting device is in the closed configuration;
   a cutting die moveably coupled to the upper component, the cutting die comprising a pair of blades and a spacer defining a gap between the blades; and
   an actuator,
   wherein the pair of blades is configured to move below the lower surface of the upper component to penetrate the patch of the material at two locations to form a strip of the material having a width narrower than a width of the patch of the material.

15. The system of claim 14, wherein the upper component is movably coupled to the lower component around a hinge to move the cutting device between the open configuration and the closed configuration.

16. The system of claim 14, wherein the gap defined by the spacer determines the width of the strip.

17. The system of claim 14, wherein each blade of the pair of blades includes a single bevel edge or a dual bevel edge.

18. The system of claim 15, wherein the actuator comprises a lever configured to move the pair of blades relative to the upper surface upon rotation of the lever around axis relative to the upper component.

19. The system of claim 14, wherein each blade of the pair of blades has an inner face and at least one distal bevel forming a cutting edge.

20. The system of claim 19, wherein the pair of blades is mounted so that a first blade of the pair of blades is at an angle relative to a second blade of the pair of blades and so that the inner faces of the first and second blades are non-parallel and the distal bevels of the first and second blades are parallel to one another.

21. The system of claim 20, wherein the distal bevels are orthogonal to the upper surface.

22. The system of claim 14, wherein the material comprises biologically-derived material suitable for transplant into the eye, and wherein the biologically-derived material comprises tissue harvested from a donor or from the eye.

23. The system of claim 18, wherein rotation of the upper component relative to the lower component around the hinge articulates the upper component moving the cutting device between the open configuration and the closed configuration.

24. The system of claim 23, wherein, when the upper component is rotated around the hinge to place the cutting device in the closed configuration, rotation of the lever around the axis extends the pair of blades below the lower surface.

25. The system of claim 24, wherein the cutting die further comprises a return spring, the spring arranged to urge the cutting die upward away from the lower component and be compressed upon rotation of the lever toward the lower component.

26. The system of claim 25, wherein motion of the lever relative to the upper component to compress the return spring after the cutting device is in the closed configuration provides feedback to a user about reaching an end of travel of the upper component.

27. The system of claim 14, wherein the cutting die further comprises an ejection spring positioned between the blades to eject the strip of the material from between the pair of blades.

28. The system of claim 14, wherein the upper bearing surface and/or the cutting die is removably attached from the cutting device for replacement.

* * * * *